US008055907B2

(12) United States Patent
Deem et al.

(10) Patent No.: US 8,055,907 B2
(45) Date of Patent: Nov. 8, 2011

(54) PROGRAMMING INTERFACE FOR A COMPUTER PLATFORM

(75) Inventors: Michael E. Deem, Redmond, WA (US); Michael J. Pizzo, Bellevue, WA (US); John Patrick Thompson, Seattle, WA (US); Denise L. Chen, Bellevue, WA (US); Alexander Vaschillo, Redmond, WA (US); Bekim Demiroski, Redmond, WA (US); Srinivasmurthy P. Acharya, Sammamish, WA (US); Robert T. Whitney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1566 days.

(21) Appl. No.: 10/693,804

(22) Filed: Oct. 24, 2003

(65) Prior Publication Data

US 2005/0091671 A1 Apr. 28, 2005

(51) Int. Cl.
*G06F 12/14* (2006.01)
*H04L 29/06* (2006.01)
*G06F 9/44* (2006.01)
*G06F 9/45* (2006.01)
*G06F 3/00* (2006.01)

(52) U.S. Cl. .............. 713/187; 726/1; 726/3; 726/6; 713/165; 713/167; 713/193; 711/100; 711/117; 717/108; 717/116; 717/120; 717/146; 717/147; 719/328

(58) Field of Classification Search .......... 713/187, 713/165, 167; 717/120, 146; 719/328
See application file for complete search history.

(56) References Cited

U.S. PATENT DOCUMENTS

| 5,497,339 | A  | * | 3/1996  | Bernard ............... 708/109 |
| 6,161,125 | A  | * | 12/2000 | Traversat et al. ....... 709/203 |
| 6,189,055 | B1 | * | 2/2001  | Eisele et al. .............. 710/62 |
| 6,389,129 | B1 | * | 5/2002  | Cowan ............... 379/221.03 |
| 6,446,253 | B1 | * | 9/2002  | Mellmer ............... 717/100 |
| 6,715,147 | B1 | * | 3/2004  | Barker ................. 719/315 |
| 7,089,560 | B1 | * | 8/2006  | Uhler et al. ............ 719/311 |
| 7,305,677 | B2 | * | 12/2007 | Marcey et al. .......... 719/310 |
| 7,574,464 | B2 | * | 8/2009  | Hitz et al. ......... 707/999.205 |
| 7,581,172 | B2 | * | 8/2009  | Ozzie et al. ............ 715/234 |
| 2001/0005848 | A1 | * | 6/2001 | Haverstock et al. ........ 707/1 |
| 2002/0059425 | A1 |   | 5/2002  | Belfiore et al. |
| 2002/0133809 | A1 | * | 9/2002  | Hills .................... 717/136 |
| 2002/0152267 | A1 | * | 10/2002 | Lennon ................ 709/203 |
| 2002/0161855 | A1 | * | 10/2002 | Manczak et al. ......... 709/219 |
| 2002/0183044 | A1 | * | 12/2002 | Blackwell et al. ........ 455/412 |
| 2002/0194200 | A1 | * | 12/2002 | Flank et al. .......... 707/104.1 |
| 2003/0009694 | A1 | * | 1/2003  | Wenocur et al. ......... 713/201 |

(Continued)

OTHER PUBLICATIONS

Butler et al, 2002, School of Computer Science and Software Engineering Monash University, A Formalization of the Common Type System and CLS Rules of ECMA Standard 335: "Common Language Infrastructure".*

(Continued)

*Primary Examiner* — Edan Orgad
*Assistant Examiner* — Jenise Jackson
(74) *Attorney, Agent, or Firm* — Lee & Hayes, PLLC

(57) ABSTRACT

A programming interface for a computer platform can include various functionality. In certain embodiments, the programming interface includes one or more of the following groups of types or functions: those related to core file system concepts, those related to entities that a human being can contact, those related to documents, those common to multiple kinds of media, those specific to audio media, those specific to video media, those specific to image media, those specific to electronic mail messages, and those related to identifying particular locations.

54 Claims, 10 Drawing Sheets

U.S. PATENT DOCUMENTS

| | | | |
|---|---|---|---|
| 2003/0028685 | A1 | 2/2003 | Smith et al. |
| 2003/0097301 | A1* | 5/2003 | Kageyama et al. ............ 705/14 |
| 2003/0101434 | A1* | 5/2003 | Szyperski ..................... 717/120 |
| 2003/0172196 | A1* | 9/2003 | Hejlsberg et al. ............. 709/328 |
| 2003/0225753 | A1* | 12/2003 | Balassanian et al. ............. 707/3 |
| 2004/0046789 | A1* | 3/2004 | Inanoria ........................ 345/748 |
| 2004/0168084 | A1* | 8/2004 | Owen et al. ................... 713/201 |
| 2004/0210585 | A1* | 10/2004 | Tewksbary ...................... 707/10 |
| 2005/0136964 | A1* | 6/2005 | Le Saint et al. ............... 455/522 |
| 2005/0154994 | A1* | 7/2005 | Chen et al. ................... 715/770 |
| 2006/0268836 | A1* | 11/2006 | Prentice ........................ 370/352 |
| 2008/0059518 | A1* | 3/2008 | Vincent ..................... 707/103 Y |

OTHER PUBLICATIONS

Sannomiya et al, A Framework for Sharing Personal Annotations on Web Resources using XML, pp. 40-48.*

Jordan et al., Modular System Building with Java Packages, Sun Microsystems Laboratories, pp. 155-163.*

"Microsoft Windows XP Reviewers Guide", Aug. 2001, pp, 1-73, retrieved from the internet from <<http://download, microsoft.com/download/1/6/6/16674679-Ie6e-4304-a5a0-49eeaa31e639/RevGuide.pdf>> on Mar. 25, 2008.

European Search Report for European Application No. EP04020902, mailed Apr. 24, 2008 (5 pages).

Translated the Japanese Office Action mailed Apr. 5, 2011 for Japanese Patent Application No. 2004-264630, a counterpart foreign application of U.S. Appl. No. 10/693,804.

The Korean Office Action mailed Feb. 16, 2011 for Korean Patent Application No. 10-2004-72777, a counterpart foreign application of U.S. Appl. No. 10/693,804.

* cited by examiner

PROGRAMMING INTERFACE FOR A COMPUTER PLATFORM

TECHNICAL FIELD

This invention relates to software and to development of such software. More particularly, this invention relates to a programming interface that facilitates use of a software platform by application programs and computer hardware.

BRIEF DESCRIPTION OF ACCOMPANYING COMPACT DISCS

Accompanying this specification is a set of three compact discs that stores a Software Development Kit (SDK) for the Microsoft® Windows® Code-Named "Longhorn" operating system. The SDK contains documentation for the Microsoft® Windows® Code-Named "Longhorn" operating system. Duplicate copies of each of these three compact discs also accompany this specification.

The first compact disc in the set of three compact discs (CD 1 of 3) includes a file folder named "lhsdk" that was created on Oct. 22, 2003; it is 586 Mbytes in size, contains 9,692 sub-folders, and contains 44,292 sub-files. The second compact disc in the set of three compact discs (CD 2 of 3) includes a file folder named "ns" that was created on Oct. 22, 2003; it is 605 Mbytes in size, contains 12,628 sub-folders, and contains 44,934 sub-files. The third compact disc in the set of three compact discs (CD 3 of 3) includes a file folder named "ns" that was created on Oct. 22, 2003; it is 575 Mbytes in size, contains 9,881 sub-folders, and contains 43,630 sub-files. The files on each of these three compact discs can be executed on a Windows®-based computing device (e.g., IBM-PC, or equivalent) that executes a Windows®-brand operating system (e.g., Windows® NT, Windows® 98, Windows® 2000, Windows® XP, etc.). The files on each compact disc in this set of three compact discs are hereby incorporated by reference.

Each compact disc in the set of three compact discs itself is a CD-R, and conforms to the ISO 9660 standard. The contents of each compact disc in the set of three compact discs is in compliance with the American Standard Code for Information Interchange (ASCII).

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as various versions of the Microsoft Windows® operating system, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

Furthermore, most applications make use of data. This data can oftentimes change during execution of and/or the life of the application, and is typically stored on a local device or on some remote device (e.g., a file server or other computing device on a network). Traditionally, applications have "owned" their own data, with each application being responsible for managing its own data (e.g., retrieving, saving, relocating, etc.) using its own formats. This traditional structure has problems, however, as it makes searching for related data across applications very difficult, if not impossible, and frequently results in similar information having to be entered in multiple places (for example, contact information may have to be entered separately into an email application, a messenger application, a phone application, a word processor, and so forth).

The inventors have developed a unique set of programming interface functions to assist in solving these problems.

SUMMARY

A programming interface for a computer platform is described herein.

In accordance with certain aspects, the programming interface can include one or more of the following groups of types or functions: those related to core file system concepts, those related to entities that a human being can contact, those related to documents, those common to multiple kinds of media, those specific to audio media, those specific to video media, those specific to image media, those specific to electronic mail messages, and those related to identifying particular locations.

BRIEF DESCRIPTION OF THE DRAWINGS

The same numbers are used throughout the drawings to reference like features.

DETAILED DESCRIPTION

This disclosure addresses programming interfaces such as an application program interface (API) for a network platform upon which developers can build Web applications and services. More particularly, an exemplary API is described for operating systems that make use of a network platform, such as the .NET™ Framework created by Microsoft Corporation. The .NET™ Framework is a software platform for Web services and Web applications implemented in the distributed computing environment. It represents the next generation of Internet computing, using open communication standards to communicate among loosely coupled Web services that are collaborating to perform a particular task.

In the described implementation, the network platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records. Through the use of XML and other open protocols, such as Simple Object Access Protocol (SOAP), the network platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

As used herein, the phrase application program interface or API includes traditional interfaces that employ method or function calls, as well as remote calls (e.g., a proxy, stub relationship) and SOAP/XML invocations.

Exemplary Network Environment

Figure 1:
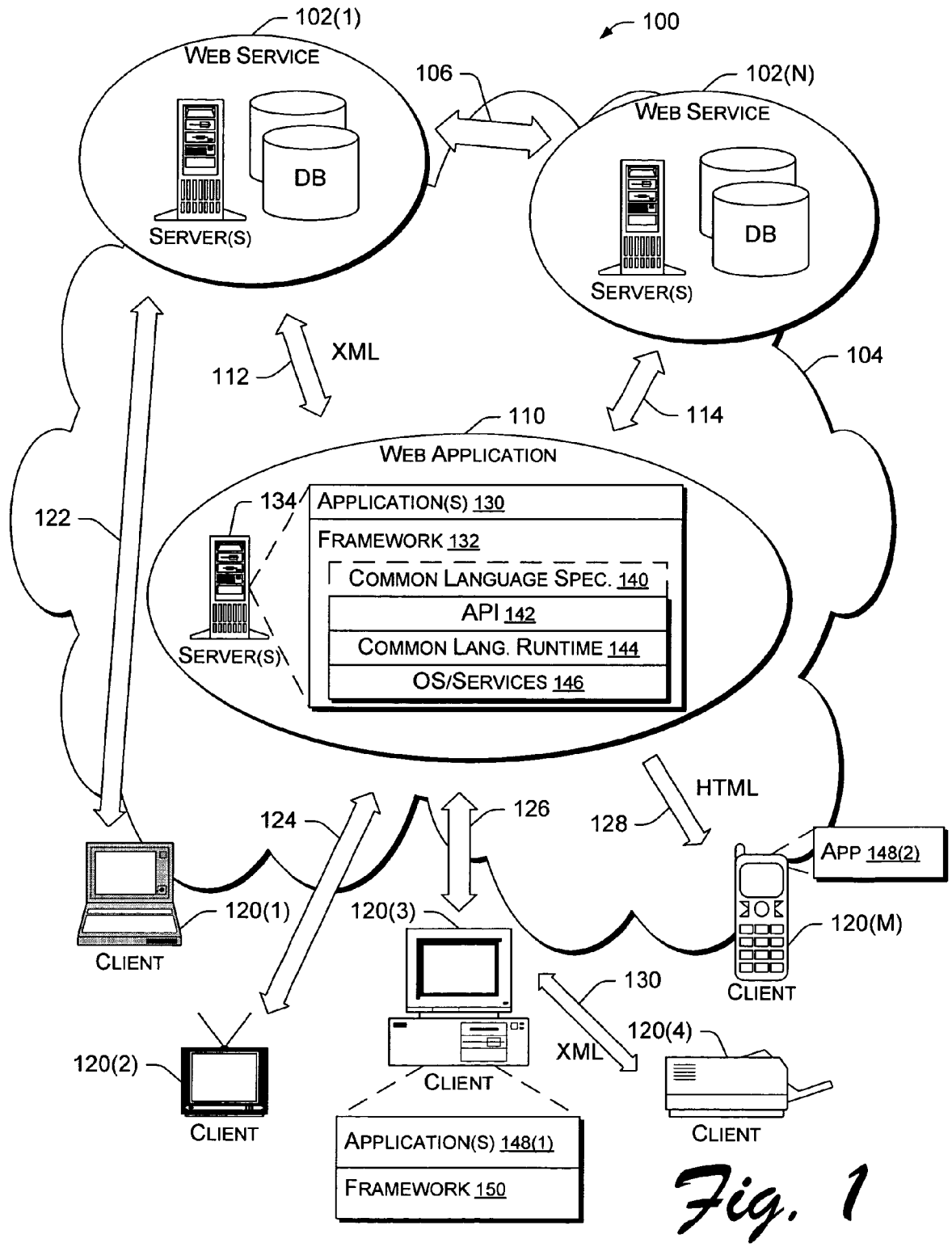
FIG. 1 illustrates a network architecture in which clients access Web services over the Internet using conventional protocols.

FIG. 1 shows a network environment 100 in which a network platform, such as the .NET™ Framework, may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3. The reader is directed to the ECMA web site at www.ecma.ch.

The API layer 142 presents groups of functions that the applications 130 can call to access the resources and services provided by layer 146. By exposing the API functions for a network platform, application developers can create Web applications for distributed computing systems that make fill use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework can also be implemented at the client devices 120. Client 120(3) represents the situation where a framework 150 is implemented at the client. This framework may be identical to server-based framework 132, or modified for client purposes. The framework 150 includes an API layer analogous to (or identical to) API layer 142 of framework 132. Alternatively, the client-based framework may be condensed in the event that the client is a limited or dedicated function device, such as a cellular phone, personal digital assistant, handheld computer, or other communication/computing device.

Developers' Programming Framework

Figure 2:
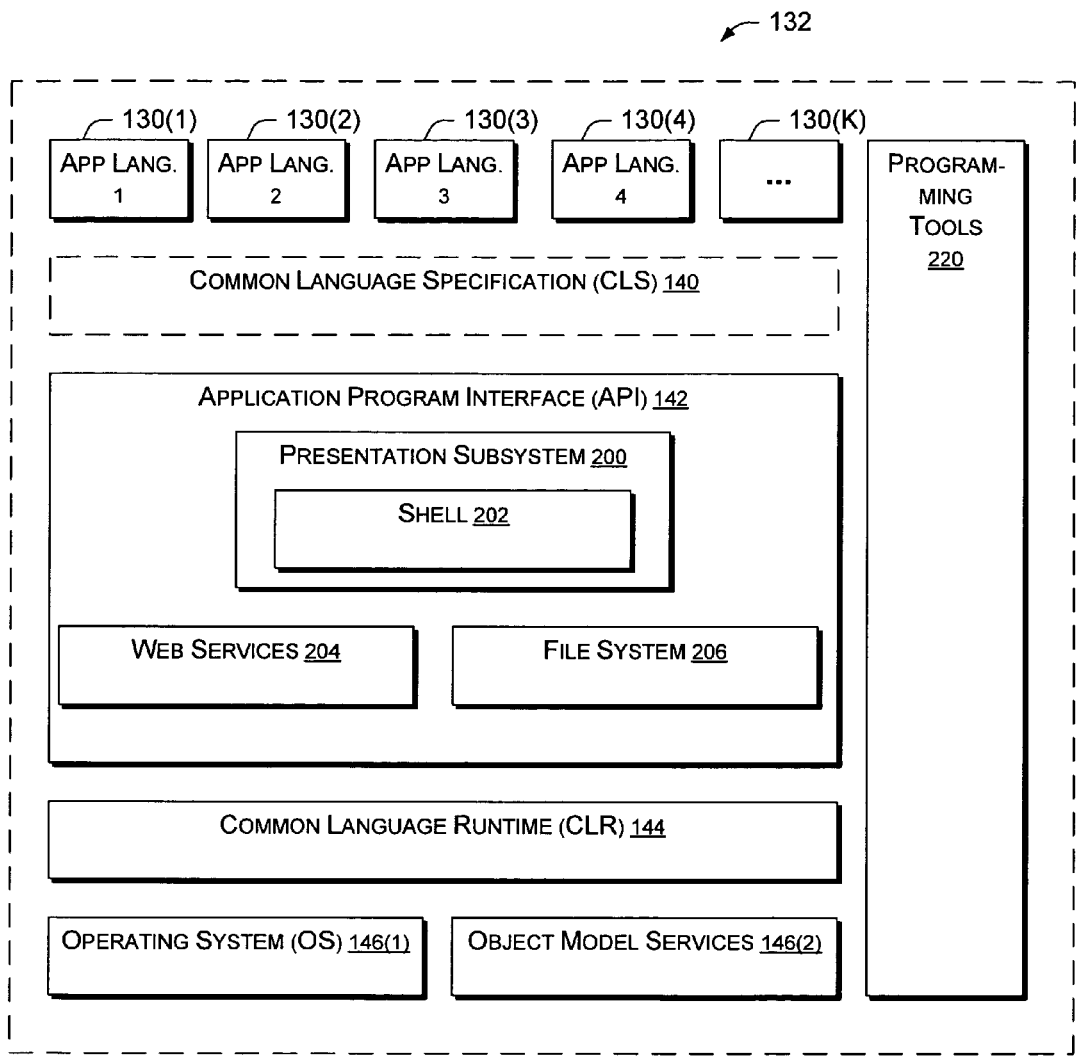
FIG. 2 is a block diagram of a software architecture for a network platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (U.S. Ser. No. 09/598,105) and "Unified Data Type System and Method" filed Jul. 10, 2000 (U.S. Ser. No. 09/613,289), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized to include three root namespaces. It should be noted that although only three root namespaces are illustrated in FIG. 2, additional root namespaces may also be included in API 142. The three root namespaces illustrated in API 142 are: a first namespace 200 for a presentation subsystem (which includes a namespace 202 for a user interface shell), a second namespace 204 for web services, and a third namespace 206 for a file system. Each group can then be assigned a name. For instance, types in the presentation subsystem namespace 200 can be assigned the name "Windows", and types in the file system namespace 206 can be assigned names "Storage". The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the file system namespace 206 can be referenced using the hierarchical name "System.Storage". In this way, the individual namespaces 200, 204, and 206 become major branches off of the System namespace and can carry a designation where the individual namespaces are prefixed with a designator, such as a "System." prefix.

The presentation subsystem namespace 200 pertains to programming and content development. It supplies types that allow for the generation of applications, documents, media presentations and other content. For example, presentation subsystem namespace 200 provides a programming model that allows developers to obtain services from the operating system 146(1) and/or object model services 146(2).

The shell namespace 202 pertains to user interface functionality. It supplies types that allow developers to embed user interface functionality in their applications, and further allows developers to extend the user interface functionality.

The web services namespace 204 pertains to an infrastructure for enabling creation of a wide variety of web applications, e.g. applications as simple as a chat application that operates between two peers on an intranet, and/or as complex as a scalable Web service for millions of users. The described infrastructure is advantageously highly variable in that one need only use those parts that are appropriate to the complexity of a particular solution. The infrastructure provides a foundation for building message-based applications of various scale and complexity. The infrastructure or framework provides APIs for basic messaging, secure messaging, reliable messaging and transacted messaging. In the embodiment described below, the associated APIs have been factored into a hierarchy of namespaces in a manner that has been carefully crafted to balance utility, usability, extensibility and versionability.

The file system namespace 206 pertains to storage. It supplies types that allow for information storage and retrieval.

In addition to the framework 132, programming tools 220 are provided to assist the developer in building Web services and/or applications. One example of the programming tools 220 is Visual Studio™, a multi-language suite of programming tools offered by Microsoft Corporation.

Root API Namespaces

Figure 3:
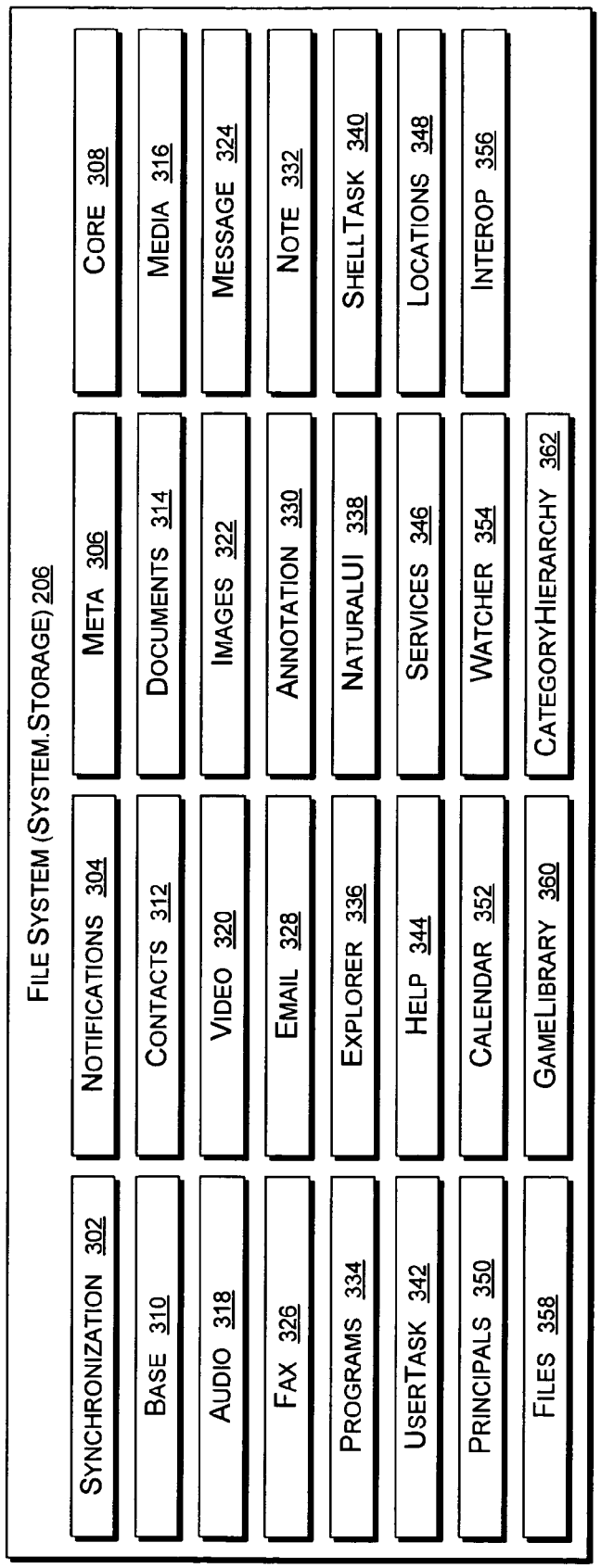
FIG. 3 is a block diagram of unique namespaces supported by the API, as well as function classes of the various API functions.

FIG. 3 shows the file system namespace 206 in more detail. In one embodiment, the namespaces are identified according to a hierarchical naming convention in which strings of names are concatenated with periods. For instance, the file system namespace 206 is identified by the root name "System.Storage". Within the "System.Storage" namespace is another namespace for synchronization, identified as "System.Storage.Synchronization". With this naming convention in mind, the following provides a general overview of the file system namespace 206, although other naming conventions could be used with equal effect.

The file system namespace 206 ("System.Storage"), includes classes and APIs that support the file system. The file system, which may also be referred to as "WinFS", is an active storage platform for organizing, searching for, and sharing all kinds of information. This platform defines a rich data model, builds on top of a relational storage engine, supports a flexible programming model, and provides a set of data services for monitoring, managing, and manipulating data. The data can be file-based or non-file data, and data is typically referred to as an "item". The file system extends the functionality typically provided by file systems because it also deals with items that are non-file data, such as personal contacts, event calendars, and e-mail messages. Additional information regarding the file system can be found in U.S. patent application Ser. No. 10/646,545, filed Aug. 21, 2003, entitled "Systems and Methods for Interfacing Application Programs with an Item-Based Storage Platform", which is hereby incorporated by reference.

The file system namespace 206 defines additional namespaces, which may also be referred to as schemas. These additional namespaces include one or more of: Synchronization namespace 302, Notification (or Notifications) namespace 304, Meta namespace 306, Core namespace 308, Base namespace 310, Contact (or Contacts) namespace 312, Document (or Documents) namespace 314, Media namespace 316, Audio namespace 318, Video namespace 320, Image (or Images) namespace 322, Message (or Messages) namespace 324, Fax namespace 326, Email (or Mail) namespace 328, Annotation (or Annotations) namespace 330, Note (or Notes) namespace 332, Program (or Programs) namespace 334, Explorer namespace 336, NaturalUI (or NaturalUserInterface) namespace 338, ShellTask (or ShellTasks) namespace 340, UserTask (or User Tasks) namespace 342, Help (or Assistance) namespace 344, Service (or Services) namespace 346, Location (or Locations) namespace 348, Principal (or Principals) namespace 350, Calendar (or Calendars) namespace 352, Watcher namespace 354, Interop namespace 356, File (or Files) namespace 358, GameLibrary (or GameLibraries) namespace 360, and CategoryHierarchy (or CategoryHierarchies) 362.

The file system namespace 206 defines a data model for the file system. The file system namespace 206 describes the basic conceptual structure for defining other namespaces, which are described in more detail below. The file system namespace 206 includes, for example, definitions of items, relationships, nested elements, extensions, and so forth.

The Synchronization namespace 302 ("System.Storage.Synchronization") defines classes and interfaces that allows data and data changes to be moved between the WinFS file system and other file systems. The functionality defined by namespace 302 allows, for example, data stored in formats defined by previous (legacy) file systems, databases, and other data storage structures to be represented and manipulated in the WinFS file system, thereby making the data accessible to the functionality of the other namespaces described herein. The functionality defined by namespace 302 further allows, for example, data stored in the WinFS file system to be represented and manipulated in other data storage structures or formats.

The Notifications (or Notification) namespace 304 ("System.Storage.Notifications" or "System.Storage.Notification") defines classes and interfaces that allow for the creation and management of rules. The Notifications namespace 304 allows rules to be defined (e.g., by applications) as well as actions to take when data events (such as the addition, modification, or deletion of data) conforming to one of the rules is detected. The file system monitors these rules for data events that conform to the rules and takes the defined actions when such data events are detected. The file system may search through data that is stored in the file system to detect data that such an event has occurred, and/or analyze data as it is accessed (e.g., by the same application defining the rule or a different application) to detect whether operations on data conform to one or more of the rules.

The Meta namespace 306 ("System.Storage.Meta") is used to define other schemas in file system namespace 206 (also referred to as the other namespaces in file system namespace 206). The Meta namespace 306 defines the overall schema or namespace of these other namespaces in namespace 206 in a form that allows querying (e.g., to allow applications to see what types have been installed as part of the file system). New types can be created by authoring a schema document (e.g., in an XML (eXtensible Markup Language) format, other markup language format, or other non-markup language format) and installing that schema document as part of the file system. For example, in certain embodiments the meta namespace 306 defines a type which may be called "type" and a type which may be called "property", with a relationship between the "type" type and the "property" type that indicates which properties are found with which types. By way of another example, certain embodiments define a type which may be called "schema" in the meta namespace 306, with a relationship between the "type" type and the "schema" type that indicates which types appear in which schemas (namespaces).

The Core namespace 308 ("System.Storage.Core") defines types that are regarded as being the core concepts behind the WinFS file system. The Core namespace 308 represents the core concepts that the operating system itself is expected to understand, and that are expected to be used by most other sub-namespaces 302-362. For example, in certain embodiments the Core namespace 308 defines the following seven types: message (an item that represents any of a variety of different kinds of messages, such as Email messages, fax messages, and so forth), document (an item that represents content that is authored), contact (an item that represents an entity that can be contacted by a human being), event (an item that records the occurrence of something in the environment), task (an item that represents work that is done at a particular point in time or repeatedly over time, or as a result of some event other than the passage of time), device (a logical structure that supports information processing capabilities), and location (an item that represents one physical or geographic space).

The Base namespace 310 ("System.Storage.Base") defines types that form the foundation of the WinFS file system. These are the types that are typically necessary in order for the file system to operate and support the other sub-namespaces 302-362. These types may be defined in namespace 310 ("System.Storage.Base"), or alternatively in file system namespace 206 ("System.Storage").

As illustrated in FIG. 3, several additional namespaces 312-362 are also included in file system 206 in addition to the synchronization namespace 302, notifications namespace 304, meta namespace 306, core namespace 308, and base namespace 310. Each of the additional namespaces 312-362 defines a collection of related functionality. The determination of which namespace 312-362 particular functionality is to be part of is made by considering at least how tightly tied the particular functionality is to other functionality already defined in the namespaces 312-362. Functionality that is tightly tied together is typically included in the same namespace.

Figure 4:
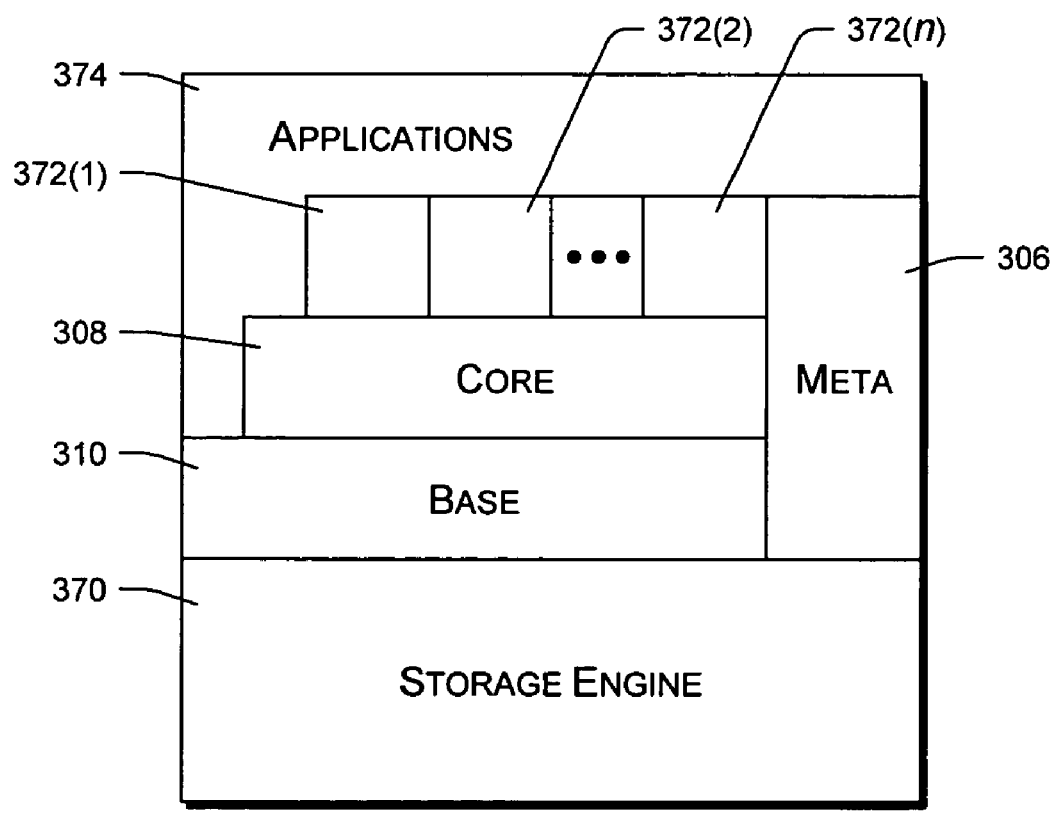
FIG. 4 is a block diagram of an example of the logical structure of namespaces.

An example of the logical structure of the namespaces 302-362 in file system namespace 206 can be seen in FIG. 4. Storage engine 370 provides the storage for the file system, and in certain embodiments storage engine 370 is a relational database. Base namespace 310 is situated on top of storage engine 370 along with any other types defined in file system namespace 206—this combination may also be referred to as the data model of the file system. Core namespace 308 is situated on top of base namespace 310, and one or more of the remaining namespaces 312-362 of FIG. 3 are situated on top of core namespace 308 (these namespaces are identified as namespaces 372(1), 372(2), . . . , 372(n) in FIG. 4). The Meta namespace 306 is situated to the side of namespaces 308, 310, and 372, as it is used to describe the types in those namespace 308, 310, and 372. One or more applications 374 sit on top of namespaces 372, and also on top of core namespace 308, base namespace 310, and meta namespace 306. Thus, applications 374 can access and define their own namespaces, building them on top of one or more of base namespace 310, core namespace 308, and namespaces 372.

Returning to FIG. 3, a discussion of the functionality defined in the namespaces 312-362 follows.

The Contacts (or Contact) namespace 312 ("System.Storage.Contacts" or "System.Storage.Contact") defines types representing entities that a human being can contact, such as people, groups, organizations, households, and so forth. The way in which such entities could be contacted can vary, such as by electronic mail address, phone number, chat address, postal address, and so forth.

The Documents (or Document) namespace 314 ("System.Storage.Documents" or "System.Storage.Document") defines document types that can be accessed and used by the other namespaces 302-362. These document types refer to different document formats that can be accessed and used. Some document types may be included by default in namespace 314, and application designers can extend these namespace 314 to include different document types of their own design and/or choosing.

The Media namespace 316 ("System.Storage.Media") defines base types used for audio, video, image, and other kinds of media. These base types are typically types that can be used by multiple kinds of media (e.g., both audio and video). These types can include, for example, types for meta data regarding the media (e.g., a history of actions taken with the media (e.g., whether it was edited, who it was sent to, etc.), a rating for the media, and so forth). Additional types specific to particular kinds of media are defined in the particular namespaces for those media (e.g., Audio namespace 318 and Video namespace 320).

The Audio namespace 318 ("System.Storage.Audio") defines types specific to audio media. These types can include, for example, types for meta data regarding audio media (e.g., artist name, album name, and so forth).

The Video namespace 320 ("System.Storage.Video") defines types specific to video media.

The Images (or Image) namespace 322 ("System.Storage.Images" or "System.Storage.Image") defines types specific to image media. The Images namespace 322 includes types used to represent different kinds of images, such as properties of file formats for presenting images (e.g., using the GIF, TIFF, JPEG, etc. formats), or properties that represent the semantic contents of a file (e.g., photographer, people in the image, etc.).

The Message (or Messages) namespace 324 ("System.Storage.Message" or "System.Storage.Messages") defines types used for any kind of message, such as Email messages, Fax messages, IM (instant messaging) messages, and so forth. These types are typically types that can be used by multiple kinds of media (e.g., both Email messages and IM messages). Additional types specific to particular kinds of messages are defined in the particular namespaces for those messages (e.g., Fax namespace 326 and Email (or Mail) namespace 328).

The Fax namespace 326 ("System.Storage.Fax") defines types specific to facsimile messages. These types can include, for example, types for details regarding transmission of facsimile messages.

The Email (or Mail) namespace 328 ("System.Storage.Email" or "System.Storage.Mail") defines types specific to electronic mail messages.

The Annotation (or Annotations) namespace 330 ("System.Storage.Annotation" or "System.Storage.Annotations") defines types used to annotate documents. An annotation describes additional information linked to one or more pieces of data. Examples of annotations include: a text bubble next to a paragraph, a highlight of some text, a margin-bar next to paragraphs, an audio comment, an ink-annotation of some text, and so forth. The Annotation namespace 330 allows different kinds of data to act as the annotation content, and provides a flexible mechanism to specify where the annotation is anchored. The annotation system can be, for example, the Common Annotation Framework (CAF)—additional details regarding the Common Annotation Framework (CAF) are available from Microsoft Corporation of Redmond, Wash.

The Note (or Notes) namespace 332 ("System.Storage.Notes" or "System.Storage.Note") defines types for items which are notes. These notes can be, for example, Microsoft® Windows® operating system Journal notes, electronic "sticky" notes, and so forth.

The Programs (or Program) namespace 334 ("System.Storage.Programs" or "System.Storage.Program") defines types that allow a database of programs that are installed in the system to be maintained. This database can then be accessed by, for example, the operating system or other applications and information regarding programs that are installed in the system can be obtained.

The Explorer namespace 336 ("System.Storage.Explorer") defines types that allow a history list for use with the operating system to be maintained and accessed. The history list is, for example, a record of actions taken by the user, such as a record of locations in the file system that have been accessed (e.g., a list of folders that have been opened as a user navigates through the file system looking for a file).

The NaturalUI (or NaturalUserInterface) namespace 338 ("System.Storage.NaturalUI" or "System.Storage.NaturalUserInterface") defines types used to support a natural language search engine. The types are used, for example, to store data regarding word equivalences, rules, and other aspects of natural language processing.

The ShellTask (or ShellTasks) namespace 340 ("System.Storage.ShellTask" or "System.Storage.ShellTasks") defines types used to provide lists of tasks in the user interface shell to let users know what actions they can perform as they navigate the user interface. The functionality of the ShellTask namespace 340 may alternatively be incorporated into the NaturalUI namespace 338.

The UserTask (or UserTasks) namespace 342 ("System.Storage.UserTask" or "System.Storage.UserTasks") defines types used to allow user tasks to be created and managed, including being delegated to others, accepted or rejected, modified, and so forth. The user tasks are tasks analogous to those often provided with personal information manager (PIM) applications, such as jobs to be performed, phone calls to make, projects to complete, items to purchase, and so forth. The types further allow relationships to be defined, such as a relationship between a user task and an event (the event that is supposed to initiate the task), a relationship between a user task and a message (the message that notifies or reminds the user of the task), a relationship between a user task and a person (such as the person that assigned the task, the person to which the task is assigned, and so forth).

The Help (or Assistance) namespace 344 ("System.Storage.Help" or "System.Storage.Assistance") defines types used to allow help information to be maintained and accessed. This help information can be displayed to the user (e.g., when requested by the user) to assist the user in performing various actions when using the system.

The Services (or Service) namespace 346 ("System.Storage.Services" or "System.Storage.Service") defines types that allow service endpoints to be maintained and accessed. These service endpoints allow users to use services on the local computing device or over a network, such as the Internet. For example, a service endpoint could identify a service that is to be used to allow the user to instant message another user of a different system, or chat with that other user.

The Locations (or Location) namespace 348 ("System.Storage.Locations" or "System.Storage.Location") defines types used to identify particular physical or geographic locations. These locations can be, for example, postal addresses or coordinates (e.g., latitude and longitude type information, Global Positioning System (GPS) coordinates, and so forth). The locations can be, for example, locations of contacts described using contacts namespace 312.

The Principals (or Principal) namespace 350 ("System.Storage.Principals" or "System.Storage.Principal") defines types used to maintain information regarding security principals. A security principal refers to anything in the system that can have access rights assigned to it (e.g., an item or a resource of the system). These types in the Principals namespace 350 allow security principals to be identified and allow the access rights for those security principals to be identified and assigned (e.g., identifying who or what has access to the security principal).

The Calendar (or Calendars) namespace 352 ("System.Storage.Calendar" or "System.Storage.Calendars") defines types used to maintain and access information regarding appointments and attendees. Appointments may include, for example, information regarding time, location, recurrence, reminders, attendees, and so forth, as well as title and message body. Appointment attendees may include, for example, email address, availability, and response (e.g., whether the attendee accepted or declined the appointment).

The Watcher namespace 354 ("System.Storage.Watcher") defines types used to allow the creation and management of event monitoring and resultant actions. These types allow an interest in the occurrence of some type of event to be registered, as well as an indication of what should occur if and when that event does occur. When the specified event occurs, the specified action is taken by the system.

The Interop namespace 356 ("System.Storage.Interop") defines a set of namespaces parallel to namespaces 306-354 and 358-362 containing classes used by non-managed consumers (consumers not writing to the Common Language Runtime). For example, a "System.Storage.Interop.Video" would contain the classes related to video media that could be called from unmanaged consumers. Alternatively, such classes could live in an "Interop" namespace nested below each of the namespaces 306-354 and 358-362. For example, classes related to video media that could be called from unmanaged consumers could be located in a "System.Storage.Video.Interop" namespace.

The Files (or File) namespace 358 ("System.Storage.Files" or "System.Storage.File") defines types used to maintain information regarding files stored in the file system. These types can include, for example, meta data or properties regarding files stored in the file system. Alternatively, these types may be defined in the file system namespace 206 (that is, in the System.Storage namespace).

The GameLibrary (or GameLibraries) namespace 360 ("System.Storage.GameLibrary" or "System.Storage.GameLibraries") defines types used to represent games that are installed in the system. These types can include, for example, meta data regarding games that are installed in the system, and types that allow querying so that applications can identify which games are installed in the system.

The CategoryHierarchy (CategoryHierarchies) namespace 362 ("System.Storage.CategoryHierarchy" or "System.Storage.CategoryHierarchies") defines types used to represent and navigate hierarchical category dictionaries.

Example Namespace Members

This section includes multiple tables describing the examples of members that may be exposed by example namespaces (e.g., namespace in file system namespace 206 of FIG. 2). These exposed members can include, for example, classes, interfaces, enumerations, and delegates. It is to be appreciated that the members described in these examples are only examples, and that alternatively other members may be exposed by the namespaces.

It should be appreciated that in some of namespace descriptions below, descriptions of certain classes, interfaces, enumerations and delegates are left blank. More complete descriptions of these classes, interfaces, enumerations and delegates can be found in the subject matter of the compact discs that store the SDK referenced above.

System.Storage

The following tables list examples of members exposed by the System.Storage namespace.

Classes

| | |
|---|---|
| AlreadyAssociatedWithItemException | object has already been associated with an ItemContext |
| AlreadyConstructedException | Encapsulates an exception for an attempt to instantiate an already instantiated object. |
| AlreadyExistsException | Exception thrown when trying to create a object that logically already exists |
| AlreadySubscribed Exception | Encapsulates an exception when a data class client attempted to subscribe to data change notification on a data class object it has already subscribed to. |
| AsyncException | Encapsulates an exception for any asynchronous operation failure. |
| AsyncResultException | Encapsulates an exception for errors encountered in the result set of an asynchronous query. |
| BackupOptions | Encapsulates the options available for backing up a item to a stream. |
| CannotDeleteNonEmptyFolderException | Folder to be deleted must be empty |
| CategoryRef | A Category reference Identity key. Every categoryNode has an identity key of type CategoryRef. When category refences are tagged onto an item, they are tagged as a link type where the Link.Target contains a CategoryRef. |
| CategoryRefCollection | A CategoryRef collection |
| CategoryRefEnumerator | A class for enumerating a CategoryRef collection |
| CategoryRefHolder | a class to hold CategoryRef objects |
| ChangeCollection | Encapsulates a colleciton of changes. |
| ClassNotRegisteredException | A CLR class not registered for COM-Interop |
| CommitOutOfOrdcrException | outer transaction cannot be committed before ending the inner transaction |
| ConnectionException | Encapsulates an exception as a result of connection failure in WinFS API. |
| ConstraintAttribute | Base class for constraint attributes. |
| Container | Encapsulates a container for holding other objects. |
| ContainerAttribute | |
| CyclicOwningLinksException | a cycle in the object links was detected |
| DateTimeRangeConstraintAttribute | Specifies a date range constraint on the associated property. |
| DecimalRangeConstraintAttribute | Specifies a decimal range constraint on the associated property. |
| DelayLoad | |
| DeleteErrorException | object deletion failed |
| Element | Base class for NestedElements |
| Extension | This is the type used as the basis for extensions. To establish an extension a new subtype of this type is defined. The extension may be added to an Item by creating an instance of the type and assigning it to the Extensions field of the Item to be extended. |
| ExtensionCollection | A Extension collection |
| ExtensionEnumerator | A class for enumerating a Extension collection |
| ExtensionHolder | a class to hold Extension objects |
| FieldAttribute | Defines the base class for a field attribute of an extended type. |
| Filter | Encapsulate a parsed search filter expression. |
| FilterException | Encapsulates an exception for an invalid filter expression used in a query. |
| FindOptions | Options used when executing a search. |
| FindResult | The FindResult class encapsulates a result set of query. |
| FindResultEnumerator | Defines the basic behaviors of a FindResultEnumerator object. |
| FindResultException | Encapsulates an exception for an error encountered in the result set of a query. |
| FloatRangeConstraintAttribute | Specifies a float range constraint on the associated property. |
| Folder | |
| FolderMembersRelutionship | |
| FolderMembersRelationshipCollection | |
| IdentityKey | |
| IdentityKeyCollection | A IdentityKey collection |
| IdentityKeyEnumerator | A class for enumerating a IdentityKey collection |
| IdentityKeyHolder | a class to hold IdentityKey objects |
| InternalErrorException | Encapsulates an exception for internal errors. |
| InvalidObjectException | Encapsulates an exception for an invalid object. |
| InvalidParameterException | InvalidParameterException. |
| InvalidPropertyNameException | Encapsulates an exception for an invliad property of a WinFS type specified in a filter expression. |
| InvalidSortingExpressionException | the sorting expression is not valid |
| InvalidSortingOrderException | the sorting order is invalid |
| InvalidTypeCastException | Encapsulates an exception for an invliad type cast specified in a filter expression. |
| Item | |
| ItemContext | An instance of the ItemContext class defines an item domain in which the owning "Longhorn" application operates to create, find, change, save and monitor items in the underlying "WinFS" store. |
| ItemContextNotOpenException | exception raised when an ItemContext has not been opened yet |
| ItemId | Item Id. |
| ItemIdReference | ItemId reference. |
| ItemName | ItemName represents the path name of an item |
| ItemNameCollection | An ItemNameCollection contains all the item names for an item |
| ItemNameEnumerator | An ItemNameEnumerator allows enumerating an ItemNameCollection |
| ItemNotFoundException | item was not found |
| ItemPathReference | Item path reference. |
| ItemReference | Item reference. |
| ItemSearcher | Item searcher. |

-continued

| | |
|---|---|
| Link | |
| LinkCollection | A Link collection |
| LinkEnumerator | A class for enumerating a Link collection |
| LinkHolder | a class to hold Link objects |
| LinkRelationshipAttribute | Represents a link relationship attribute. |
| MaxLengthConstraintAttribute | Specifies a maximum length constraint on the associated property |
| MemberNotFoundException | a member was not found in the collection |
| MultipleHoldingLinksException | a newly created item can only have one holding link before it is saved to the store |
| MultipleObjectsFoundException | multiple objects were found while only one was expected |
| NestedAttribute | Encapsulates an attribute of a type nested in an extended type. |
| NestedCollection | A collection for holding nested elements of an item. |
| NestedElement | |
| NestedElementHolder | |
| NestedElementInMultipleHoldersException | nested element can only be in one parent element or item |
| Nested Enumerator | Encapsulates an enumerator of a nested collection so that the collection can be enumerated using the foreach . . . construct. |
| NoOwningElementException | a nested element does not have an owning element, nested elemented must be kept within an item |
| NoOwningLinkException | An item does not have an owning link. In WinFS, evert item must have an owning (holding) link |
| NoRelationshipException | Encapsulates an exception when a relationship specified in a filter expression cannot be found. |
| NotAssociatedWithContextException | Encapsulates an exception when an operation of data class object not associated with an ItemContext instance is attempted in a WinFS store. |
| NotConstructedException | Encapsulates an exception for an attempt to close an already closed or never instanted object. |
| NotificationException | Encapsulates an exception for a fail condition associated with data change notifications. |
| NoTypeMappingException | Encapsulates an exception when a WinFS type specified in a query expression is not specified in the loaded type mappings. |
| NullableConstraintAttribute | Specifies whether a property marked with this attribute is nullable or not. |
| NullPropertyValueException | null value is not allowed for given property |
| ObjectCollection | Used to delay load objects from the database. A field that is a collection and is delay loadable uses this class as a proxy. The real objects will be fetched on demand. |
| ObjectConversionException | cannot convert from one data type to another |
| ObjectException | Encapsulates an exception for an invalid object. |
| ObjectHolder | Used to delay load objects from the database. A field that is delay loadable uses this class as a proxy. The real object will be fetched on demand. |
| OutstandingTransactionException | the ItemContext still has outstanding transaction |
| OwnerNotSavedException | the owner of the object has not been saved yet. |
| Parameter | Represents a parameter name and value. |
| ParameterCollection | A collection of parameter name/value pairs. |
| PrecisionAndScaleConstraintAttribute | This attribute specifies a precision and scale constraint on the associated property. |
| ProjectionOption | Defines a field that is projected into the search result. |
| PropertyConstraintException | property constaint violation |
| PropertyException | Encapsulates an exception for an invalid property. |
| Query | Encapsulates a query consisting of the object type, filter string, sorting directives, and dependent object set. |
| RecycleBinLink | |
| RecvcleBinLinkCollection | A RecycleBinLink collection |
| RecycleBinLinkEnumerator | A class for enumerating a RecycleBinLink collection |
| RecycleBinLinkHolder | a class to hold RecycleBinLink objects |
| Relationship | Base Relationship class. |
| RelationshipId | Relationship Id. |
| RestoreOptions | Encapsulates the options for restoring an item from a stream. |
| RootItemBase | The base class of all the item data classes. |
| ScalarAttribute | Encapsulates a scalar attribute of an extended type. |
| SearcherException | SearcherException. |
| SearchExpression | Expression used in a search. |
| SearchExpressionCollection | A collection of SearchExpression. |
| SearchProtection | Contains the results of a search projection. |
| SetChangedEventArgs | Encapsulates the arguments passed to the SetChangedHandler delegate. |
| Share | |
| SortingException | Encapsulates an exception for invalid sort primitive specified in a query. |
| SortOption | Specifies sorting options used in a search. |
| SortOptionCollection | A collection of sort option objects. |
| Span | Encapsulates an object dependancy. |
| StorageException | The base class of all exceptions thrown by the WinFS API. |
| Store | |
| StoreObject | Abstract base class used by "WinFS" data classes |
| SubscriptionFailException | Encapsulates an exception for a failed attempt to subscribe to data change notification. |
| Transaction | Encapsulates a transaction. |
| TransactionAlreadyCommittedOrRolledBackException | A transaction has already been committed or rolled back |
| TransactionException | Encapsulates an exception for errors encountered in a transactional operation. |
| TypeAtrribute | Encapsulate of an attribute of an extended "WinFS" type. |
| UnsubscriptionFailException | Encapsulates an exception for a failed attempt to unsubscribe to data change notification. |
| UpdateException | Encapsulates an exception for errors encountered in an Update operation. |
| Util | Various utilities used by the "WinFS" API |

-continued

| | |
|---|---|
| VirtualRelationshipCollection | |
| Volume | |
| VolumeCollection | A Volume collection |
| VolumeEnumerator | A class for enumerating a Volume collection |
| VolumeHolder | a class to hold Volume objects |
| Interfaces | |
| ICategoryRefCollection | An interface representing a CategoryRef collection |
| ICategoryRefEnumerator | interface representing a class for enumerating a CategoryRef collection |
| IChangeManager | To be obsoleted. |
| ICollectionBase | Defines the basic common behaviors of an implementing collection classes. |
| IDataClass | This interface declares a set of standard methods that all data classes must implement. |
| IElementBase | This interface defines some basic behaviors to be implemented by all element data classes. |
| IEnumeratorBase | Defines the basic common behaviors of the implementing enumerator classes. |
| IExtensionCollection | An interface representing a Extension collection |
| IExtensionEnumerator | interface representing a class for enumerating a Extension collection |
| IIdentityKeyCollection | An interface representing a IdentityKey collection |
| IIdentityKeyEnumerator | interface representing a class for enumerating a IdentityKey collection |
| IItemBase | This interface defines the common behavior of all the item-based data classes. |
| ILinkCollection | An interface representing a Link collection interface representing a class for enumerating a Link collection |
| ILinkEnumerator | |
| INestedBase | This interface defines the common behaviors of nested element classes. |
| IRecycleBinLinkCollection | An interface representing a RecycleBinLink collection |
| IRecycleBinLinkEnumerator | interface representing a class for enumerating a RecycleBinLink collection |
| IVolumeCollection | An interface representing a Volume collection |
| IVolumeEnumerator | interface representing a class for enumerating a Volume collection |
| Enumerations | |
| EventType | Called by system.storage.schemas.dll. |
| LinkRelationshipPart | Defines parts of a link relationship. |
| RangeConstraintType | Species if a range constraint is constrained by min value, max value, or both. |
| SetChangedEventType | This enumeration specifies the types of events in which a set changes. |
| SortOrder | Specifies the sort order used in a SortOption object. |
| Delegates | |
| SetChangedHandler | Event handler for set changed events. |

System.Storage.Annotation

The following tables list examples of members exposed by the System.Storage.Annotation namespace.

| Classes | |
|---|---|
| Annotation | Typically an annotation is anchored in some context (e.g. the paragraph of some text) and contains some cargo (e.g. a text comment). Sometimes an annotation expresses the relationship between multiple contexts (e.g. a comment that two paragraphs should be reordered). |
| AnnotatorRelationship | |
| AnnotatorRelationship-Collection | |
| Content | The Content type represents literal information, e.g. TextContent, XMLContent, Highlight, InkContent, etc . . . The content data must adhere to the XSD type in the given namespace URI. |
| ContentCollection | A Content collection |
| ContentEnumerator | A class for enumerating a Content collection |
| ContentHolder | a class to hold Content objects |
| Locator | A Locator describes the location or the identification of a particular datum. A Locator contains an ordered collection of LocatorParts. Applying each LocatorPart successively against an initial context will resolve into the particular datum. For example: a Locator could have two LocatorParts, the first specifying a "WinFS" item that is an image, and the second specifying a graphical region. If a Locator has a Range, its Locators are applied after all original LocatorParts have been resolved. |
| LocatorCollection | A Locator collection |
| LocatorEnumerator | A class for enumerating a Locator collection |
| LocatorHolder | a class to hold Locator objects |
| LocatorPart | Each LocatorPart describes location or identification of some information in some implied context. Examples for LocatorPart are: a reference to a "WinFS" item, the URI of some document, a marker ID, a text offset. The data for a LocatorPart must conform to the Xsi Type defined in the specified namespace. |
| LocatorPartCollection | A LocatorPart collection |
| LocatorPartEnumerator | A class for enumerating a LocatorPart collection |
| LocatorPartHolder | a class to hold LocatorPart objects |
| RangePart | The type RangePart describes the location or the identificatio of a range of some information. It is composed of two Locators. |
| RangePartCollection | A RangePart collection |
| RangePartEnumerator | A class for enumerating a RangePart collection |
| RangePartHolder | a class to hold RangePart objects |
| Resource | A Resource groups identification, location, and content of some information. It is used for expressing contexts as well as cargo. This enables a context to cache the underlying data the annotation is anchored to (in addition to storing a reference to the underlying data), and it allows the cargo to be literal content, or a reference to already existing data, or both. |
| ResourceCollection | A Resource collection |
| ResourceEnumerator | A class for enumerating a Resource collection |

-continued

| | |
|---|---|
| ResourceHolder Interfaces | a class to hold Resource objects |
| IContentCollection | An interface representing a Content collection interface representing a class for enumerating a Content collection |
| IContentEnumerator | |
| ILocatorCollection | An interface representing a Locator collection interface representing a class for enumerating a Locator collection |
| ILocatorEnumerator | |
| ILocatorPartCollection | An interface representing a LocatorPart collection |
| ILocatorPartEnumerator | interface representing a class for enumerating a LocatorPart collection |
| IRangePartCollection | An interface representing a RangePart collection |
| IRangePart Enumerator | interface representing a class for enumerating a RangePart collection |
| IResourceCollection | An interface representing a Resource collection |
| IResourceEnumerator | interface representing a class for enumerating a Resource collection |

System.Storage.Annotation.Interop

The following table lists examples of members exposed by the System.Storage.Annotation.Interop namespace.

| Interfaces | |
|---|---|
| IAnnotation | Typically an annotation is anchored in some context (e.g. the paragraph of some text) and contains some cargo (e.g. a text comment). Sometimes an annotation expresses the relationship between multiple contexts (e.g. a comment that two paragraphs should be reordered). |
| IContent | The Content type represents literal information, e.g. TextContent, XMLContent, Highlight, InkContent, etc . . . The content data must adhere to the XSD type in the given namespace URL |
| ILocator | A Locator deseribes the location or the identification of a particular datum. A Locator contains an ordered collection of LocatorParts. Applying each LocatorPart successively against an initial context will resolve into the particular datum. For example: a Locator could have two LocatorParts, the first specifying a "WinFS" item that is an image, and the second specifying a graphical region. If a Locator has a Range, its Locators are applied after all original LocatorParts have been resolved. |
| ILocatorPart | Each LocatorPart describes location or identification of some information in some implied context. Examples for LocatorPart are: a reference to a "WinFS" item, the URI of some document, a marker ID, a text offset. The data for a LocatorPart must conform to the Xsi Type defined in the specified namespace. |
| IRangePart | The type RangePart deseribes the location or the identificatio of a range of some information. It is composed of two Locators. |
| IResource | A Resource groups identification, location, and content of some information. It is used for expressing contexts as well as cargo. This enables a context to cache the underlying data the annotation is anchored to (in addition to storing areference to the underlying data), and it allows the cargo to be literal content, or a reference to already existing data, or both. |

System.Storage.Audio

The following tables list examples of members exposed by the System.Storage.Audio namespace.
Classes

| Classes | |
|---|---|
| Album | The type Audio.Album represents an audio album which may contain several tracks. |
| AlbumLink | This type represents a link from Track to Album that this track belongs to. |
| AlbumLinkCollection | A AlbumLink collection |
| AlbumLinkEnumerator | A class for enumerating a AlbumLink collection |
| AlbumLinkHolder | a class to hold AlbumLink objects |
| AutoDJ | |
| AutoDJCollection | A AutoDJ collection |
| AutoDJEnumerator | A class for enumerating a AutoDJ collection |
| AutoDJHolder | a class to hold AutoDJ objects |
| BaseTrack | The type Audio.BaseTrack represents metadata for an audio track. |
| LocationReference | LocationReference type represents a link to a Location item. It may be dangling, in which case the fields on this type specify the location coordinates. |
| LocationReferenceCollection | A LocationReference collection |
| LocationReferenceEnumerator | A class for enumerating a LocationReference collection |
| LocationReferenceHolder | a class to hold LocationReference objects |
| MetadataLink | This type represents a link from PhysicalTrack to TrackMetadata. |
| MetadataLinkCollection | A MetadataLink collection |
| MetadataLinkEnumerator | A class for enumerating a MetadataLink collection |
| MetadataLinkHolder | a class to hold MetadataLink objects |
| PhysicalTrack | The type Audio.PlatterTrack represents an audio track for which the actual audio data is not stored in "WinFS". The Audio bits themselves are still on a CD or another external storage. |
| PlatterTrack | The type Audio. PlatterTrack represents an audio track for which the actual audio data is not stored in "WinFS". The Audio bits themselves are still on a CD or another external storage. |
| PlayList | The type Audio.PlayList represents an audio playlist. |
| RadioStation | RadioStation type represents a radio station that may provide streams of radio. |
| RadioStream | RadioStream type represents a radio stream that a radio station provides, it is intended to be an embedded item in the RadioStation item. |
| Track | The type Audio.Track represents an audio track that has the actual music data in it. It may correspond to a track that has been ripped from a CD, or otherwise completely stored in "WinFS". |
| TrackMetadata | The type Audio.TrackMetadata contains computed or downloaded metadata for physical tracks. |

| Interfaces | |
|---|---|
| IAlbumLinkCollection | An interface representing a AlbumLink collection |
| IAlbumLinkEnumerator | interface representing a class for enumerating a AlbumLink collection |
| IAutoDJCollection | An interface representing a AutoDJ collection |
| IAutoDJEnumerator | interface representing a class for enumerating a AutoDJ collection |
| ILocationReferenceCollection | An interface representing a LocationReference collection |
| ILocationReferenceEnumerator | interface representing a class for enumerating a LocationReference collection |
| IMetadataLinkCollection | An interface representing a MetadataLink collection |
| IMetadataLinkEnumerator | interface representing a class for enumerating a MetadataLink collection |

System.Storage.Audio.Interop

The following table lists examples of members exposed by the System.Storage.Audio.Interop namespace.

Interfaces

| | |
|---|---|
| IAlbum | The type Audio.Album represents an audio album which may contain several tracks. |
| IAlbumLink | This type represents a link from Track to Album that this track belongs to. |
| IAutoDJ | |
| IBaseTrack | The type Audio. BaseTrack represents metadata for an audio track. |
| ILocation-Reference | LocationReference type represents a link to a Location item. It may be dangling, in which case the fields on this type specify the location coordinates. |
| IMetadata-Link | This type represents a link from PhysicalTrack to TrackMetadata. |
| IPhysical-Track | The type Audio.PlatterTrack represents an audio track for which the actual audio data is not stored in "WinFS". The Audio bits themselves are still on a CD or another external storage. |
| IPlatterTrack | The type Audio.PlatterTrack represents an audio track for which the actual audio data is not stored in "WinFS". The Audio bits themselves are still on a CD or another external storage. |
| IPlayList | The type Audio.PlayList represents an audio playlist. |
| IRadioStation | RadioStation type represents a radio station that may provide streams of radio. |
| IRadioStream | RadioStream type represents a radio stream that a radio station provides, it is intended to be an embedded item in the RadioStation item. |
| ITrack | The type Audio.Track represents an audio track that has the actual music data in it. It may correspond to a track that has been ripped from a CD, or otherwise completely stored in "WinFS". |
| ITrack-Metadata | The type Audio.TrackMetadata contains computed or downloaded metadata for physical tracks. |

System.Storage.Contact

The following tables list examples of members exposed by the System.Storage.Contact namespace.

Classes

| | |
|---|---|
| Accreditation | A wrapper around scalar string to support multi-valued strings. |
| AccreditationCollection | A Accreditation collection |
| AccreditationEnumerator | A class for enumerating a Accreditation collection |
| AccreditationHolder | a class to hold Accreditation objects |
| ChildData | Pointer to any COntacts that are children of a Person |
| ChildDataCollection | A ChildData collection |
| ChildDataEnumerator | A class for enumerating a ChildData collection |
| ChildDataHolder | a class to hold ChildData objects |
| EmployeeData | The organization link native to employeedata is the link to the organization that employs the Person, or the employer. This might not be the same organization as the one for which the Person directly works. Example: The employee gets a paycheck from Bank of America. The employee actually works at the Seattle Branch #657. Both are listed as organizations as there can be multiple employees, but they are independent concepts. |
| EmployeeDataCollection | A EmployeeData collection |
| EmployeeDataEnumerator | A class for enumerating a EmployeeData collection |
| EmployeeDataHolder | a class to hold EmployeeData objects |
| EmployeeOfRelationship | |
| EmployeeOfRelationship- | |
| Collection | |
| FullName | The fullname set associated with Person.PersonalNames. There can be one or many of these, but it is assumed that if the contact exists, it has at least one name. Names are classified by the user with the Item.Categories field, which is not shown in this definition, but which is part of the combined view for Person. Classifications for names may include Gamer names, professional and personal names. Names may represent "contextual views" on the Person. One of the classifications might be a special-cased (e.g. IsDefault) indicating that this is the default name. There may be one and only one FUllName marked in this way. The Person.DisplayName value is computed using the FullName.DisplayName value of the Default Fullname. The default category should be manipulated by the application and not the user (e.g. check box) so that default should not appear in the classification section of any UI. The first fullname entered should be set to default, otherwise there will be no Person.DisplayName value |
| FullNameCollection | A FullName collection |
| FullNameEnumerator | A class for enumerating a FullName collection |
| FullNameHolder | a class to hold FullName objects |
| GeneralCategories | partial Contact.GeneralCategories class used to list standard category keys |
| Group | Describes the features of a basic group. This type can be extended by specific group providers to incorporate information required for their group type. The friendly name of the group is taken from the group.DisplayName which is inherited. |
| GroupMembership | GroupMembership contains the references to members of a particular group. This is a link type between Person and Group. Group is the owning side of the link. Being derived from NestedElement, there is an inherited categories field that contains any number of classifications associated with this group member. |
| GroupMembershipCollection | A GroupMembership collection |
| GroupMembershipEnumerator | A class for enumerating a GroupMembership collection |
| GroupMembershipHolder | a class to hold GroupMembership objects |
| Household | A household is a set of individuals who all live in the same house. Note that household does not imply family. for example, a group of roommates form a household but not a family. |
| HouseholdMemberData | The actual references to household membership |
| HouseholdMemberData-Collection | A HouseholdMemberData collection |
| HouseholdMemberData-Enumerator | A class for enumerating a HouseholdMemberData collection |
| HouseholdMemberDataHolder | a class to hold HouseholdMemberData objects |
| InstantMessagingAddress | The Presences representation of any EAddress.AccessPoint where the Eaddress.ServiceType = "IM". This allows the application to quickly find all of the presence status' for a given IM address |
| InstantMessagingAddress-Collection | A InstantMessagingAddress collection |
| InstantMessagingAddress-Enumerator | A class for enumerating a InstantMessagingAddress collection |

| | |
|---|---|
| InstantMessagingAddress-Holder | a class to hold InstantMessagingAddress objects |
| LocalMachineDataFolder | Used to hold machine profile information. This can be transferred with contacts when contacts are backed up or turned into a portable profile. It indicates where the contacts came from when it is not the local machine. It also contains machine wide information, such as EVERYONE, ADMINISTRATOR, etc. security groups. |
| MemberOfGroupsRelationship | |
| MemberOfGroupsRelationship Collection | |
| Organization | The organization information that may be associated with employeedata as the employer, the department within the employer's organization or be a stand alone entity. The friendly or display name for the organization is inherited. |
| Person | Information specific to a Person, where a Person references one and only one real world person Note that there is an explicit ExpirationDate rather than using the Item.EndDate. It is unclear whether or not the Person should be removed from the system based upon the Item.EndDate, but the notion here is that the EndDate may simply be used to indicate that the Person is no longer an active contact rather than one that should be removed upon reaching a certain date. The expirationdate is explicitly to be used to remove unwanted contacts. |
| PresenceService | Service that is able to provide presence information. |
| SecurityID | The user's Local SID |
| SecurityIDCollection | A SecurityID collection |
| SecurityIDEnumerator | A class for enumerating a SecurityID collection |
| SecurityIDHolder | a class to hold SecurityID objects |
| SmtpEmailAddress | SMTPEmail is derived from eaddress and schematizes only one of several different types of possible email. The purpose in schematizing SMTP email is to allow users to search/query on the domain value just as they can query on postal code or area code. SMTP is probably the most common of the email address types available on the internet. Schematization requires parsing the Eaddress. AccessPoint string into the appropriate components. For example, if EAddress.AccessPoint ="blacknight@earthlink.net" then SMTPEmail Address.username="black night" and SMTPEmailAddress.domain= "earthlink.net" |
| SmtpEmailAddressCollection | A SmtpEmailAddress collection |
| SmtpEmailAddressEnumerator | A class for enumerating a SmtpEmailAddress collection |
| SmtpEmailAddressHolder | a class to hold SmtpEmailAddress objects |
| SpouseData | Pointer to a Contact that is a spouse of a Person |
| SpouseDataCollection | A SpouseData collection |
| SpouseDataEnumerator | A class for enumerating a SpouseData collection |
| SpouseDataHolder | a class to hold SpouseData objects |
| TelephoneNumber | The schematized AccessPoint instance value using the AccessPoint template when the EAddress.ServiceType is one of the category type telephone. The purpose is to allow the user to quickly query for all numbers within a country code or an area code. |
| TelephoneNumberCollection | A TelephoneNumber collection |
| TelephoneNumberEnumerator | A class for enumerating a TelephoneNumber collection |
| TelephoneNumberHolder | a class to hold TelephoneNumber objects |
| Template | A Template is a pre-set format for a particular Type that may be surface in the UI as a input mask or used by an application or API as a validation requirement. Templates allow for the fact that many element types have one or more known and expected formats. Data entered that does not meet one of these templates can cause applications and/or processes to break. Any type, however, might support multiple templates. For instance, a phone number might legitimately take the form of either 1-800-FLOWERS or 1-800-356-9377. Both are representative of a phone number. Understanding the template associated with the specific instance is also a boon when translating the value in the UI. For example, an application being executed on a "Longhorn" device in a country where letters are not typically available on phones might need to translate the phone number stored using the Template N-NNN-AAAAAAA before rendering. The template may be exposed to the user for selection or may be selected by the application itself. |
| UserDataFolder | Specialized folder representing information that belongs only to this user, e.g., ..\dejans\documents. There is one per user on a machine. The PersonalContacts virtual folder is rooted to this folder, as are temporary and MFU folders. |
| WeblogAddress | WeblogAddress is a user's weblog, or "homepage", address. |
| WeblogAddressCollection | A WeblogAddress collection |
| WeblogAddressEnumerator | A class for enumerating a WeblogAddress collection |
| WebloeAddressHoIder | a class to hold WeblogAddress objects |
| WellKnownFolder | Meant to be the base class for any specialized sub folder that contains well understood information, i.e., any folder that is known in the system - such as userdatafolder, temporary folders, MRU folders, etc. This would include such virtual folders as "temporary", "MFU/MRU", etc. The folder types indicate how the folder is used and acted upon. For instance, Temporary and MFU folder contents are not exposed as Contacts in MyContacts. |
| WindowsPresence | General IM presence shown in the Shell. Presence provider can be MSN, Exchange, Yahoo, etc. |
| WindowsPresenceCollection | A WindowsPresence collection |
| WindowsPresenceEnumerator | A class for enumerating a WindowsPresence collection |
| WindowsPresenceHolder | a class to hold WindowsPresence objects |
| Interfaces | |
| IAccreditationCollection | An interface representing a Accreditation collection |
| IAccreditationEnumerator | interface representing a class for enumerating a Accreditation collection |
| IChildDataCollection | An interface representing a ChildData collection |
| IChildDataEnumerator | interface representing a class for enumerating a ChildData collection |

| | |
|---|---|
| IEmployeeDataCollection | An interface representing a EmployeeData collection |
| IEmployeeDataEnumerator | interface representing a class for enumerating a EmployeeData collection |
| IFullNameCollection | An interface representing a FullName collection |
| IFullNameEnumerator | interface representing a class for enumerating a FullName collection |
| IGroupMembershipCollection | An interface representing a GroupMembership collection |
| IGroupMembershipEnumerator | interface representing a class for enumerating a GroupMembership collection |
| IHouseholdMemberData-Collection | An interface representing a HouseholdMemberData collection |
| IHouseholdMemberData-Enumerator | interface representing a class for enumerating a HouseholdMemberData collection |
| IInstantMessagingAddress-Collection | An interface representing a InstantMessagingAddress collection |
| IInstantMessagingAddress-Enumerator | interface representing a class for enumerating a InstantMessagingAddress collection |
| ISecurityIDCollection | An interface representing a SecurityID collection |
| ISecurityIDEnumerator | interface representing a class for enumerating a SecurityID collection |
| ISmtpEmailAddressCollection | An interface representing a SmtpEmailAddress collection |
| ISmtpEmailAddressEnumerator | interface representing a class for enumerating a SmtpEmailAddress collection |
| ISpouseDataCollection | An interface representing a SpouseData collection |
| ISpouseDataEnumerator | interface representing a class for enumerating a SpouseData collection |
| ITelephoneNumberCollection | An interface representing a TelephoneNumber collection |
| ITelephoneNumberEnumerator | interface representing a class for enumerating a TelephoneNumber collection |
| IWeblogAddressCollection | An interface representing a WeblogAddress collection |
| IWeblogAddressEnumerator | interface representing a class for enumerating a WeblogAddress collection |
| IWindowsPresenceCollection | An interface representing a WindowsPresence collection |
| IWindowsPresenceEnumerator | interface representing a class for enumerating a WindowsPresence collection |
| Enumerations | |
| WindowsPresenceStatus | |

System.Storage.Contact.Interop

The following table lists examples of members exposed by the System.Storage.Contact.Interop namespace.

| | |
|---|---|
| Interfaces | |
| IAccreditation | A wrapper around scalar string to support multi-valued strings. |
| IChildData | Pointer to any COntacts that are children of a Person |
| IEmployeeData | The organization link native to employeedata is the link to the organization that employs the Person, or the employer. This might not be the same organization as the one for which the Person directly works. Example: The employee gets a paycheck from Bank of America. The employee actually works at the Seattle Branch #657. Both are listed as organizations as there can be multiple employees, but they are independent concepts. |
| IFullName | The fullname set associated with Person.PersonalNames. There can be one or many of these, but it is assumed that if the contact exists, it has at least one name. Names are classified by the user with the Item.Categories field, which is not shown in this definition, but which is part of the combined view for Person. Classifications for names may include Gamer names, professional and personal names. Names may represent "contextual views" on the Person. One of the classifications might be a special-cased (e.g. IsDefault) indicating that this is the default name. There may be one and only one FUllName marked in this way. The Person.DisplayName value is computed using the FullName.DisplayName value of the Default Fullname. The default category should be manipulated by the application and not the user (e.g. check box) so that default should not appear in the classification section of any UI. The first fullname entered should be set to default, otherwise there will be no Person.DisplayName value |
| IGroup | Describes the features of a basic group. This type can be extended by specific group providers to incorporate information required for their group type. The friendly name of the group is taken from the group.DisplayName which is inherited. |
| IGroupMembership | GroupMembership contains the references to members of a particular group. This is a link type between Person and Group. Group is the owning side of the link. Being derived from NestedElement, there is an inherited categories field that contains any number of classifications associated with this group member. |
| IHousehold | A household is a set of individuals who all live in the same house. Note that household does not imply family, for example, a group of roommates form a household but not a family. |
| IHouseholdMemberData | The actual references to household membership |
| IInstantMessaging-Address | The Presences representation of any EAddress.AccessPoint where the Eaddress.ServiceType = "IM". This allows the application to quickly find all of the presence status' for a given IM address |
| ILocalMachineData-Folder | Used to hold machine profile information. This can be transferred with contacts when contacts are backed up or turned into a portable profile. It indicates where the contacts came from when it is not the local machine. It also contains machine wide information, such as EVERYONE, ADMINISTRATOR, etc. security groups. |
| IOrganization | The organization information that may be associated with employeedata as the employer, the department within the employer's organization or be a stand alone entity. The friendly or display name for the organization is inherited. |
| IPerson | Information specific to a Person, where a Person references one and only one real world person Note that there is an explicit ExpirationDate rather than using the Item.EndDate. It is unclear whether or not the Person should be removed from the system based upon the Item.EndDate, but the notion here is that the EndDate may simply be used to indicate that the Person is no longer an active contact rather than one that should be removed upon reaching a certain date. The |

| Interfaces | |
|---|---|
| | expirationdate is explicitly to be used to remove unwanted contacts. |
| IPresenceService | Service that is able to provide presence information. |
| ISecurityID | The user's Local SID |
| ISecurityIDCustom | |
| ISmtpEmail Address | SMTPEmail is derived from eaddress and schematizes only one of several different types of possible email. The purpose in schematizing SMTP email is to allow users to search/query on the domain value, just as they can query on postal code or area code. SMTP is probably the most common of the email address types available on the internet. Schematization requires parsing the Eaddress.AccessPoint string into the appropriate components. For example, if EAddress.AccessPoint = "blacknight@earthlink.net" then SMTPEmailAddress.username="blacknight" and SMTPEmailAddress.domain="earthlink.net" |
| ISmtpEmailAddress-Custom | |
| ISpouseData | Pointer to a Contact that is a spouse of a Person |
| ITelephoneNumber | The schematized AccessPoint instance value using the AccessPoint template when the EAddress.ServiceType is one of the category type telephone. The purpose is to allow the user to quickly query for all numbers within a country code or an area code. |
| ITemplate | A Template is a pre-set format for a particular Type that may be surface in the UI as a input mask or used by an application or API as a validation requirement. Templates allow for the fact that many element types have one or more known and expected formats. Data entered that does not meet one of these templates can cause applications and/or processes to break. Any type, however, might support multiple templates. For instance, a phone number might legitimately take the form of either 1-800-FLOWERS or 1-800-356-9377. Both are representative of a phone number. Understanding the template associated with the specific instance is also a boon when translating the value in the UI. For example, an application being executed on a "Longhorn" device in a country where letters are not typically available on phones might need to translate the phone number stored using the Template N-NNN-AAAAAAA before rendering. The template may be exposed to the user for selection or may be selected by the application itself. |
| IUserDataFolder | Specialized folder representing information that belongs only to this user, e.g., ..\dejans\documents. There is one per user on a machine. The PersonalContacts virtual folder is rooted to this folder, as are temporary and MFU folders. |
| IWeblogAddress | Weblog Address is a user's weblog, or "homepage", address. |
| IWellKnownFolder | Meant to be the base class for any specialized sub folder that contains well understood information, i.e., any folder that is known in the system - such as userdatafolder, temporary folders, MRU folders, etc. This would include such virtual folders as "temporary", "MFU/MRU", etc. The folder types indicate how the folder is used and acted upon. For instance, Temporary and MFU folder contents are not exposed as Contacts in MyContacts. |
| IWindowsPresence | General IM presence shown in the Shell. Presence provider can be MSN, Exchange, Yahoo, etc. |

System.Storage.Core

The following tables list examples of members exposed by the System.Storage.Core namespace.

| Classes | |
|---|---|
| Address | Address represents an address for contacting or a Contact via postal mail, or an indoor/outdoor location in the Location object. |
| AddressCollection | A Address collection |
| AddressEnumerator | A class for enumerating a Address collection |
| AddressHolder | a class to hold Address objects |
| ADSynchronization | Synchronization parameters. |
| ADSynchronizationCollection | A ADSynchronization collection |
| ADSynchronization-Enumerator | A class for enumerating a ADSynchronization collection |
| ADSynchronizationHolder | a class to hold ADSynchronization objects |
| Author | A link to person or company who is an author (or a co-author in case of multiple authors) |
| AuthorCollection | A Author collection |
| AuthorEnumerator | A class for enumerating a Author collection |
| AuthorHolder | a class to hold Author objects |
| AuthorRelationship | |
| AuthorRelationshipCollection | |
| BasicPresence | It is expected that BasicPresence will be extended. For example, supporting IRC (Internet Relay Chat) presence. An example of an IRCPresence is. - DonH = IdentityKey - editing some.xls = IRCPresence (what is involved is given by IRCPresence) - on some machine = eAddress (where Don is presently editing the XLS is given by eAddress) |
| BasicPresenceCollection | A BasicPresence collection |
| BasicPresenceEnumerator | A class for enumerating a BasicPresence collection |
| BasicPresenceHolder | a class to hold BasicPresence objects |
| CalendarEvent | |
| CalendarEventCollection | A CalendarEvent collection |
| CalendarEventEnumerator | A class for enumerating a CalendarEvent collection |
| CalendarEventHolder | a class to hold CalendarEvent objects |
| CategorizedNestedElement | A nested Element with categories field. |
| Category | This represents the valid categories known to the current system. Categories (also known as taxonomies) include such things as the type values for eAddresses. |
| CategoryKeyword | Keyword used for categorizing/grouping an item. |
| CategoryKeywordCollection | A CategoryKeyword collection |
| CategoryKeywordEnumerator | A class for enumerating a CategoryKeyword collection |
| CategoryKeywordHolder | a class to hold CategoryKeyword objects |
| Commodity | An identifiable thing that has value - this includes inanimate objects such as cars, houses, or furniture and animate objects such as pets or livestock. |
| CommodityOwner-Relationship | |
| CommodityOwner-RelationshipCollection | |
| ComponentRelationship | |
| ComponentRelationship-Collection | |
| Computer | |
| Contact | |
| Date | This type represents a Date that can be used on a document. |
| DateCollection | A Date collection |
| DateEnumerator | A class for enumerating a Date collection |
| DateHolder | a class to hold Date objects |
| Device | A Device is a logical structure that supports information processing capabilities, for example a display device |

| | |
|---|---|
| | can translate a bit stream into images, a disk drive can store and retrieve bit streams, a keyboard can translate keystrokes into appropriate codes, a radio can select signal streams and translate them into sound. |
| Document | Document is an Item that represents content that is authored, can be rendered and needs to be stored. |
| EAddress | An eAddress is essentially a routing address, i.e., an electronic way of getting in touch with a person. Types of eAddresses include o Email address o Phone number o WebSite o FTP Site o InternetFreebusy Location o Netmeeting settings. eAddresses may be published to allow someone to contact me - for example, I tell someone my phone number or email address. This contrasts with IdentityKeys, which are used to obtain information about someone - for example, if I want to keep someone's address information synchronised and up to date, they will have to give me an IdentityKey that I can use to obtain the information about them from the server. |
| EAddressCollection | A EAddress collection |
| EAddressEnumerator | A class for enumerating a EAddress collection |
| EAddressHolder | a class to hold EAddress objects |
| Event | An Item that records the occurrence of something in the environment. Currently being used to model Calendar-type events -- this is a placeholder to be integrated with/replaced by the Calendar schema. |
| EventBodyRelationship | |
| EventBodyRelationship-Collection | |
| EventExtension | |
| EventExtensionCollection | A EventExtension collection |
| EventExtensionEnumerator | A class for enumerating a EventExtension collection |
| EventExtensionHolder | a class to hold EventExtension objects |
| Flow | The Core.Flow Item type represents the graph of related tasks and their attachments: Past History, Current Tasks and Tasks not yet Started (Plan) |
| FlowConstraint | The FlowConstraint type defines a constraint applicable to the relationship between a Task Item and a Flow Item. |
| FlowConstraintCollection | A FlowConstraint collection |
| FlowConstraintEnumerator | A class for enumerating a FlowConstraint collection |
| FlowConstraintHolder | a class to hold FlowConstraint objects |
| FlowLink | the Core.FlowLink type defines the relationship between a Task and the Flow for that task. |
| FlowLinkCollection | A FlowLink collection |
| FlowLinkEnumerator | A class for enumerating a FlowLink collection |
| FlowLinkHolder | a class to hold FlowLink objects |
| Function | |
| HasLocationsRelationship | |
| HasLocationsRelationshipCollection | |
| InternalAddressLine | A wrapper around scalar string to support multi-valued strings. Used by Core.Address.Internal Addresses. |
| InternalAddressLineCollection | A InternalAddressLine collection |
| InternalAddressLine-Enumerator | A class for enumerating a InternalAddressLine collection |
| InternalAddressLineHolder | a class to hold InternalAddressLine objects |
| ItemCategoryRelationship | |
| ItemCategoryRelationshipCollection | |
| Keyword | This type represents a keyword that can be used on a document. |
| KeywordCollection | A Keyword collection |
| KeywordEnumerator | A class for enumerating a Keyword collection |
| KeywordHolder | a class to hold Keyword objects |
| Location | A Location corresponds to one physical or geographic space. A Location is a collection of "location elements", each of which independently specifies the physical space. For example, a person's current location may be alteratively specified by sensor data (GPS or 802.11 location elements), a postal address, or by an ID that resolves against a location database via a service. |
| LocationElement | An "atom" of location information. |
| Location Report | The Location Report holds the data that the Location Service tags onto the LocationElements that it produces. |
| LocationReportCollection | A LocationReport collection |
| LocationReportEnumerator | A class for enumerating a LocationReport collection |
| LocationReportHolder | a class to hold LocationReport objects |
| Locations LocationElements Relationship | |
| Locations LocationElements RelationshipCollection | |
| Message | Placeholder for a Message. |
| OfficeDocument | Root type for all kinds of office documents like word processors, spreadsheets etc |
| PreviewRelationship | |
| PreviewRelationshipCollection | |
| PreviousVersionRelationship | |
| PreviousVersionRelationship Collection | |
| PublisherRelationship | |
| PublisherRelationship-Collection | |
| RichText | A multivalued list of links pointing to any attachments associated with the entry, such as photos, documents, etc. In the Core schema because Core.Contact needs it |
| RichTextCollection | A RichText collection |
| RichTextEnumerator | A class for enumerating a RichText collection |
| RichTextHolder | a class to hold RichText objects |
| RoleOccupancy | This is a relationship between two Principals in which one Principal (the RoleOccupant) is the occupant of the role, and the other Principal is the context in which the RoleOccupancy takes place. For example a Person (the RoleOccupant) may be an employee (the RoleOccupancy) of an Organization (the RolesContext). |
| RoleOccupancyCollection | A RoleOccupancy collection |
| RolcOccupancyEnumerator | A class for enumerating a RoleOccupancy collection |
| RoleOccupancyHolder | a class to hold RoleOccupancy objects |
| Service | The base class from which all other services are derived. Services are providers of information. |
| ShellExtension | Extension containing categorizing keywords. These can be attached to any item. |
| ShellExtensionCollection | A ShellExtension collection |
| ShellExtensionEnumerator | A class for enumerating a ShellExtension collection |
| ShellExtensionHolder | a class to hold ShellExtension objects |
| Task | A task represents unit of work that is done at a particular point in time or repeatedly over time. Tasks may also be done as a result of some event other than the passage of time. Tasks are not the same as Functions. Functions are things that the system can do such as "Print a File" or "Backup a Directory" - Tasks |

-continued

| | |
|---|---|
| | record when or under what circumstances something should be done or has been done not what is done. |
| TaskChangeEvent | Record of changing a Task associated with a Flow |
| TaskChangeEventCollection | A TaskChangeEvent collection |
| TaskChangeEventEnumerator | A class for enumerating a TaskChangeEvent collection |
| TaskChangeEventHolder | a class to hold TaskChangeEvent objects |
| TaskExtension | |
| TaskExtensionCollection | A TaskExtension collection |
| TaskExtensionEnumerator | A class for enumerating a TaskExtension collection |
| TaskExtensionHolder | a class to hold TaskExtension objects |
| TextDocument | This is a common type for all documents that contain texts. This includes Word Documents, Journal notes, etc. |
| TextDocumentCollection | A TextDocument collection |
| TextDocumentEnumerator | A class for enumerating a TextDocument collection |
| TextDocumentHolder | a class to hold TextDocument objects |
| TriggeredEvent | This is an event based on a calendar schedule. This happens at a certain time(s) of a day. |
| TriggeredEventCollection | A TriggeredEvent collection |
| TrigeeredEventEnumerator | A class for enumerating a TriggeredEvent collection |
| TriggeredEventHolder | a class to hold TriggeredEvent objects |
| Uri | URI. Used by the Service Item. |
| UriCollection | A Uri collection |
| UriEnumerator | A class for enumerating a Uri collection |
| UriHolder | a class to hold Uri objects |
| Interfaces | |
| IAddressCollection | An interface representing a Address collection |
| IAddressEnumerator | interface representing a class for enumerating a Address collection |
| IADSynchronizationCollection | An interface representing a ADSynchronization collection |
| IADSynchronization-Enumerator | interface representing a class for enumerating a ADSynchronization collection |
| IAuthorCollection | An interface representing a Author collection |
| IAuthorEnumerator | interface representing a class for enumerating a Author collection |
| IBasicPresenceCollection | An interface representing a BasicPresence collection |
| IBasicPrescnceEnumerator | interface representing a class for enumerating a BasicPresence collection |
| ICalendarEventCollection | An interface representing a CalendarEvent collection |
| ICalendarEventEnumerator | interface representing a class for enumerating a CalendarEvent collection |
| ICategoryKeywordCollection | An interface representing a CategoryKeyword collection |
| ICategoryKeywordEnumerator | interface representing a class for enumerating a CategoryKeyword collection |
| IDateCollection | An interface representing a Date collection |
| IDateEnumerator | interface representing a class for enumerating a Date collection |
| IEAddressCollection | An interface representing a EAddress collection |
| IEAddressEnumerator | interface representing a class for enumerating a EAddress collection |
| IEventExtensionCollection | An interface representing a EventExtension collection |
| IEventExtensionEnumerator | interface representing a class for enumerating a EventExtension collection |
| IFlowConstraintCollection | An interface representing a FlowConstraint collection |
| IFlowConstraintEnumerator | interface representing a class for enumerating a FlowConstraint collection |
| IFlowLinkCollection | An interface representing a FlowLink collection |
| IFlowLinkEnumerator | interface representing a class for enumerating a FlowLink collection |
| IInternalAddressLine-Collection | An interface representing a InternalAddressLine collection |
| IInternalAddressLine-Enumerator | interface representing a class for enumerating a InternalAddressLine collection |
| IKeywordCollection | An interface representing a Keyword collection |
| lKeywordEnumerator | interface representing a class for enumerating a Keyword collection |
| ILocationReportCollection | An interface representing a LocationReport collection |
| ILocationRcportEnumerator | interface representing a class for enumerating a LocationReport collection |
| IRichTextCollection | An interface representing a RichText collection |
| IRichTextEnumerator | interface representing a class for enumerating a RichText collection |
| IRoleOccupancyCollection | An interface representing a RoleOccupancy collection |
| IRoleOccupancyEnumerator | interface representing a class for enumerating a RoleOccupancy collection |
| IShellExtensionCollection | An interface representing a ShellExtension collection |
| IShellExtensionEnumerator | interface representing a class for enumerating a ShellExtension collection |
| ITaskChangeEventCollection | An interface representing a TaskChangeEvent collection |
| ITaskChangeEventEnumerator | interface representing a class for enumerating a TaskChangeEvent collection |
| ITaskExtensionCollection | An interface representing a TaskExtension collection |
| ITaskExtensionEnumerator | interface representing a class for enumerating a TaskExtension collection |
| ITextDocumentCollection | An interface representing a TextDocument collection |
| ITextDocumentEnumerator | interface representing a class for enumerating a TextDocument collection |
| ITriggeredEventCollection | An interface representing a TriggeredEvent collection |
| ITriggeredEventEnumerator | interface representing a class for enumerating a TriggeredEvent collection |
| IUriCollection | An interface representing a Uri collection |
| IUriEnumerator | interface representing a class for enumerating a Uri collection |
| Enumerations | |
| IdentityCardAttribute | |

System.Storage.Core.Interop

The following table lists examples of members exposed by the System.Storage.Core.Interop namespace.

| | |
|---|---|
| Interfaces | |
| IAddress | Address represents an address for contacting or a Contact via postal mail, or an indoor/outdoor location in the Location object. |
| IADSynchronization | Synchronization parameters. |
| IAuthor | A link to person or company who is an author (or a co-author in case of multiple authors) |
| IBasicPresence | It is expected that BasicPresence will be extended. For example, supporting IRC (Internet Relay Chat) presence. An example of an IRCPresence is. - DonH = IdentityKey - editing some.xls = IRCPresence (what is involved is given by IRCPresence) - on some machine = eAddress (where Don is presently editing the XLS is given by eAddress) |
| ICalendarEvent | |
| ICategorizedNestedElement | A nested Element with categories field. |
| ICategory | This represents the valid categories known to the current system. Categories (also known as taxonomies) include such things as the type values for eAddresses. |

-continued

| Interfaces | |
|---|---|
| ICategoryKeyword | Keyword used for categorizing/grouping an item. |
| ICommodity | An identifiable thing that has value - this includes inanimate objects such as cars, houses, or furniture and animate objects such as pets or livestock. |
| IComputer | |
| IContact | |
| IContactCustom | |
| IDate | This type represents a Date that can be used on a document. |
| IDevice | A Device is a logical structure that supports information processing capabilities, for example a display device can translate a bit stream into images, a disk drive can store and retrieve bit streams, a keyboard can translate keystrokes into appropriate codes, a radio can select signal streams and translate them into sound. |
| IDocument | Document is an Item that represents content that is authored, can be rendered and needs to be stored. |
| IEAddress | An eAddress is essentially a routing address, i.e., an electronic way of getting in touch with a person. Types of eAddresses include o Email address o Phone number o WebSite o FTP Site o InternetFreebusy Location o Netmeeting settings. eAddresses may be published to allow someone to contact me - for example, I tell someone my phone number or email address. This contrasts with IdentityKeys, which are used to obtain information about someone - for example, if I want to keep someone's address information synchronised and up to date, they will have to give me an IdentityKey that I can use to obtain the information about them from the server. |
| IEvent | An Item that records the occurrence of something in the environment. Currently being used to model Calendar-type events -- this is a placeholder to be integrated with/ replaced by the Calendar schema. |
| IEventExtension | |
| IFlow | The Core.Flow Item type represents the graph of related tasks and their attachments: Past History, Current Tasks and Tasks not yet Started (Plan) |
| IFlowConstraint | The FlowConstraint type defines a constraint applicable to the relationship between a Task Item and a Flow Item. |
| IFlowLink | the Core.FlowLink type defines the relationship between a Task and the Flow for that task. |
| IFunction | |
| IInternal Address Line | A wrapper around scalar string to support multi-valued strings. Used by Core.Address.InternalAddresses. |
| IKeyword | This type represents a keyword that can be used on a document. |
| ILocation | A Location corresponds to one physical or geographic space. A Location is a collection of "location elements", each of which independently specifies the physical space. For example, a person's current location may be alteratively specified by sensor data (GPS or 802.11 location elements), a postal address, or by an ID that resolves against a location database via a service. |
| ILocationElement | An "atom" of location information. |
| ILocationReport | The Location Report holds the data that the Location Service tags onto the LocationElements that it produces. |
| IMessage | Placeholder for a Message. |
| IOfficeDocument | Root type for all kinds of office documents like word processors, spreadsheets etc |

-continued

| Interfaces | |
|---|---|
| IRichText | A multivalued list of links pointing to any attachments associated with the entry, such as photos, documents, etc. In the Core schema because Core.Contact needs it. |
| IRoleOccupancy | This is a relationship between two Principals in which one Principal (the RoleOccupant) is the occupant of the role, and the other Principal is the context in which the RoleOccupancy takes place. For example a Person (the RoleOccupant) may be an employee (the RoleOccupancy) of an Organization (the RolesContext). |
| IService | The base class from which all other services are derived. Services are providers of information. |
| IShellExtension | Extension containing categorizing keywords. These can be attached to any item. |
| ITask | A task represents unit of work that is done at a particular point in time or repeatedly over time. Tasks may also be done as a result of some event other than the passage of time. Tasks are not the same as Functions. Functions are things that the system can do such as "Print a File" or "Backup a Directory" - Tasks record when or under what circumstances something should be done or has been done not what is done. |
| ITaskChangeEvent | Record of changing a Task associated with a Flow |
| ITaskExtension | |
| ITextDocument | This is a common type for all documents that contain texts. This includes Word Documents, Journal notes, etc. |
| ITriggeredEvent | This is an event based on a calendar schedule. This happens at a certain time(s) of a day. |
| IUri | URI. Used by the Service Item. |

System.Storage.Explorer

The following tables list examples of members exposed by the System.Storage.Explorer namespace.

| Classes | |
|---|---|
| AuditEvent | |
| AuditEventElement | |
| AuditEventElementCollection | A AuditEventElement collection |
| AuditEventElementEnumerator | A class for enumerating a AuditEventElement collection |
| AuditEventElementHolder | a class to hold AuditEventElement objects |
| History | |
| HistoryDownload | |
| HistoryDownloadCollection | A HistoryDownload collection |
| HistoryDownloadEnumerator | A class for enumerating a HistoryDownload collection |
| HistoryDownloadHolder | a class to hold HistoryDownload objects |
| HistoryElement | |
| HistoryElementCollection | A HistoryElement collection |
| HistoryElementEnumerator | A class for enumerating a HistoryElement collection |
| HistoryElementHolder | a class to hold HistoryElement objects |
| HistoryVisit | |
| HistoryVisitCollection | A HistoryVisit collection |
| HistoryVisitEnumerator | A class for enumerating a HistoryVisit collection |
| HistoryVisitHolder | a class to hold HistoryVisit objects |
| InternetShortcut | |
| Share | |
| Thumbnail | |
| ThumbnailCache | |
| ThumbnailCacheCollection | A ThumbnailCache collection |
| ThumbnailCacheEnumerator | A class for enumerating a ThumbnailCache collection |

-continued

| | |
|---|---|
| ThumbnailCacheHolder | a class to hold ThumbnailCache objects |
| UsagePattern | UsagePattern item is type of folder that contains usage pattern entries. It also contains max number of entries. |
| UsagePatternEntry | Link to item that is remembered in usage pattern. Also contains deep copy of property that is being remembered. |
| UsagePatternEntryCollection | A UsagePatternEntry collection |
| UsagePatternEntryEnumerator | A class for enumerating a UsagePatternEntry collection |
| UsagePatternEntryHolder | a class to hold UsagePatternEntry objects |
| Interfaces | |
| IAuditEventElementCollection | An interface representing a AuditEventElement collection |
| IAuditEventElementEnumerator | interface representing a class for enumerating a AuditEventElement collection |
| IEqualityComparer | |
| IHistoryDownloadCollection | An interface representing a HistoryDownload collection |
| IHistoryDownload Enumerator | interface representing a class for enumerating a HistoryDownload collection |
| IHistoryElementCollection | An interface representing a HistoryElement collection |
| IHistoryElementEnumerator | interface representing a class for enumerating a HistoryElement collection |
| IHistoryVisitCollection | An interface representing a HistoryVisit collection |
| IHistoryVisitEnumerator | interface representing a class for enumerating a HistoryVisit collection |
| IThumbnailCacheCollection | An interface representing a ThumbnailCache collection |
| IThumbnailCacheEnumerator | interface representing a class for enumerating a ThumbnailCache collection |
| IUsagePatternEntryCollection | An interface representing a UsagePatternEntry collection |
| IUsagePatternEntryEnumerator | interface representing a class for enumerating a UsagePatternEntry collection |

System.Storage.Explorer.Interop

The following table lists examples of members exposed by the System.Storage.Explorer.Interop namespace.

| Interfaces |
|---|
| IAuditEvent |
| IAuditEventElement |
| IHistory |
| IHistoryDownload |
| IHistoryElement |
| IHistoryVisit |
| IInternetShortcut |
| IShare |
| IThumbnail |
| IThumbnailCache |
| IUsagePattern    UsagePattern item is type of folder that contains usage pattern entries. It also contains max number of entries. |
| IUsagePatternEntry    Link to item that is remembered in usage pattern. Also contains deep copy of property that is being remembered. |

System.Storage.Fax

The following tables list examples of members exposed by the System.Storage.Fax namespace.

| Classes |
|---|
| FaxAccount |
| FaxAccountProperties |
| FaxAccountPropertiesCollection |
| FaxAccountPropertiesEnumerator |
| FaxAccountPropertiesHolder |
| FaxAccountServer |
| FaxAccountServerCollection |
| FaxAccountServerEnumerator |
| FaxAccountServerHolder |
| FaxCoverPageInfo |
| FaxCoverPageInfoCollection |
| FaxCoverPageInfoEnumerator |
| FaxCoverPageInfoHolder |
| FaxFolder |
| FaxMessage |
| FaxParticipant |
| FaxParticipantCollection |
| FaxParticipantEnumerator |
| FaxParticipantHolder |
| TransmissionDetails |
| TransmissionDetailsCollection |
| TransmissionDetailsEnumerator |
| TransmissionDetailsHolder |
| Interfaces |
| IFaxAccountPropertiesCollection |
| IFaxAccountPropertiesEnumerator |
| IFaxAccountServerCollection |
| IFaxAccountServerEnumerator |
| IFaxCoverPageInfoCollection |
| IFaxCoverPageInfoEnumerator |
| IFaxParticipantCollection |
| IFaxParticipantEnumerator |
| ITransmissionDetailsCollection |
| ITransmissionDetailsEnumerator |

System.Storage.Fax.Interop

The following table lists examples of members exposed by the System.Storage.Fax.Interop namespace.

| Interfaces |
|---|
| IFaxAccount |
| IFaxAccountProperties |
| IFaxAccountServer |
| IFaxCoverPageInfo |
| IFaxFolder |
| IFaxMessage |
| IFaxParticipant |
| ITransmissionDetails |

System.Storage.Files

The following table lists examples of members exposed by the System.Storage.Files namespace.

| Classes | |
|---|---|
| File | File type encapsulates the metadata/properties of files. |

System.Storage.Files.Interop

The following table lists examples of members exposed by the System.Storage.Files.Interop namespace.

| Interfaces | |
|---|---|
| IFile | File type encapsulates the metadata/properties of files. |

System.Storage.GameLibrary

The following table lists examples of members exposed by the System.Storage.GameLibrary namespace.

| Classes | |
|---|---|
| GameDescription | The GameDescription type describes the metadata that is retrieved and stored from a game description file (GDF) |

System.Storage.GameLibrary.Interop

The following table lists examples of members exposed by the System.Storage.GameLibrary.Interop namespace.

Interfaces

| | |
|---|---|
| IGameDescription | The GameDescription type describes the metadata that is retrieved and stored from a game description file (GDF) |

System.Storage.Help

The following tables list examples of members exposed by the System.Storage.Help namespace.

| Classes | |
|---|---|
| Bundle | A Bundle is a virtual collection of Help Topics. It is uniquely identified by the Name inside the current product. Each Topic inside a Bundle is uniquely identified by its partial Url (SubUrl). |
| BundleCollection | A Bundle collection |
| BundleEnumerator | A class for enumerating a Bundle collection |
| BundleHolder | a class to hold Bundle objects |
| HelpFile | A HelpFile is a physical file that contains Help Topics. |
| HelpFileTopicLinkRelationship | |
| HelpFileTopicLinkRelationshipCollection | |
| Product | The top-level owner of all Help Bundles and HelpFiles. It maps to the Help content of real products. |
| ProductHelpFileLinkRelationship | |
| ProductHelpFileLinkRelationshipCollection | |
| Topic | A Topic is a Help primitive that the user can search on and view the content. |

| Interfaces | |
|---|---|
| IBundleCollection | An interface representing a Bundle collection |
| IBundleEnumerator | interface representing a class for enumerating a Bundle collection |

System.Storage.Help.Interop

The following table lists examples of members exposed by the System.Storage.Help.Interop namespace.

| Interfaces | |
|---|---|
| IBundle | A Bundle is a virtual collection of Help Topics. It is uniquely identified by the Name inside the current product. Each Topic inside a Bundle is uniquely identified by its partial Url (SubUrl). |
| IHelpFile | A HelpFile is a physical file that contains Help Topics. |
| IProduct | The top-level owner of all Help Bundles and HelpFiles. It maps to the Help content of real products. |
| ITopic | A Topic is a Help primitive that the user can search on and view the content. |

System.Storage.Image

The following table lists examples of members exposed by the System.Storage.Image namespace.

| Classes | |
|---|---|
| AnalysisProperties | A set of properties that are calculated on the photo by an analysis application. This extension should be applied to the Image items that have been passes through the analysis application. These properties are more of a cache, but they are expensive to recompute. These fields are application specific. Other applications may not understand the internal format of these fields. |
| AnalysisPropertiesCollection | A AnalysisProperties collection |
| AnalysisPropertiesEnumerator | A class for enumerating a AnalysisProperties collection |
| AnalysisPropertiesHolder | a class to hold AnalysisProperties objects |
| EventReference | EventReference type represents a link to an Event Item. It may be dangling, in which case the fields on this type specify the name of the event. |
| EventReferenceCollection | A EventReference collection |
| EventReferenceEnumerator | A class for enumerating a EventReference collection |
| EventReferenceHolder | a class to hold EventReference objects |
| Image | |
| LocationReference | LocationReference type represents a link to a Location item. It may be dangling, in which case the fields on this type specify the location coordinates. |
| LocationReferenceCollection | A LocationReference collection |
| LocationReferenceEnumerator | A class for enumerating a LocationReference collection |
| LocationReferenceHolder | a class to hold LocationReference objects |
| PersonReference | PersonReference type represents a link to a Contact Item. It may be dangling, in which case the fields on this type specify the name of the person. |
| PersonReferenceCollection | A PersonReference collection |
| PersonReferenceEnumerator | A class for enumerating a PersonReference collection |
| Person ReferenceHolder | a class to hold PersonReference objects |
| Photo | A set of properties describing a Photo if the picture is actually a Photograph. |
| Region | This type represents a region in an Image. |
| RegionCollection | A Region collection |
| RegionEnumerator | A class for enumerating a Region collection |
| RegionHolder | a class to hold Region objects |
| RegionOfInterest | |
| RegionOfInterestCollection | A RegionOfInterest collection |

| | |
|---|---|
| RegionOfInterestEnumerator | A class for enumerating a RegionOfInterest collection |
| RegionOfInterestHolder | a class to hold RegionOfInterest objects |
| Interfaces | |
| IAnalysisPropertiesCollection | An interface representing a AnalysisProperties collection |
| IAnalysisPropertiesEnumerator | interface representing a class for enumerating a AnalysisProperties collection |
| IEventReferenceCollection | An interface representing a EventReference collection |
| IEventReferenceEnumerator | interface representing a class for enumerating a EventReference collection |
| ILocationReferenceCollection | An interface representing a LocationReference collection |
| ILocationReferenceEnumerator | interface representing a class for enumerating a LocationReference collection |
| IPersonReferenceCollection | An interface representing a PersonReference collection |
| IPersonReferenceEnumerator | interface representing a class for enumerating a PersonReference collection |
| IRegionCollection | An interface representing a Region collection |
| IRegionEnumerator | interface representing a class for enumerating a Region collection |
| IRegionOfInterestCollection | An interface representing a RegionOfInterest collection |
| IRegionOfInterestEnumerator | interface representing a class for enumerating a RegionOfInterest collection |

System.Storage.Image.Interop

The following table lists examples of members exposed by the System.Storage.Image.Interop namespace.

| | |
|---|---|
| Interfaces | |
| IAnalysisProperties | A set of properties that are calculated on the photo by an analysis application. This extension should be applied to the Image items that have been passes through the analysis application. These properties are more of a cache, but they are expensive to recompute. These fields are application specific. Other applications may not understand the internal format of these fields. |
| IEventReference | EventReference type represents a link to an Event Item. It may be dangling, in which case the fields on this type specify the name of the event. |
| IImage | This is a base type that is shared by all Images. It contains fields that describe image in general and are applicable to images stored in different formats. |
| ILocationReference | LocationReference type represents a link to a Location item. It may be dangling, in which case the fields on this type specify the location coordinates. |
| IPersonReference | PersonReference type represents a link to a Contact Item. It may be dangling, in which case the fields on this type specify the name of the person. |
| IPhoto | A set of properties describing a Photo if the picture is actually a Photograph. |
| IRegion | This type represents a region in an Image. |
| IRegionOfInterest | |

System.Storage.Interop

The following tables list examples of members exposed by the System.Storage.Interop namespace.

| | |
|---|---|
| Classes | |
| Convert | Summary description for Convert. |
| Interfaces | |
| ICategoryRef | A Category reference Identity key. Every categoryNode has an identity key of type CategoryRef. When category refences are tagged onto an item, they are tagged as a link type where the Link.Target contains a CategoryRef. |
| IExtension | This is the type used as the basis for extensions. To establish an extension a new subtype of this type is defined. The extension may be added to an Item by creating an instance of the type and assigning it to the Extensions field of the Item to be extended. |
| IExtensionCustom | Custom methods for the Extension class |
| IFolder | |
| IIdentityKey | |
| IItem | |
| IItemContext | This interface exposes methods on the COM Callerable Wrapper for the ItemContext class used in COM interop. |
| IItemCustom | Custom methods and properties for the Item object |
| IItemName | ItemName represents the path name of an item |
| IItemNameCollection | An ItemNameCollection contains all the item names for an item |
| IItemNameEnumerator | interface representing a class for enumerating a ItemName collection |
| ILink | |
| INestedElement | |
| IProjectionOption | This interface defines methods of the COM Callerable Wrapper for the ProjectionOption class used in the COM interop. |
| iQuery | This interface exposes methods on the COM Callerable Wrapper for the Query class used in COM interop. |
| IRecycleBinLink | |
| ISearchProjection | This interface defines the methods for the COM Callerable Wrapper, SearchProjection, used in the COM interop. |
| IShare | |
| IStorageExceptionInformation | |
| IStore | |
| IVolume | |

System.Storare.Image

The following tables list examples of members exposed by the System.Storage.Image namespace.

| | |
|---|---|
| Classes | |
| AnalysisProperties | A set of properties that are calculated on the photo by an analysis application. This extension should be applied to the Image items that have been passes through the analysis application. These properties are more of a cache, but they are expensive to recompute. These fields are application specific. Other applications may not understand the internal format of these fields. |
| AnalysisPropertiesCollection | A AnalysisProperties collection |
| AnalysisPropertiesEnumerator | A class for enumerating a AnalysisProperties collection |
| AnalysisPropertiesHolder | a class to hold AnalysisProperties objects |
| EventReference | EventReference type represents a link to an Event Item. It may be dangling, in which case the fields on this type specify the name of the event. |
| EventReferenceCollection | A EventReference collection |
| EventReferenceEnumerator | A class for enumerating a EventReference collection |
| EventReferenceHolder | a class to hold EventReference objects |
| Image | |
| LocationReference | LocationReference type represents a link to a Location item. It may be dangling, in |

| | |
|---|---|
| | which case the fields on this type specify the location coordinates. |
| LocationReferenceCollection | A LocationReference collection |
| LocationReferenceEnumerator | A class for enumerating a LocationReference collection |
| LocationReferenceHolder | a class to hold LocationReference objects |
| PersonReference | PersonReference type represents a link to a Contact Item. It may be dangling, in which case the fields on this type specify the name of the person. |
| PersonReferenceCollection | A PersonReference collection |
| PersonReferenceEnumerator | A class for enumerating a PersonReference collection |
| PersonReferenceHolder | a class to hold PersonReference objects |
| Photo | A set of properties describing a Photo if the picture is actually a Photograph. |
| Region | This type represents a region in an Image. |
| RegionCollection | A Region collection |
| RegionEnumerator | A class for enumerating a Region collection |
| RegionHolder | a class to hold Region objects |
| RegionOfInterest | |
| RegionOfInterestCollection | A RegionOfInterest collection |
| RegionOfInterestEnumerator | A class for enumerating a RegionOfInterest collection |
| RegionOfInterestHolder | a class to hold RegionOfInterest objects |
| Interfaces | |
| IAnalysisPropertiesCollection | An interface representing a AnalysisProperties collection |
| IAnalysisPropertiesEnumerator | interface representing a class for enumerating a AnalysisProperties collection |
| IEventReferenceCollection | An interface representing a EventReference collection |
| IEventReferenceEnumerator | interface representing a class for enumerating a EventReference collection |
| ILocationReferenceCollection | An interface representing a LocationReference collection |
| ILocationReferenceEnumerator | interface representing a class for enumerating a LocationReference collection |
| IPersonReferenceCollection | An interface representing a PersonReference collection |
| IPersonReferenceEnumerator | interface representing a class for enumerating a PersonReference collection |
| IRegionCollection | An interface representing a Region collection |
| IRegionEnumerator | interface representing a class for enumerating a Region collection |
| IRegionOfInterestCollection | An interface representing a RegionOfInterest collection |
| IRegionOfInterestEnumerator | interface representing a class for enumerating a RegionOfInterest collection |

System.Storare.Image.Interop

The following table lists examples of members exposed by the System.Storage.Image.Interop namespace.

| Interfaces | |
|---|---|
| IAnalysisProperties | A set of properties that are calculated on the photo by an analysis application. This extension should be applied to the Image items that have been passes through the analysis application. These properties are more of a cache, but they are expensive to recompute. These fields are application specific. Other applications may not understand the internal format of these fields. |
| IEventReference | EventReference type represents a link to an Event Item. It may be dangling, in which case the fields on this type specify the name of the event. |
| IImage | This is a base type that is shared by all Images. It contains fields that describe image in general and are applicable to images stored in different formats. |
| ILocationReference | LocationReference type represents a link to a Location item. It may be dangling, in which case the fields on this type specify the location coordinates. |
| IPersonReference | PersonReference type represents a link to a Contact Item. It may be dangling, in which case the fields on this type specify the name of the person. |
| IPhoto | A set of properties describing a Photo if the picture is actually a Photograph. |
| IRegion | This type represents a region in an Image. |
| IRegionOfInterest | |

System.Storage.Interop

The following tables list examples of members exposed by the System.Storage.Interop namespace.

| Classes | |
|---|---|
| Convert | Summary description for Convert. |
| Interfaces | |
| ICategoryRef | A Category reference Identity key. Every categoryNode has an identity key of type CategoryRef. When category refences are tagged onto an item, they are tagged as a link type where the Link.Target contains a CategoryRef. |
| IExtension | This is the type used as the basis for extensions. To establish an extension a new subtype of this type is defined. The extension may be added to an Item by creating an instance of the type and assigning it to the Extensions field of the Item to be extended. |
| IExtensionCustom | Custom methods for the Extension class |
| IFolder | |
| IIdentityKey | |
| IItem | |
| IItemContext | This interface exposes methods on the COM Callerable Wrapper for the ItemContext class used in COM interop. |
| IItemCustom | Custom methods and properties for the Item object |
| IItemName | ItemName represents the path name of an item |
| IItemNameCollection | An ItemNameCollection contains all the item names for an item |
| IItemNameEnumerator | interface representing a class for enumerating a ItemName collection |
| ILink | |
| INestedElement | |
| IProjectionOption | This interface defines methods of the COM Callerable Wrapper for the ProjectionOption class used in the COM interop. |
| IQuery | This interface exposes methods on the COM Callerable Wrapper for the Query class used in COM interop. |
| IRecycleBinLink | |
| ISearchProjection | This interface defines the methods for the COM Callerable Wrapper, SearchProjection, used in the COM interop. |
| IShare | |
| IStorageExceptionInformation | |
| IStore | |
| IVolume | |

System.Storage.Location

The following tables list examples of members exposed by the System.Storage.Location namespace.

Classes

| | |
|---|---|
| Address | Address represents an address for contacting a Contact via postal mail, or an indoor/outdoor location in the Location object. |
| Angle3D | Angle3D represents a one-element, two-element, or three-element vector of angle values. The elements are of type float or NULL (corresponding to CLR double and NaN, respectively). The angle vector may be used to represent data like bearing (1-D), spherical coordinates (2-D), or (roll, pitch, yaw) values (3-D). |
| Angle3DCollection | A Angle3D collection |
| Angle3DEnumerator | A class for enumerating a Angle3D collection |
| Angle3DHolder | a class to hold Angle3D objects |
| CoordinateReferenceSystem | CoordinateReferenceSystem is used to explicitly identify the coordinate reference system and datum that is used. In nearly all cases, MS applications and implementations will standardize on WGS84 datum, geographic projection, decimal degree coordinate representations as the basis for transferring locations between applications. Internally, other coordinate systems could be used for performance reasons and graphic representations will almost certainly use a different projection and perhaps different units. The CoordinateReferenceSystem type has been designed to match the current LIF MLP 3.0 encoding for WGS84. Note that for an engineering coordinate system (such as a floor of a building), the Code, CodeSpace, and Edition indicate an "unknown" coordinate system. In this case, the EngineeringReference field is used to link to an EntityReference for the entity that defines the coordinate system. For example, a floor of a building has an EntityReference and a CoordinateReferenceSystem. Each Position defined on that floor will specify as its CoordinateSystem a link to the CoordinateReferenceSystem for the floor. |
| EngineeringRefsEntityRelationship | |
| EngineeringRefsEntityRelationshipCollection | |
| EntityReference | This represents a reference to an entity. An entity is a place (continent, country, city, neighborhood, river, etc.) or space (building, floor, room, parking spot, cubicle) that is uniquely identified within a named data source. For example. MapPoint provides the definitions for certain data source. Within the North America data source, the Space Needle is "1424488", Texas is "33145", and postcode 98007 is "154012087". In order to have the entity identifiers make sense, they are related to the data source provider at http://www.microsoft.com/MapPoint. There are hierarchies of Entities, such as City --> Admin 1 --> Country; or Building --> Floor --> Room. |
| Ieee802dot11 | This is used to provide information about an 802.11 access point, including it's MAC address and signal strength (RSSI). |
| LocationProfile | Location Profile describes a set of location elements that pertains to a location. It has a userID, an application ID, a context and a relationship to the Core.Location item (a collection of location elements). A profile may be created because an application running in a particular user context cares about a location and wants to be notified when the user reaches that location. A profile may just be transient in the sense that it was created by the location service on behalf of the user and cached in "WinFS". |
| Matrix3×3 | Matrix3×3 represents a 3×3 matrix of floats. Any of the matrix elements may be NULL. |
| Matrix3×3Collection | A Matrix3×3 collection |
| Matrix3×3 Enumerator | A class for enumerating a Matrix3×3 collection |
| Matrix3×3Holder | a class to hold Matrix3×3 objects |
| NamedLocation | Represents a user-inputted friendly name that can be associated with a location. The value is stored in the Item.DisplayName. |
| NonScalarString1024 | A wrapper around scalar string to support multi-valued strings. |
| NonScalarString1024Collection | A NonScalarString1024 collection |
| NonScalarString 1024Enumerator | A class for enumerating a NonScalarString1024 collection |
| NonScalarString1024Holder | a class to hold NonScalarString1024 objects |
| ParentRelationship | |
| ParentRelationshipCollection | |
| Position | This is used to provide position information. |
| Position3D | Position3D represents a one-element, two-element, or three-element vector of (x,y,z) position values. The elements are of type float or NULL (corresponding to CLR double and NaN, respectively). |
| Position3DCollection | A Position3D collection |
| Position3DEnumerator | A class for enumerating a Position3D collection |
| Position3DHolder | a class to hold Position3D objects |
| PositionsCoordinateSystemRelationship | |
| PositionsCoordinateSystemRelationshipCollection | |
| PositionUncertainty | Abstract type to represent types of position uncertainty. |
| PositionUncertaintyCollection | A PositionUncertainty collection |
| Position UncertaintyEnumerator | A class for enumerating a PositionUncertainty collection |
| PositionUncertaintyHolder | a class to hold PositionUncertainty objects |
| ProfileLocationRelationship | |
| ProfileLocationRelationshipCollection | |
| SimpleUncertainty | Simple uncertainty represents uncertainty as a single value. |
| SimpleUncertaintyCollection | A SimpleUncertainty collection |
| SimpleUncertaintyEnumerator | A class for enumerating a SimpleUncertainty collection |
| SimpleUncertaintyHolder | a class to hold SimpleUncertainty objects |
| StatisticalUncertainty | The uncertainty in (x,y,z) is represented by a 3×3 covariance matrix. The main diagonal of the matrix, $c[0][0]$, $c[1][1]$, and $c[2][2]$, represents the statistical variances of x, y, and z respectively. A variance is the square of the standard deviation. The off-diagonal elements represent the covariance of different pairings of x, y, and z. Mathematically the covariance matrix represents the expected deviations (dx,dy,dz) from a position. The covariance matrix specifically gives the expected values of the products of the deviations: $[c[0][0]\ c[0][1]\ c[0][2]\ ]\ [c[1][0]\ c[1][1]\ c[1][2]\ ]\ [c[2][0]\ c[2][1]$ |

| | |
|---|---|
| | c[2][2] ] [E[dx*dx] E[dx*dy] E[dx*dz] ] [E[dx*dy] E[dy*dy] E[dy*dz] ] [ E[dx*dz] E[dy*dz] E[dz*dz] ] where E[ . . . ] means expected value. Note that the covariance matrix is symmetric around the main diagonal. |
| StatisticalUncertaintyCollection | A StatisticalUncertainty collection |
| StatisticalUncertaintyEnumerator | A class for enumerating a StatisticalUncertainty collection |
| StatisticalUncertaintyHolder | a class to hold StatisticalUncertainty objects |
| Interfaces | |
| IAngle3DCollection | An interface representing a Angle3D collection |
| IAngle3DEnumerator | interface representing a class for enumerating a Angle3D collection |
| IMatrix3×3Collection | An interface representing a Matrix3×3 collection |
| IMatrix3×3Enumerator | interface representing a class for enumerating a Matrix3×3 collection |
| INonScalarString1024Collection | An interface representing a NonScalarString1024 collection |
| INonScalarString1024Enumerator | interface representing a class for enumerating a NonScalarString1024 collection |
| IPosition3DCollection | An interface representing a Position3D collection |
| IPosition3DEnumerator | interface representing a class for enumerating a Position3D collection |
| IPositionUncertaintyCollection | An interface representing a PositionUncertainty collection |
| IPositionUncertaintyEnumerator | interface representing a class for enumerating a PositionUncertainty collection |
| ISimpleUncertaintyCollection | An interface representing a SimpleUncertainty collection |
| ISimpleUncertaintyEnumerator | interface representing a class for enumerating a SimpleUncertainty collection |
| IStatisticalUncertaintyCollection | An interface representing a StatisticalUncertainty collection |
| IStatisticalUncertaintyEnumerator | interface representing a class for enumerating a StatisticalUncertainty collection |

System.Storage.Location.Interop

The following table lists examples of members exposed by the System.Storage.Location.Interop namespace.

| | |
|---|---|
| Interfaces | |
| IAddress | Address represents an address for contacting a Contact via postal mail, or an indoor/outdoor location in the Location object. |
| IAngle3D | Angle3D represents a one-element, two-element, or three-element vector of angle values. The elements are of type float or NULL (corresponding to CLR double and NaN, respectively). The angle vector may be used to represent data like bearing (1-D), spherical coordinates (2-D), or (roll, pitch, yaw) values (3-D). |
| ICoordinateReferenceSystem | CoordinateReferenceSystem is used to explicitly identify the coordinate reference system and datum that is used. In nearly all cases, MS applications and implementations will standardize on WGS84 datum, geographic projection, decimal degree coordinate representations as the basis for transferring locations between applications. Internally, other coordinate systems could be used for performance reasons and graphic representations will almost certainly use a different projection and perhaps different units. The CoordinateReferenceSystem type has been designed to match the current LIF MLP 3.0 encoding for WGS84. Note that for an engineering coordinate system (such as a floor of a building), the Code, CodeSpace, and Edition indicate an "unknown" coordinate system. In this case, the EngineeringReference field is used to link to an EntityReference for the entity that defines the coordinate system. For example, a floor of a building has an EntityReference and a CoordinateReferenceSystem. Each Position defined on that floor will specify as its CoordinateSystem a link to the CoordinateReferenceSystem for the floor. |
| IEntityReference | This represents a reference to an entity. An entity is a place (continent, country, city, neighborhood, river, etc..) or space (building, floor, room, parking spot, cubicle) that is uniquely identified within a named data source. For example, MapPoint provides the definitions for certain data source. Within the North America data source, the Space Needle is "1424488", Texas is "33145", and postcode 98007 is "154012087". In order to have the entity identifiers make sense, they are related to the data source provider at http://www.microsoft.com/MapPoint. There are hierarchies of Entities, such as City --> Admin 1 --> Country; or Building --> Floor --> Room. |
| Ieee802dot11 | This is used to provide information about an 802.11 access point, including it's MAC address and signal strength (RSSI). |
| ILocationProfile | Location Profile describes a set of location elements that pertains to a location. It has a userID, an application ID, a context and a relationship to the Core.Location item (a collection of location elements). A profile may be created because an application running in a particular user context cares about a location and wants to be notified when the user reaches that location. A profile may just be transient in the sense that it was created by the location service on behalf of the user and cached in "WinFS". |
| IMatrix3×3 | Matrix3×3 represents a 3×3 matrix of floats. Any of the matrix elements may be NULL. |
| INamedLocation | Represents a user-inputted friendly name that can be associated with a location. The value is stored in the Item.DisplayName. |
| INonScalarString1024 | A wrapper around scalar string to support multi-valued strings. |
| IPosition IPosition3D | This is used to provide position information. Position3D represents a one-element, two-element, or three-element vector of (x,y,z) position values. The elements are of type float or NULL (corresponding to CLR double and NaN, respectively). |
| IPositionUncertainty | Abstract type to represent types of position uncertainty. |
| ISimpleUncertainty | Simple uncertainty represents uncertainty as a single value. |
| IStatisticalUncertainty | The uncertainty in (x,y,z) is represented by a 3×3 covariance matrix. The main diagonal of the matrix, c[0][0], c[1][1], and c[2][2], represents the statistical variances of x, y, and z respectively. A variance is the square of the standard deviation. The off-diagonal elements represent the covariance of different pairings of x, y, and z. Mathematically the covariance matrix represents the expected deviations (dx,dy,dz) from a position. The covariance matrix specifically gives the expected values of the products of the deviations: [c[0][0] c[0][1] c[0][2] ] [c[1][0] c[1][1] c[1][2] ] |

| Interfaces | |
|---|---|
| | [c[2][0] c[2][1] c[2][2] ] [E[dx * dx] E[dx * dy] E[dx * dz] ] [E[dx * dy] E[dy * dy] E[dy * dz] ] [E[dx * dz] E[dy * dz] E[dz*dz] ] where E[ . . . ] means expected value. Note that the co-variance matrix is symmetric around the main diagonal. |

System.Storage.Mail

The following table lists examples of members exposed by the System.Storage.Mail namespace.

| Classes |
|---|
| ArticleRange |
| Folder |
| Message |

System.Storage.Mail.Interop

The following table lists examples of members exposed by the System.Storage.Mail.Interop namespace.
Interfaces
IMessage System.Storage.Media The following tables list examples of members exposed by the System.Storage.Media namespace.

| Classes | |
|---|---|
| CategoryRef | Temporary placeholder category reference type |
| CategoryRefCollection | A CategoryRef collection |
| CategoryRefEnumerator | A class for enumerating a CategoryRef collection |
| CategoryRefHolder | a class to hold CategoryRef objects |
| CustomRating | CustomRating type represents a free-form string rating given to the media document by some authority. |
| CustomRatingCollection | A CustomRating collection |
| CustomRatingEnumerator | A class for enumerating a CustomRating collection |
| CustomRatingHolder | a class to hold CustomRating objects |
| Distributor | Distributor type represents a link to a Contact item for Content Distributor for Media information. May be dangling in which case the fields on this type specify the distributor. |
| DistributorCollection | A Distributor collection |
| DistributorEnumerator | A class for enumerating a Distributor collection |
| DistributorHolder | a class to hold Distributor objects |
| Document | The type Media.Document represents audio documents such as tracks, albums, etc. It contains fields that are common for all documents. |
| History | History type represents a history of this media document. When and how did I edit it? Who did I mail it to? Did I rotate it? Did I apply filters? |
| HistoryCollection | A History collection |
| HistoryEnumerator | A class for enumerating a History collection |
| HistoryHolder | a class to hold History objects |
| MetadataLifecycle | Metadata (lifecycle and other state tracking). |
| MetadataLifecycleCollection | A MetadataLifecycle collection |
| MetadataLifecycleEnumerator | A class for enumerating a MetadataLifecycle collection |
| MetadataLifecycleHolder | a class to hold MetadataLifecycle objects |
| Rating | Rating type represents a rating given to the media document by some authority. The authority cold be MPAA, Microsoft, or even myself. There are two types of ratings: string rating and numeric rating. To represent these cases people should create an instance of Custom rating or StarRating types. The Rating type itself does not contain the value of the rating, so it is an abstract type. |
| RatingCollection | A Rating collection |
| RatingEnumerator | A class for enumerating a Rating collection |
| RatingHolder | a class to hold Rating objects |
| StarRating | StarRating type represents a numeric rating given to the media document by some authority. |
| StarRatingCollection | A StarRating collection |
| StarRatingEnumerator | A class for enumerating a StarRating collection |
| StarRatingHolder | a class to hold StarRating objects |
| UrlReference | UrlReference type represents an URL together with a category that specifies what kind of URL is it. |
| UrlReferenceCollection | A UrlReference collection |
| UrlReferenceEnumerator | A class for enumerating a UrlReference collection |
| UrlReferenceHolder | a class to hold UrlReference objects |
| Interfaces | |
| ICategoryRefCollection | An interface representing a CategoryRef collection |
| ICategoryRefEnumerator | interface representing a class for enumerating a CategoryRef collection |
| ICustomRatingCollection | An interface representing a CustomRating collection |
| ICustomRatingEnumerator | interface representing a class for enumerating a CustomRating collection |
| IDistributorCollection | An interface representing a Distributor collection |
| IDistributorEnumerator | interface representing a class for enumerating a Distributor collection |
| IHistoryCollection | An interface representing a History collection |
| IHistoryEnumerator | interface representing a class for enumerating a History collection |
| IMetadataLifecycleCollection | An interface representing a MetadataLifecycle collection |
| IMetadataLifecycleEnumerator | interface representing a class for enumerating a MetadataLifecycle collection |
| IRatingCollection | An interface representing a Rating collection |
| IRatingEnumerator | interface representing a class for enumerating a Rating collection |
| IStarRatingCollection | An interface representing a StarRating collection |
| IStarRatingEnumerator | interface representing a class for enumerating a StarRating collection |
| IUrlReferenceCollection | An interface representing a UrlReference collection |
| IUrlReference Enumerator | interface representing a class for enumerating a UrlReference collection |

System.Storage.Media.Interop

The following table lists examples of members exposed by the System.Storage.Media.Interop namespace.

| Interfaces | |
|---|---|
| ICategoryRef | Temporary placeholder category reference type |
| ICustomRating | CustomRating type represents a free-form string rating given to the media document by some authority. |
| IDistributor | Distributor type represents a link to a Contact item for Content Distributor for Media information. May be dangling in which case the fields on this type specify |

| Interfaces | |
|---|---|
| | the distributor. |
| IDocument | The type Media.Document represents audio documents such as tracks, albums, etc. It contains fields that are common for all documents. |
| IHistory | History type represents a history of this media document. When and how did I edit it? Who did I mail it to? Did I rotate it? Did I apply filters? |
| IMetadataLifecycle | MetadataLifecycle and other state tracking). |
| IRating | Rating type represents a rating given to the media document by some authority. The authority cold be MPAA, Microsoft, or even myself. There are two types of ratings: string rating and numeric rating. To represent these cases people should create an instance of Custom rating or StarRating types. The Rating type itself does not contain the value of the rating, so it is an abstract type. |
| IStarRating | StarRating type represents a numeric rating given to the media document by some authority. |
| IUrlReference | UrlReference type represents an URL together with a category that specifies what kind of URL is it. |

System.Storage.Meta

The following tables list examples of members exposed by the System.Storage.Meta namespace.

| Classes | |
|---|---|
| BuiltInField | |
| BuiltInFieldCollection | A BuiltInField collection |
| BuiltInFieldEnumerator | A class for enumerating a BuiltInField collection |
| BuiltInFieldHolder | a class to hold BuiltInField objects |
| BuiltInType | |
| ElementType | |
| Field | |
| FieldCollection | A Field collection |
| FieldEnumerator | A class for enumerating a Field collection |
| FieldHolder | a class to hold Field objects |
| Index | |
| IndexCollection | A Index collection |
| IndexEnumerator | A class for enumerating a Index collection |
| IndexField | |
| IndexFieldCollection | A IndexField collection |
| IndexFieldEnumerator | A class for enumerating a IndexField collection |
| IndexFieldHolder | a class to hold IndexField objects |
| IndexHolder | a class to hold Index objects |
| NestedField | |
| NestedFieldCollection | A NestedField collection |
| NestedFieldEnumerator | A class for enumerating a NestedField collection |
| NestedFieldHolder | a class to hold NestedField objects |
| ReferencedSchema | |
| ReferencedSchemaCollection | A ReferencedSchema collection |
| ReferencedSchemaEnumerator | A class for enumerating a ReferencedSchema collection |
| ReferencedSchemaHolder | a class to hold ReferencedSchema objects |
| RelatedValue | |
| RelatedValueCollection | A RelatedValue collection |
| RelatedValueEnumerator | A class for enumerating a RelatedValue collection |
| RelatedValueHolder | a class to hold RelatedValue objects |
| Relationship | |
| RelationshipCollection | A Relationship collection |
| RelationshipEnumerator | A class for enumerating a Relationship collection |
| RelationshipHolder | a class to hold Relationship objects |
| Schema | |
| Type | |
| View | |
| ViewCollection | A View collection |
| ViewEnumerator | A class for enumerating a View collection |
| ViewField | |
| ViewFieldCollection | A ViewField collection |
| ViewFieldEnumerator | A class for enumerating a ViewField collection |
| ViewFieldHolder | a class to hold ViewField objects |
| ViewHolder | a class to hold View objects |

| Interfaces | |
|---|---|
| IBuiltInFieldCollection | An interface representing a BuiltInField collection |
| IBuiltInFieldEnumerator | interface representing a class for enumerating a BuiltInField collection |
| IFieldCollection | An interface representing a Field collection |
| IFieldEnumerator | interface representing a class for enumerating a Field collection |
| IIndexCollection | An interface representing a Index collection |
| IIndexEnumerator | interface representing a class for enumerating a Index collection |
| IIndexFieldCollection | An interface representing a IndexField collection |
| IIndexFieldEnumerator | interface representing a class for enumerating a IndexField collection |
| INestedFieldCollection | An interface representing a NestedField collection |
| INestedFieldEnumerator | interface representing a class for enumerating a NestedField collection |
| IReferencedSchemaCollection | An interface representing a ReferencedSchema collection |
| IReferencedSchemaEnumerator | interface representing a class for enumerating a ReferencedSchema collection |
| IRelatedValueCollection | An interface representing a RelatedValue collection |
| IRelatedValueEnumerator | interface representing a class for enumerating a RelatedValue collection |
| IRelationshipCollection | An interface representing a Relationship collection |
| IRelationshipEnumerator | interface representing a class for enumerating a Relationship collection |
| IViewCollection | An interface representing a View collection |
| IViewEnumerator | interface representing a class for enumerating a View collection |
| IViewFieldCollection | An interface representing a ViewField collection |
| IViewFieldEnumerator | interface representing a class for enumerating a ViewField collection |

System.Storage.Meta.Interop

The following table lists examples of members exposed by the System.Storage.Meta.Interop namespace.

| Interfaces |
|---|
| IBuiltInField |
| IBuiltInType |
| IElementType |
| IField |
| IIndex |
| IIndexField |
| INestedField |
| IReferencedSchema |
| IRelatedValue |
| IRelationship |
| ISchema |
| IType |
| IView |
| IViewField |

System.Storage.NaturalUI

The following table lists examples of members exposed by the System.Storage.NaturalUI namespace.

| Classes | |
|---|---|
| Annotation | Links the interpretations to annotations. It is used to decorate the interpretation with both State and Phrase annotations. |
| AnnotationType | Enumeration of different annotation types supported.Following are the valid set of Annotation types: 1. BestBetExact 2. BestBetpartial 3. BiasedDown 4. BiasedUp 5. GeneratedBy 6. Required "Required" annotation type will implemented as a bias and biasedUp and biasedDown will also be implemented using biasedBy with positive/negative weights identifying each. |
| Cluster | A cluster is a grouping of locale and AnnotationSet. An AnnotationSet is a "partition" or application specific "string" that may be used to group logical data together and then selectively search over it. The concept of AnnotationSet followins from the NUIPEdit tool file format and it is the "basic unit of work". That is, the install process will work per AnnotationSet basis. |
| Culture | This is added to to support the internationalization feature. This entity serves dual purpose - along with storing all the languages supported by the Runtime Store, it also gives a mapping to the collations for each language which are used at runtime for matching query strings to phrase annotations based on rules such as accent or case sensitivity etc.. |
| NamedEntity | Named Entities are strongly typed entities like email, url, datetime etc that are recognized by LSP. We need to store the fully qualified name of the named entity type that the NUI Runtime as well as LSP recognizes. |
| Phrase | Phrases that are used to annotate proxy and proxy classes (basically interpretations). This is what we call the phrase annotations. |
| PhraseWord | Stores the association of words to phrases that constitute that phrase. |
| SerializedObject | From a Store stand point, the applications should be able to store any object and annotate it. The store needs to be as generic as possible. We don't have a hard requirement to recognize the structure of that data that is persisted. Therefore, we binary serialize the object or type instance and store it in a VARBINARY column. |
| StateRule | The state annotations are basically State Rule expressions that are authored by the NUI Authoring team. State rules will be created by developers as objects and stored in dlls. Along with Phrase, the fragments can be decorated with state annotations. |
| Type | The CLR type of the object instance persisted. This table holds both the Outer as well as the Inner type names. |
| Word | This represents the words in a Phrase. Words are shared across Phrases and hence are stored uniquely. A word is stored as a string along with the CHECKSUM value of the string. And for fast retrievals, it is this checksum that is indexed instead of the actual string. |

System.Storage.NaturalUI.Interop

The following table lists examples of members exposed by the System.Storage.NaturalUI.Interop namespace.

| Interfaces | |
|---|---|
| IAnnotation | Links the interpretations to annotations. It is used to decorate the interpretation with both State and Phrase annotations. |
| IAnnotationType | Enumeration of different annotation types supported.Following are the valid set of Annotation types: 1. BestBetExact 2. BestBetpartial 3. BiasedDown 4. BiasedUp 5. GeneratedBy 6. Required "Required" annotation type will implemented as a bias and biasedUp and biasedDown will also be implemented using biasedBy with positive/negative weights identifying each. |
| ICluster | A cluster is a grouping of locale and AnnotationSet. An AnnotationSet is a "partition" or application specific "string" that may be used to group logical data together and then selectively search over it. The concept of AnnotationSet followins from the NUIPEdit tool file format and it is the "basic unit of work". That is, the install process will work per AnnotationSet basis. |
| ICulture | This is added to to support the internationalization feature. This entity serves dual purpose - along with storing all the languages supported by the Runtime Store, it also gives a mapping to the collations for each language which are used at runtime for matching query strings to phrase annotations based on rules such as accent or case sensitivity etc.. |
| INamedEntity | Named Entities are strongly typed entities like email, url, datetime etc that are recognized by LSP. We need to store the fully qualified name of the named entity type that the NUI Runtime as well as LSP recognizes. |
| IPhrase | Phrases that are used to annotate proxy and proxy classes (basically interpretations). This is what we call the phrase annotations. |
| IPhraseWord | Stores the association of words to phrases that constitute that phrase. |
| ISerializedObject | From a Store stand point, the applications should be able to store any object and annotate it. The store needs to be as generic as possible. We don't have a hard requirement to recognize the structure of that data that is persisted. Therefore, we binary serialize the object or type instance and store it in a VARBINARY column. |
| IStateRule | The state annotations are basically State Rule expressions that are authored by the NUI Authoring team. State rules will be created by developers as objects and stored in dlls. Along with Phrase, the fragments can be decorated with state annotations. |
| IType | The CLR type of the object instance persisted. This table holds both the Outer as well as the Inner type names. |
| IWord | This represents the words in a Phrase. Words are shared across Phrases and hence are stored uniquely. A word is stored as a string along with the CHECKSUM value of the string. And for fast retrievals, it is this checksum that is indexed instead of the actual string. |

System.Storage.Notes

The following table lists examples of members exposed by the System.Storage.Notes namespace.

| Classes | |
|---|---|
| ImageTitle | An image title for an item. |
| JournalNote | A Windows Journal document. |
| Note | A base class for Notes. |
| StickyNote | A Sticky Note. |

System.Storage.Notes.Interop

The following table lists examples of members exposed by the System.Storage.Notes.Interop namespace.

| Interfaces | |
|---|---|
| IImageTitle | An image title for an item. |
| IJournalNote | A Windows Journal document. |
| INote | A base class for Notes. |
| IStickyNote | A Sticky Note. |

System.Storage.Notification

The following table lists examples of members exposed by the System.Storage.Notification namespace.

| Classes |
| --- |
| Subscription |

System.Storage.Principal

The following tables list examples of members exposed by the System.Storage.Principal namespace.

| Classes | |
| --- | --- |
| AccountCredentials | Describes the account information related to user/device accounts. |
| AccountCredentialsCollection | A AccountCredentials collection |
| AccountCredentialsEnumerator | A class for enumerating a AccountCredentials collection |
| AccountCredentialsHolder | a class to hold AccountCredentials objects |
| AccountInformation | This type holds the fields for user account credentials. |
| AccountInformationCollection | A AccountInformation collection |
| AccountInformationEnumerator | A class for enumerating a AccountInformation collection |
| AccountInformationHolder | a class to hold AccountInformation objects |
| Certificate | This type defines scheme attributes for storing a digital certificate, a X.509 certificate for instance. |
| CertificateCollection | A Certificate collection |
| CertificateEnumerator | A class for enumerating a Certificate collection |
| CertificateHolder | a class to hold Certificate objects |
| CreditCardIdentity | An IdentityReference holding credit card information. |
| CreditCardIdentityClaim | An IdentityClaim holding credit card information. |
| EmailIdentity | An IdentityReference containing an email address. |
| EmailIdentityClaim | An IdentityClaim containing an email address. |
| GuidIdentity | |
| GuidIdentityClaim | An IdentityClaim containing a GUID. |
| IdentityClaim | An IdentityClaim is a value assigned by an authority of a given type to identify a single principal during a given period of time. Examples of IdentityClaims include RFC 822 e-mail addresses, E.164 telephone numbers, Microsoft security identifiers (SIDs), and LDAP GUIDs. |
| IdentityClaimCollection | A IdentityClaim collection |
| IdentityClaimEnumerator | A class for enumerating a IdentityClaim collection |
| IdentityClaimHolder | a class to hold IdentityClaim objects |
| IdentityReference | An IdentityReference is a reference to an IdentityClaim. |
| IdentityReferenceCollection | A IdentityReference collection |
| IdentityReferenceEnumerator | A class for enumerating a IdentityReference collection |
| IdentityReferenceHolder | a class to hold IdentityReference objects |
| LdapDNIdentity | An IdentityReference containing an LDAP Distinguished Name. |
| LdapDNIdentityClaim | An IdentityClaim containing an LDAP Distinguished Name. |
| LegacyNT4Parameters | Things not relevant to "WinFS" Systems. AD has a number of parameters that they do not think are not used. However, they are not sure about what appcompat issues will ensue if they remove them completely; hence, they are hiding them under LegacyNTParameters. |
| LegacyNT4ParametersCollection | A LegacyNT4Parameters collection |
| LegacyNT4ParametersEnumerator | A class for enumerating a LegacyNT4Parameters collection |
| LegacyNT4ParametersHolder | a class to hold LegacyNT4Parameters objects |
| LicenseIdentity | An IdentityReference containing license information. |
| LicenseIdentityClaim | An IdentityClaim containing license information. |
| NonScalarString1024 | |
| NonScalarString1024Collection | A NonScalarString1024 collection |
| NonScalarString1024Enumerator | A class for enumerating a NonScalarString1024 collection |
| NonScalarString1024Holder | a class to hold NonScalarString1024 objects |
| NT4AccountIdentity | |
| NT4AccountIdentityClaim | |
| P2PIdentity | An IdentityReference containing P2P information. |
| P2PIdentityClaim | An IdentityClaim containing P2P information. |
| Principal | A Principal is a security principal. It can authenticate its identity, access resources, etc. |
| PrincipalCollection | A Principal collection |
| PrincipalEnumerator | A class for enumerating a Principal collection |
| PrincipalHolder | a class to hold Principal objects |
| PrincipalIdentityKey | This type is derived from Identity Key to provide support for signatures and time based identities keys (driver's licence, temporary accounts etc . . . ). |
| PrincipalIdentityKeyCollection | A PrincipalIdentityKey collection |
| PrincipalIdentityKeyEnumerator | A class for enumerating a PrincipalIdentityKey collection |
| PrincipalIdentityKeyHolder | a class to hold PrincipalIdentityKey objects |
| SecurityIdentity | SecurityIdentity Class |
| SecunityIdentityClaim | SecurityIdentityClaim Class |
| ServiceDelegationInfo | |
| ServiceDelegationInfoCollection | A ServiceDelegationInfo collection |
| ServiceDelegationInfoEnumerator | A class for enumerating a ServiceDelegationInfo collection |
| ServiceDelegationInfoHolder | a class to hold ServiceDelegationInfo objects |
| SignedNestedElement | |
| SignedNestedElementCollection | A SignedNestedElement collection |
| SignedNestedElementEnumerator | A class for enumerating a SignedNestedElement collection |
| SignedNestedElementHolder | a class to hold SignedNestedElement objects |
| SsnIdentity | An IdentityReference containing a Social Security Number. |
| SsnIdentityClaim | An IdentityClaim containing a Social Security Number. |
| TransitIdentity | An IdentityReference containing routing information for a bank. |
| TransitIdentityClaim | An IdentityClaim containing routing information for a bank. |
| UnknownIdentity | An unknown IdentityReference. |
| UnknownIdentityClaim | An unknown IdentityReference. |
| UpnIdentity | An IdentityReference that contains a UPN. |
| UpnIdentityClaim | An IdentityClaim that contains a UPN. |
| Interfaces | |
| IAccountCredentialsCollection | An interface representing a AccountCredentials collection |
| IAccountCredentialsEnumerator | interface representing a class for enumerating a AccountCredentials collection |
| IAccountInformationCollection | An interface representing a AccountInformation collection |
| IAccountInformationEnumerator | interface representing a class for enumerating a AccountInformation collection |
| ICertificateCollection | An interface representing a Certificate collection |

-continued

| | |
|---|---|
| ICertificateEnumerator | interface representing a class for enumerating a Certificate collection |
| IIdentityClaimCollection | An interface representing a IdentityClaim collection |
| IIdentityClaimEnumerator | interface representing a class for enumerating a IdentityClaim collection |
| IIdentityReferenceCollection | An interface representing a IdentityReference collection |
| IIdentityReferenceEnumerator | interface representing a class for enumerating a IdentityReference collection |
| ILegacyNT4ParametersCollection | An interface representing a LegacyNT4Parameters collection |
| ILegacyNT4ParametersEnumerator | interface representing a class for enumerating a LegacyNT4Parameters collection |
| INonScalarString1024Collection | An interface representing a NonScalarString1024 collection |
| INonScalarString1024Enumerator | interface representing a class for enumerating a NonScalarString1024 collection |
| IPrincipalCollection | An interface representing a Principal collection |
| IPrincipalEnumerator | interface representing a class for enumerating a Principal collection |
| IPrincipalIdentityKeyCollection | An interface representing a PrincipalIdentityKey collection |
| IPrincipalIdentityKeyEnumerator | interface representing a class for enumerating a PrincipalIdentityKey collection |
| IServiceDelegationInfoCollection | An interface representing a ServiceDelegationInfo collection |
| IServiceDelegationInfoEnumerator | interface representing a class for enumerating a ServiceDelegationInfo collection |
| ISignedNestedElementCollection | An interface representing a SignedNestedElement collection |
| ISignedNestedElementEnumerator | interface representing a class for enumerating a SignedNestedElement collection |
| Enumerations | |
| PasswordModifyMethod | |
| WellKnownSidType | This enumeration contains all of the well known SID types. |

System.Storage.Principal.Interop

The following table lists examples of members exposed by the System.Storage.Principal.Interop namespace.

| | |
|---|---|
| Interfaces | |
| IAccountCredentials | Describes the account information related to user/device accounts. |
| IAccountInformation | This type holds the fields for user account credentials. |
| ICertificate | This type defines scheme attributes for storing a digital certificate, a X.509 certificate for instance. |
| IIdentityClaim | An IdentityClaim is a value assigned by an authority of a given type to identify a single principal during a given period of time. Examples of IdentityClaims include RFC 822 e-mail addresses, E.164 telephone numbers, Microsoft security identifiers (SIDs), and LDAP GUIDs. |
| IIdentityReference | An IdentityReference is a reference to an IdentityClaim. |
| ILegacyNT4Parameters | Things not relevant to "WinFS" Systems. AD has a number of parameters that they do not think are not used. However, they are not sure about what appcompat issues will ensue if they remove them completely; hence, they are hiding them under LegacyNTParameters. |
| INonScalarString1024 | |
| IPrincipal | A Principal is a security principal. It can authenticate its identity, access resources, etc. |

| | |
|---|---|
| Interfaces | |
| IPrincipalIdentityKey | This type is derived from Identity Key to provide support for signatures and time based identities keys (driver's licence, temporary accounts etc . . . ). |
| IServiceDelegationInfo | |
| ISignedNestedElement | |

System.Storage.Programs

The following table lists examples of members exposed by the System.Storage.Programs namespace.

| Classes |
|---|
| Program |

System.Storage.Programs.Interop

The following table lists examples of members exposed by the System.Storage.Programs.Interop namespace.

| Interfaces |
|---|
| IProgram |

System.Storage.Service

The following table lists examples of members exposed by the System.Storage.Service namespace.

| | |
|---|---|
| Classes | |
| AuthenticationService | Holds the attributes for AuthenticationService in the system. |
| EndPoint | Each service can expose a number of service locations. These locations represent an association between the points of access for interacting with the service and the model or interface for manipulating the services available at that location. This class is consistent in nature with UDDI bindings and WSDL ports. The ELocation class currently exposed in the "WinFS" data model could potentially be useful in supporting this concept. The use of category and property information on this class will be considered secondary for the purposes of service location. This class will need to expose an overview document. This class will need to enforce referential integrity constraints between Binding,TechnicalModels and TechnicalModel.TechnicalModelKey |
| EndPointCollection | A EndPoint collection |
| EndPointEnumerator | A class for enumerating a EndPoint collection |
| EndPointHolder | a class to hold EndPoint objects |
| IntElement | A wrapper to support multi-valued ints. Used in the AuthenticationService definition. |
| IntElementCollection | A IntElement collection |
| IntElementEnumerator | A class for enumerating a IntElement collection |

| | |
|---|---|
| IntElementHolder | a class to hold IntElement objects |
| LocalizedDescription | Holds language-specific descriptions of an entity. |
| LocalizedDescriptionCollection | A LocalizedDescription collection |
| LocalizedDescriptionEnumerator | A class for enumerating a LocalizedDescription collection |
| LocalizedDescriptionHolder | a class to hold LocalizedDescription objects |
| LocalizedName | Holds language-specific names of an entity. |
| LocalizedNameCollection | A LocalizedName collection |
| LocalizedNameEnumerator | A class for enumerating a LocalizedName collection |
| LocalizedNameHolder | a class to hold LocalizedName objects |
| Service | Services are independent resources that can be manipulated through an electronic interface available at an identifiable location or address. Examples include web services and printing services. |
| ServiceProviderRelationship | |
| ServiceProviderRelationshipCollection | |
| SyncService | Sync item stores the sync profile information. For example, suppose we want to represent the AD service that sync's contact information. This would be represented as: Category = "Active Directory" Name = "redmond" (name of the forest/domain in which the contact resides) Last Sync, Last Sync Error, other sync-related parameters. Property Set = list of AD/"WinFS" properties to be sync'ed. An example of a property set might be phone number and office location, i.e., the schema designer can specify a partial sync rather than sync'ing down all the AD properties. |
| Interfaces | |
| IEndPointCollection | An interface representing a EndPoint collection |
| IEndPointEnumerator | interface representing a class for enumerating a EndPoint collection |
| IIntElementCollection | An interface representing a IntElement collection |
| IIntElementEnumerator | interface representing a class for enumerating a IntElement collection |
| ILocalizedDescriptionCollection | An interface representing a LocalizedDescription collection |
| ILocalizedDescriptionEnumerator | interface representing a class for enumerating a LocalizedDescription collection |
| ILocalizedNameCollection | An interface representing a LocalizedName collection |
| ILocalizedNameEnumerator | interface representing a class for enumerating a LocalizedName collection |

System.Storage.Service.Interop

The following table lists examples of members exposed by the System.Storage.Service.Interop namespace.

| Interfaces | |
|---|---|
| IAuthenticationService | Holds the attributes for AuthenticationService in the system. |
| IEndPoint | Each service can expose a number of service locations. These locations represent an association between the points of access for interacting with the service and the model or interface for manipulating the services available at that location. This class is consistent in nature with UDDI bindings and WSDL ports. The ELocation class currently exposed in the "WinFS" data model could potentially be useful in supporting this concept. The use of category and property information on this class will be considered secondary for the purposes of service location. This class will need to expose an overview document. This class will need to enforce referential integrity constraints between Binding,TechnicalModels and TechnicalModel.TechnicalModelKey |
| IIntElement | A wrapper to support multi-valued ints. Used in the AuthenticationService definition. |
| ILocalizedDescription | Holds language-specific descriptions of an entity. |
| ILocalizedName | Holds language-specific names of an entity. |
| IService | Services are independent resources that can be manipulated through an electronic interface available at an identifiable location or address. Examples include web services and printing services. |
| ISyncService | Sync item stores the sync profile information. For example, suppose we want to represent the AD service that sync's contact information. This would be represented as: Category = "Active Directory" Name = "redmond" (name of the forest/domain in which the contact resides) Last Sync, Last Sync Error, other sync-related parameters. Property Set = list of AD/"WinFS" properties to be sync'ed. An example of a property set might be phone number and office location, i.e., the schema designer can specify a partial sync rather than sync'ing down all the AD properties. |

System.Storage.ShellTask

The following tables list examples of members exposed by the System.Storage.ShellTask namespace.

| Classes | |
|---|---|
| Application | The top-level owner of Tasks and Implementations. |
| ApplicationExperienceRelationship | |
| ApplicationExperienceRelationshipCollection | |
| ApplicationImplementationRelationship | |
| ApplicationImplementationRelationshipCollection | |
| ApplicationManifestRelationship | |
| ApplicationManifestRelationshipCollection | |
| ApplicationTaskRelationship | |
| ApplicationTaskRelationshipCollection | |
| AttachmentsRelationship | |
| Attachments.RelationshipCollection | |

| | |
|---|---|
| AutomatedTask | An AutomatedTask is a task that does not involve human intervention such as printing a document. |
| Category | Categories are a user-browsable taxonomy containing Tasks. |
| EntryPoint | Defines a way to launch code or browse to a page. |
| EntryPointCollection | A EntryPoint collection |
| EntryPointEnumerator | A class for enumerating a EntryPoint collection |
| EntryPointHolder | a class to hold EntryPoint objects |
| Experience | Experience describes the folder being browsed, file type selected, or other user experience during which a Task might appear. A Task is mapped to an Experience through a Scope. Examples of experience might be: 'ShellTask.InMyDocumentsFolder', 'ShellTask.ImageFilesSelected', 'ShellTask.StartPage', etc. |
| ExperienceScopeLinkRelationship | |
| ExperienceScopeLinkRelationshipCollection | |
| ExtendsExperienceLinkRelationship | |
| ExtendsExperienceLinkRelationshipCollection | |
| Implementation | An entry point which can be launched as a result of a Task being clicked. |
| OrderedLink | Use this type to link items in a particular order. |
| OrderedLinkCollection | A OrderedLink collection |
| OrderedLinkEnumerator | A class for enumerating a OrderedLink collection |
| OrderedLinkHolder | a class to hold OrderedLink objects |
| Scope | Scope defines in what Presentation a Task should appear during a certain Experience. A Task is mapped to an Experience through a Scope. Examples of Scopes might be: 'The Task Pane in the MyDocuments folder', 'The Context menu when an Image file is selected', etc. |
| ScopeLink | Used to link Scopes to an Experience. |
| ScopeLinkCollection | A ScopeLink collection |
| ScopeLinkEnumerator | A class for enumerating a ScopeLink collection |
| ScopeLinkHolder | a class to hold ScopeLink objects |
| ScopeTaskLinkRelationship | |
| ScopeTaskLinkRelationshipCollection | |
| ShellTaskRelationship | |
| ShellTaskRelationshipCollection | |
| SubjectTerm | SubjectTerms are used as a user-browsable Index for Tasks. |
| Task | A Shell Task is a representation of something the system can do such as print a document, send a message or reconfigure the desktop. |
| TaskCategoryList | |
| TaskCategoryListCollection | A TaskCategoryList collection |
| TaskCategoryListEnumerator | A class for enumerating a TaskCategoryList collection |
| TaskCategoryListHolder | a class to hold TaskCategoryList objects |
| TaskCategoryTopImplementationList | |
| TaskCategoryTopImplementationListCollection | A TaskCategoryTopImplementationList collection |
| TaskCategoryTopImplementationListEnumerator | A class for enumerating a TaskCategoryTopImplementationList collection |

| | |
|---|---|
| TaskCategoryTopImplementationListHolder | a class to hold TaskCategoryTopImplementationList objects |
| TasIdmplementationLinkRelationship | |
| TaskImplementationLinkRelationshipCollection | |
| TaskImplementationList | |
| TaskImplementationListCollection | A TaskImplementationList collection |
| TaskImplementationListEnumerator | A class for enumerating a TaskImplementationList collection |
| TaskImplementationListHolder | a class to hold TaskImplementationList objects |
| TaskScopeImplementationList | |
| TaskScopeImplementationListCollection | A TaskScopeImplementationList collection |
| TaskScopeImplementationListEnumerator | A class for enumerating a TaskScopeImplementationList collection |
| TaskScopeImplementationListHolder | a class to hold TaskScopeImplementationList objects |
| TaskScopeList | |
| TaskScopeListCollection | A TaskScopeList collection |
| TaskScopeListEnumerator | A class for enumerating a TaskScopeList collection |
| TaskScopeListHolder | a class to hold TaskScopeList objects |
| TaskStateLinkRelationship | |
| TaskStateLinkRelationshipCollection | |
| TaskTopImplementationList | |
| TaskTopImplementationListCollection | A TaskTopImplementationList collection |
| TaskTopImplementationListEnumerator | A class for enumerating a TaskTopImplementationList collection |
| TaskTopImplementationListHolder | a class to hold TaskTopImplementationList objects |
| WindowsUser | A windows user. |
| WindowsUserCollection | A WindowsUser collection |
| WindowsUserEnumerator | A class for enumerating a WindowsUser collection |
| WindowsUserHolder | a class to hold WindowsUser objects |
| Interfaces | |
| IEntryPointCollection | An interface representing a EntryPoint collection |
| IEntryPointEnumerator | interface representing a class for enumerating a EntryPoint collection |
| IOrderedLinkCollection | An interface representing a OrderedLink collection |
| IOrderedLinkEnumerator | interface representing a class for enumerating a OrderedLink collection |
| IScopeLinkCollection | An interface representing a ScopeLink collection |
| IScopeLinkEnumerator | interface representing a class for enumerating a ScopeLink collection |
| ITaskCategoryListCollection | An interface representing a TaskCategoryList collection |
| ITaskCategoryListEnumerator | interface representing a class for enumerating a TaskCategoryList collection |
| ITaskCategoryTopImplementationListCollection | An interface representing a TaskCategoryTopImplementationList collection |
| ITaskCategoryTopImplementationListEnumerator | interface representing a class for enumerating a TaskCategoryTopImplementationList collection |
| ITaskImplementationListCollection | An interface representing a TaskImplementationList collection |
| ITaskImplementationListEnumerator | interface representing a class for enumerating a TaskImplementationList collection |

| | |
|---|---|
| ITaskScopeImplementationListCollection | An interface representing a TaskScopeImplementationList collection |
| ITaskScopeImplementationListEnumerator | interface representing a class for enumerating a TaskScopeImplementationList collection |
| ITaskScopeListCollection | An interface representing a TaskScopeList collection |
| ITaskScopeListEnumerator | interface representing a class for enumerating a TaskScopeList collection |
| ITaskTopImplementationListCollection | An interface representing a TaskTopImplementationList collection |
| ITaskTopImplementationListEnumerator | interface representing a class for enumerating a TaskTopImplementationList collection |
| IWindowsUserCollection | An interface representing a WindowsUser collection |
| IWindowsUserEnumerator | interface representing a class for enumerating a WindowsUser collection |

System.Storage.ShellTask.Interop

The following table lists examples of members exposed by the System. Storage.ShellTask.Interop namespace.

| Interfaces | |
|---|---|
| IApplication | The top-level owner of Tasks and Implementations. |
| IAutomatedTask | An AutomatedTask is a task that does not involve human intervention such as printing a document. |
| ICategory | Categories are a user-browsable taxonomy containing Tasks. |
| IEntryPoint | Defines a way to launch code or browse to a page. |
| IExperience | Experience describes the folder being browsed, file type selected, or other user experience during which a Task might appear. A Task is mapped to an Experience through a Scope. Examples of experience might be: 'ShellTask.InMyDocumentsFolder', 'ShellTask.ImageFiles Selected', 'ShellTask.StartPage', etc. |
| IImplementation | An entry point which can be launched as a result of a Task being clicked. |
| IOrderedLink | Use this type to link items in a particular order. |
| IScope | Scope defines in what Presentation a Task should appear during a certain Experience. A Task is mapped to an Experience through a Scope. Examples of Scopes might be: 'The Task Pane in the MyDocuments folder', 'The Context menu when an Image file is selected', etc. |
| IScopeLink | Used to link Scopes to an Experience. |
| ISubjectTerm | SubjectTerms are used as a user-browsable Index for Tasks. |
| ITask | A Shell Task is a representation of something the system can do such as print a document, send a message or reconfigure the desktop. |

| Interfaces | |
|---|---|
| ITaskCategoryList | |
| ITaskCategoiyTopImplementationList | |
| ITaskImplementationList | |
| ITaskScopeImplementationList | |
| ITaskScopeList | |
| ITaskTopImplementationList | |
| IWindowsUser | A windows user. |

System.Storage.Synchronization

The following tables list examples of members exposed by the System.Storage.Synchronization namespace.

| Classes |
|---|
| AcknowledgeChanges |
| AdapterAttribute |
| AdapterConfigHandler |
| AdapterFactoryTypeAttribute |
| AdapterInstaller. |
| AdapterKnowledgeManager |
| AdvertiseChanges |
| Awareness |
| CancellableObject |
| Change |
| ChangeAcknowledgement |
| ChangeAcknowledgement Writer |
| ChangeApplier |
| ChangeMetaData |
| ChangeReader |
| ChangeRetriever |
| Changes |
| ChangeStatus |
| ChangeWriter |
| ConfigurationTypeAttribute |
| Conflict |
| ConflictDictionary |
| ConflictHandler |
| ConflictHandlerContext |
| ConflictHandlerList |
| ConflictHandlerTypesHelper |
| ConflictHandlingSession |
| ConflictInformation |
| ConflictLog |
| ConflictManager |

65
-continued

ConflictRecord
ConflictRecordCollection
ConflictResult
ConflictResultInformation
ConveyChanges
DefaultChangeApplier
DefaultChangeApplierBase
DefaultChangeApplierConfiguration
DefaultChangeRetriever
DefaultChangeRetrieverBase
DefaultChangeRetrieverConfiguration
DefaultConflictFilter
DefaultConflictResolver
DeleteUpdateConflict
EmptyProfileConfigurationException
EndpointAccessException
EndPointFormatAttribute
FolderNotFoundException
GetItemAwarenessResult
HashEntry
InsertInsertConflict
InvalidSynchronizationProfileException
ItemAwarenessIndexElement
ItemAwarenessProperties
Knowledge
KnowledgeScopeIncludeAttribute
ListHashEnumerator
ListHashtable
LocalChangeAcknowledgementWriter
LocalEndpoint
LocalKnowledgeFormatAttribute
LoggedConflictResult
MappingNotFoundException
NativeMethods
OutOfSyncException
PartnerAwareness
ProgressValue
ProjectInstaller
Query
RejectedConflictResult
RemoteAdapterFactory
RemoteChangeApplierConfigurationAttribute
RemoteChangeRetrieverConfigurationAttribute
RemoteData
RequestChanges
ResolvedConflictResult
ResponseFault
Scope
StateChangeEventArgs
StoredKnowledgeChangeReader
StoredKnowledgeChangeWriter
SuppliedKnowledgeChangeReader
SuppliedKnowledgeChangeWriter
SynchronizationAdapter
SynchronizationCancelledException
SynchronizationEvents
SynchronizationProfile
SynchronizationRequest
SynchronizationRuntimeInstaller
SynchronizationSession
SynchronizeCompletedEventArgs
SynchronizeProgressChangedEventArgs
UnableToDeserializeProfileException
UnhandledConflictException
UpdateDeleteConflict
UpdateUpdateConflict
Version
WinfsAdapterConfiguration
WinFSChangeApplier
WinFSChangeRetriever
WinfsRemoteEndpoint
WinFSSyncDcomClass
WinFSSyncDcomClientClass
WinFSSyncDcomServerClass
WinfsSyncException
WinfsSynchronizationAdapter
WinfsSynchronizationAdapterFactory
WinfsSynchronizationAdapterInstaller
WinfsSynchronizationMapping
WinfsSynchronizationMappingManager

66
-continued

WinfsSyncTransportException.
WSSyncMessage

Interfaces

IAdapterFactory
ICancellable
ISynchronizationEventsCallback
ISynchronizationRequest
IWinFSSyncDcomClient
IWinFSSyncDcomListener
IWinFSSyncDcomServer
WinFSSyncDcom
WinFSSyncDcomClient
WinFSSyncDcomServer Enumerations AwarenessComparisonResult
AwarenessLevelOfItem
ChangeResult
ConflictLogAction
ConflictResolutionType
DefaultConflictResolverResolutionType
ItemAwarenessType
QueryFormat
ReadState
SessionState
SyncChangeType
SynchronizationState
SynchronizationTypes
WinfsAdapterConfigurationFlags
WriteState
WSSyncMessageType Structures KnowledgeScopingId Delegates CancelHandler
StateChangedEventHandler
StateChangingEventHandler
SynchronizeCompletedEventHandler
SynchronizeProgressChangedEventHandler
SynchronizeStartedEventHandler System.Storage.Synchronization.Interop The following tables list examples of members exposed by the System.Storage.Synchronization.Interop namespace.

Classes

WinfsSynchronizationConfiguration

Interfaces

IWinfsSynchronizationConfiguration

System.Storage.Synchronization.Scheduling

The following tables list examples of members exposed by the System.Storage.Synchronization.Scheduling namespace.

Classes

DailyTrigger
IdleTrigger
IntervalTrigger
LogonTrigger
RunOnceTrigger
SyncScheduler
SystemStartTrigger
Task
TaskList -continued TemporalTrigger
Trigger
TriggerCollection
Enumerations DaysOfTheWeek
MonthsOfTheYear
WeeksOfTheMonth

System.Storage.Synchronization.SyncHandler

The following tables list examples of members exposed by the System.Storage.Synchronization.SyncHandler namespace.

Classes

WinFSSyncHandlerBase
Enumerations

ProfileType

System.Storage.UserTask

The following table lists examples of members exposed by the System.Storage.UserTask namespace.

| Classes | |
|---|---|
| Appointment | The Appointment type defines an event that happens for a limited period of time. |
| Event | The Event type defines an event that lasts over a period of time such as a user conference. |
| Meeting | The Meeting type defines a meeting event. |
| TaskApplicationRelationship | |
| TaskApplicationRelationshipCollection | |
| TaskCompaniesRelationship | |
| TaskCompaniesRelationshipCollection | |
| TaskDelegatorRelationship | |
| TaskDelegatorRelationshipCollection | |
| TaskOwnerRelationship | |
| TaskOwnerRelationshipCollection | |
| TaskRecipientsRelationship | |
| TaskRecipientsRelationshipCollection | |
| TaskRequestAcceptItem | The TaskRequestAcceptItem type defines behavior used when a task is used as a part of request for acceptance. |
| TaskRequestDeclineItem | The TaskRequestDeclineItem type defines behavior used when a task is used as a part of decline. |
| TaskRequestItem | The TaskRequestItem type defines behavior used when a task is used as a part of request. |
| TaskRequestUpdateItem | The TaskRequestUpdateItem type defines behavior used when a task is used as a part of request for update. |
| UserTask | A UserTask is something that someone does. |

System.Storage.UserTask.Interop

The following table lists examples of members exposed by the System.Storage.UserTask.Interop namespace.

| Interfaces | |
|---|---|
| IAppointment | The Appointment type defines an event that happens for a limited period of time. |
| IEvent | The Event type defines an event that lasts over a period of time such as a user conference. |
| IMeeting | The Meeting type defines a meeting event. |
| ITaskRequestAcceptItem | The TaskRequestAcceptItem type defines behavior used when a task is used as a part of request for acceptance. |
| ITaskRequestDeclineItem | The TaskRequestDeclineItem type defines behavior used when a task is used as a part of decline. |
| ITaskRequestItem | The TaskRequestItem type defines behavior used when a task is used as a part of request. |
| ITaskRequestUpdateItem | The TaskRequestUpdateItem type defines behavior used when a task is used as a part of request for update. |
| IUserTask | A UserTask is something that someone does. |

System.Storage.Video

The following tables list examples of members exposed by the System.Storage.Video namespace.

| Classes | |
|---|---|
| RecordedTV | |
| Video | The type Video.Video represents a video recording. |
| VideoClip | |
| VideoClipCollection | A VideoClip collection |
| VideoClipEnumerator | A class for enumerating a VideoClip collection |
| VideoClipHolder | a class to hold VideoClip objects |
| Interfaces | |
| IVideoClipCollection | An interface representing a VideoClip collection |
| IVideoClipEnumerator | interface representing a class for enumerating a VideoClip collection |

System.Storage.Video.Interop

The following table lists examples of members exposed by the System.Storage.Video.Interop namespace.

| Interfaces | |
|---|---|
| IRecordedTV | |
| IVideo | The type Video.Video represents a video recording. |
| IVideoClip | |

System.Storage.Watcher

The following tables list examples of members exposed by the System.Storage.Watcher namespace.

| Classes | |
|---|---|
| FolderItemWatcher | a watcher to monitor item events under a folder |
| FolderItemWatcherState | a Folder watcher state |
| ItemChangeDetail | |
| ItemChangeDetailCollection | |
| ItemChangedEventArgs | ItemChangedEventArgs |

-continued

| | |
|---|---|
| ItemWatcher | watcher modified/removed events on an object |
| StoreEventArgs | EventArgs returned from "WinFS" Store |
| WatcherState | WatcherState |
| Enumerations | |
| FolderItemWatcherOptions | the options can be passed to ctors of FolderItemWatcher. The options can be added together by | |
| ItemWatcherOptions | options on ItemWatcher |
| WatcherEventType | |
| Delegates | |
| ItemChangedEventHandler | delegate for ItemChangedEvent in Watcher |
| OnStoreEventHandler | |

System.Storage.Watcher.Interop

The following table lists examples of members exposed by the System.Storage.Watcher.Interop namespace.

| Interfaces | |
|---|---|
| IFolderItemWatcher | a watcher to monitor item events under a folder |
| IFolderitemWatcherState | a Folder watcher state |
| IItemChangeDetail | |
| IItemChangedEventData | ItemChangedEventArgs |
| IItemWatcher | a watcher to monitor item modified\removed events |
| IStoreEventData | EventArgs returned from "WinFS" Store |
| IWatcherEvent | Implement this class in a COM app to receive events from an ItemWatcher or FolderItemWatcher |
| IWatcherState | WatcherState |

Example Computing System and Environment

Figure 5:
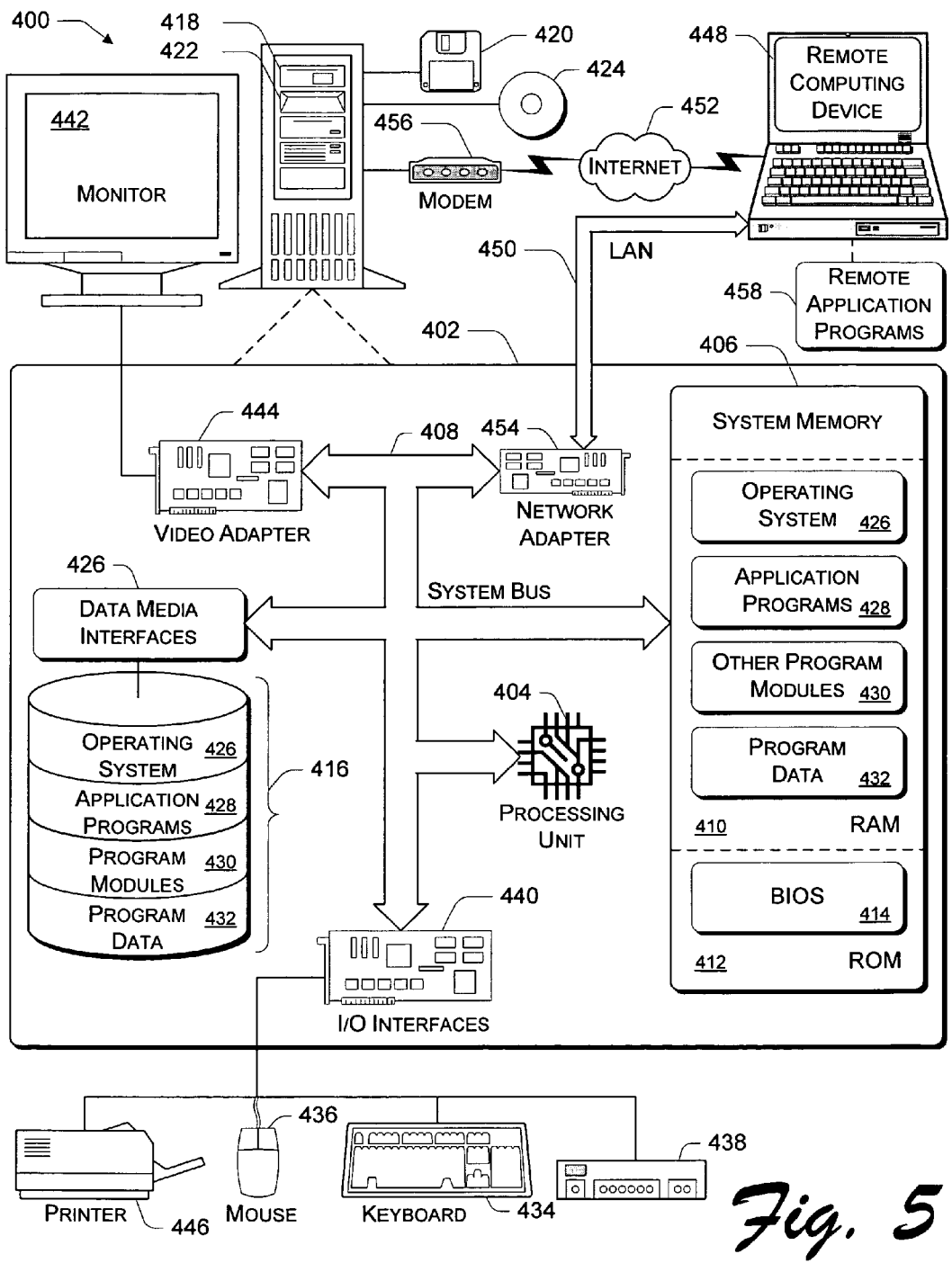
FIG. 5 is a block diagram of an exemplary computer that may execute all or part of the software architecture.

FIG. 5 illustrates an example of a suitable computing environment 400 within which the programming framework 132 may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, by are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 5 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132 and/or 150, and particularly, the API included in the framework 132 and/or 150 or calls made to the API included in the framework 132 and/or 150, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 6:
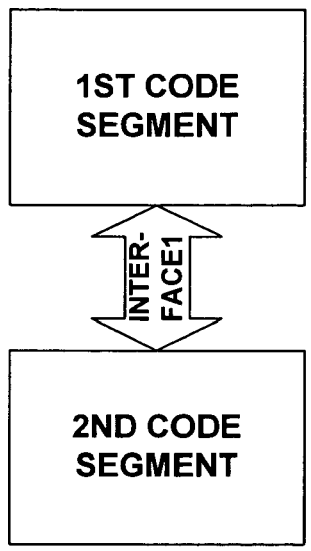
FIGS. 6, 7, 8, 9, 10, 11, 12, 13, 14, 15, 16, and 17 illustrate various example implementations of a programming interface.
Figure 7:
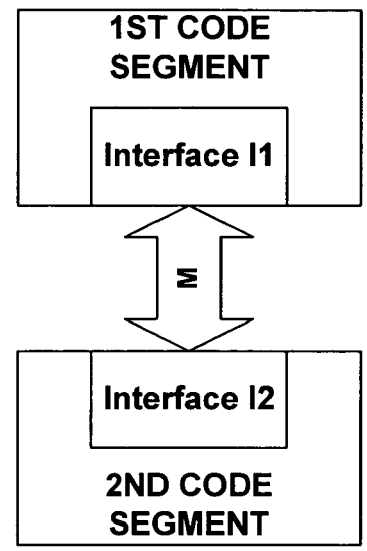

Notionally, a programming interface may be viewed generically, as shown in FIG. 6 or FIG. 7. FIG. 6 illustrates an interface Interface1 as a conduit through which first and second code segments communicate. FIG. 7 illustrates an interface as comprising interface objects I1 and I2 (which may or may not be part of the first and second code segments), which enable first and second code segments of a system to communicate via medium M. In the view of FIG. 7, one may consider interface objects I1 and I2 as separate interfaces of the same system and one may also consider that objects I1 and I2 plus medium M comprise the interface. Although FIGS. 6 and 7 show bi-directional flow and interfaces on each side of the flow, certain implementations may only have information flow in one direction (or no information flow as described below) or may only have an interface object on one side. By way of example, and not limitation, terms such as application programming or program interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 6 and 7, but they nonetheless perform a similar function to accomplish the same overall result. We will now briefly describe some illustrative alternative implementations of a programming interface.

A. Factoring

Figure 8:
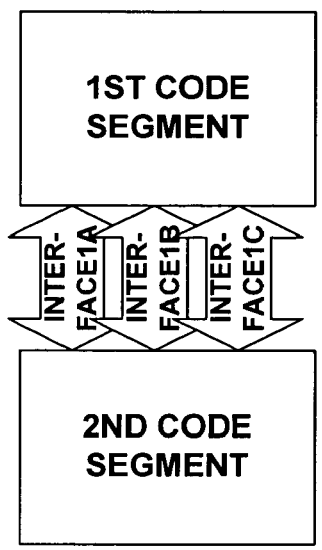
Figure 9:
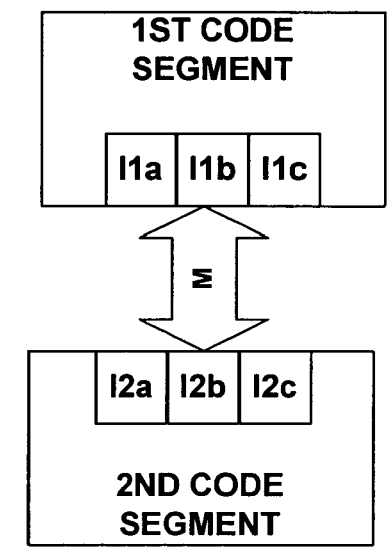

A communication from one code segment to another may be accomplished indirectly by breaking the communication into multiple discrete communications. This is depicted schematically in FIGS. 8 and 9. As shown, some interfaces can be described in terms of divisible sets of functionality. Thus, the interface functionality of FIGS. 6 and 7 may be factored to achieve the same result, just as one may mathematically provide 24, or 2 times 2 times 3 times 2. Accordingly, as illustrated in FIG. 8, the function provided by interface Interface1 may be subdivided to convert the communications of the interface into multiple interfaces Interface1A, Interface 1B, Interface 1C, etc. while achieving the same result. As illustrated in FIG. 9, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 8 and 9, the functional spirit of interfaces Interface1 and I1 remain the same as with FIGS. 6 and 7, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 10:
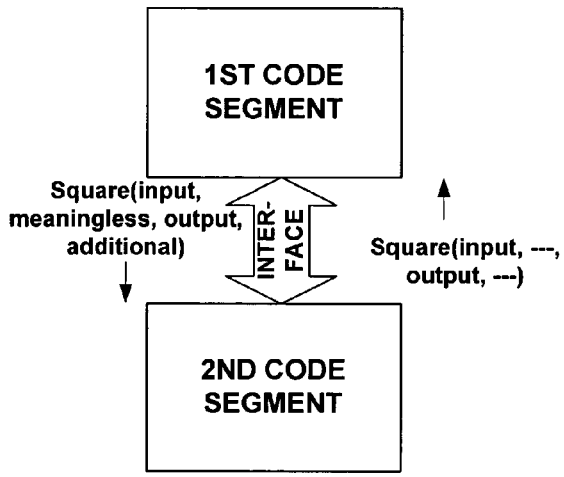
Figure 11:
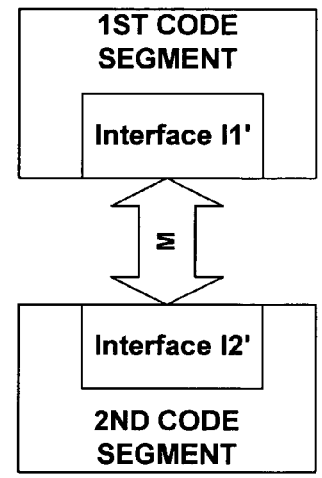

In some cases, it may be possible to ignore, add or redefine certain aspects (e.g., parameters) of a programming interface while still accomplishing the intended result. This is illustrated in FIGS. 10 and 11. For example, assume interface Interface1 of FIG. 6 includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 10, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 11, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 12:
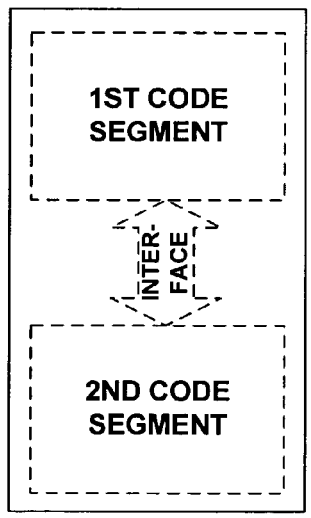
Figure 13:
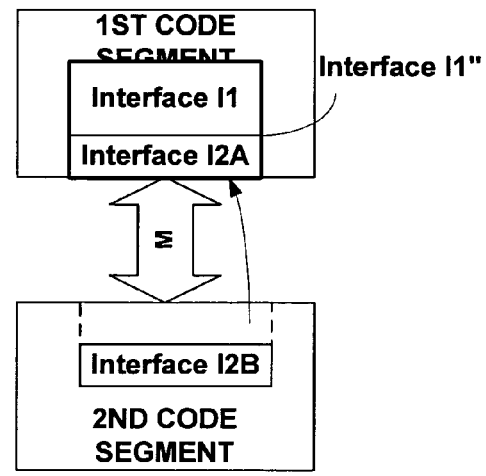

It may also be feasible to merge some or all of the functionality of two separate code modules such that the "interface" between them changes form. For example, the functionality of FIGS. 6 and 7 may be converted to the functionality of FIGS. 12 and 13, respectively. In FIG. 12, the previous $1^{st}$ and $2^{nd}$ Code Segments of FIG. 6 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 13, part (or all) of interface I2 from FIG. 7 may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 7 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 14:
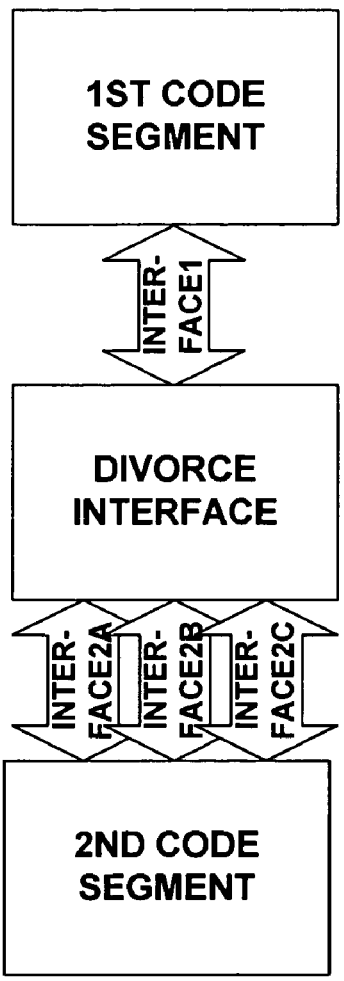
Figure 15:
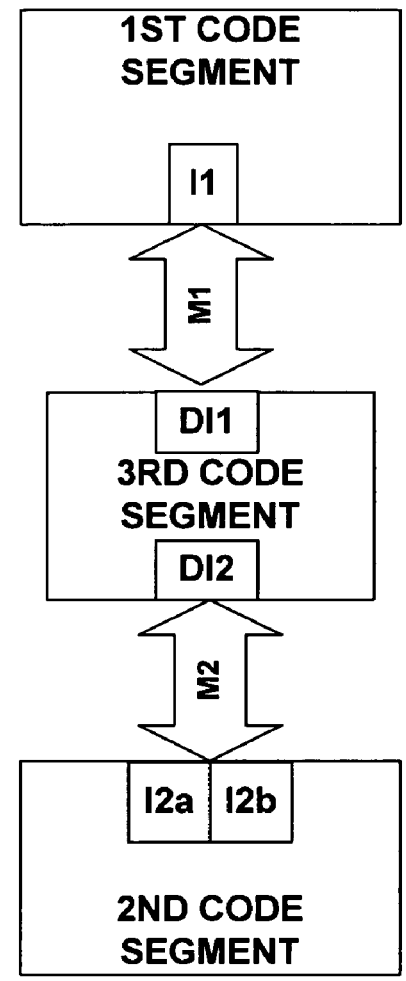

A communication from one code segment to another may be accomplished indirectly by breaking the communication into multiple discrete communications. This is depicted schematically in FIGS. 14 and 15. As shown in FIG. 14, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 15, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 7 to a new operating system, while providing the same or similar functional result.

E. Rewriting

Figure 16:
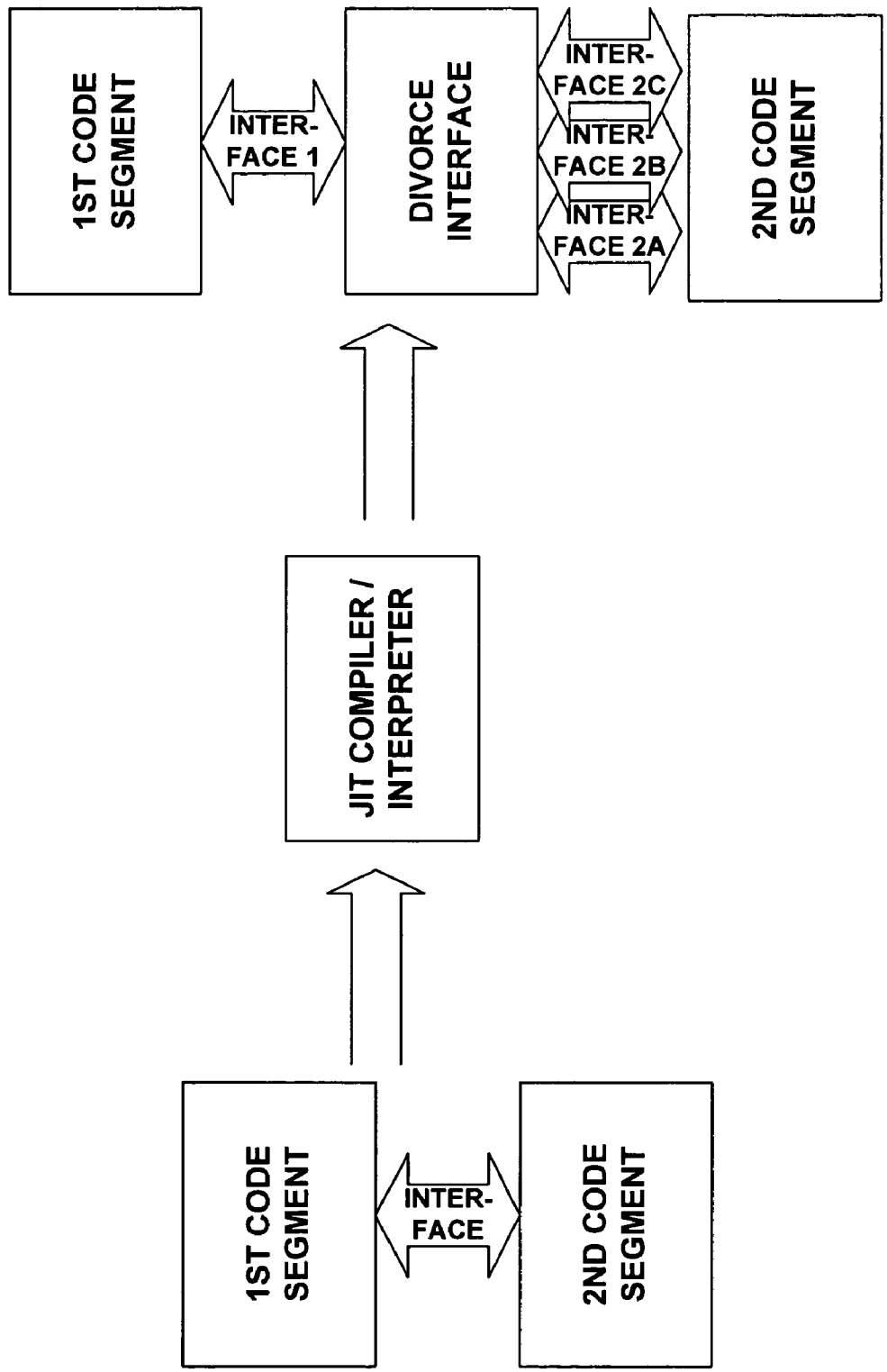
Figure 17:
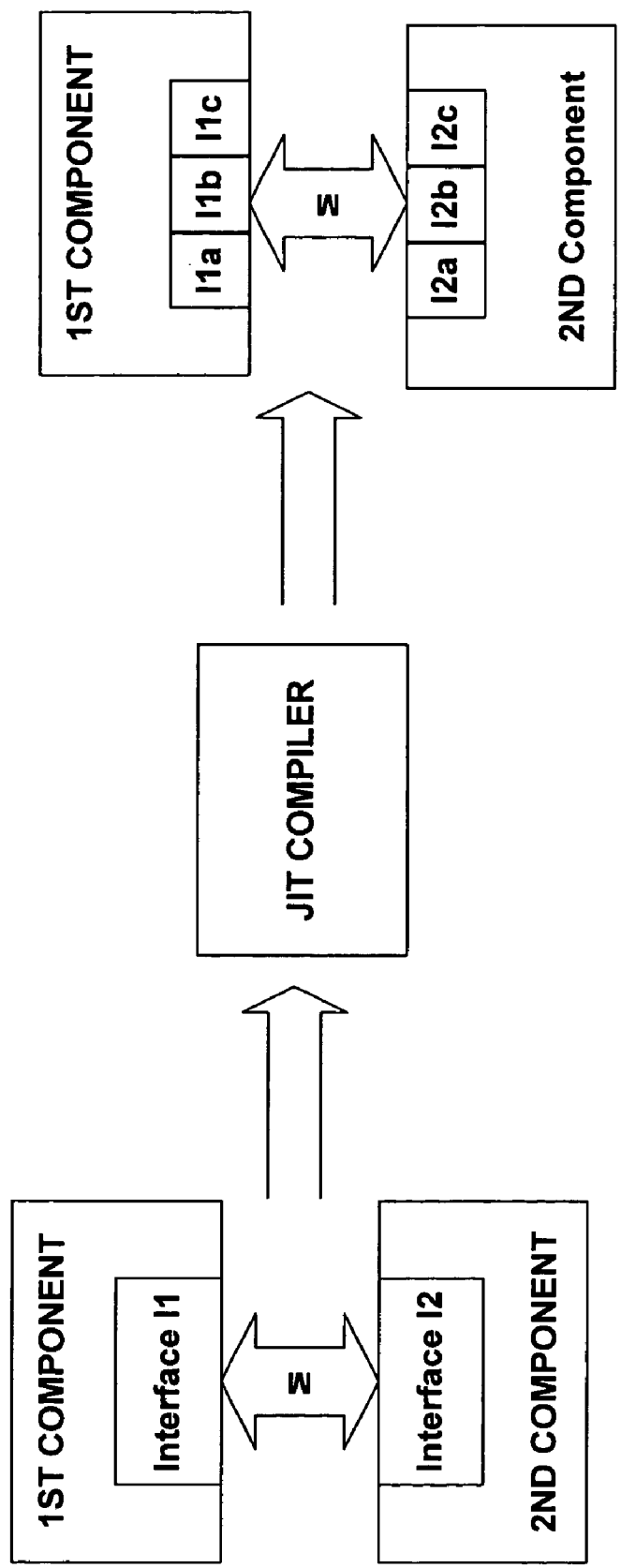

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime 11 environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 16 and 17. As can be seen in FIG. 16, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 17, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 6 and 7. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A processor-accessible computer readable device comprising processor-executable instructions stored thereon that, when executed, direct a device to perform a method comprising:
   converting a plurality of programs into corresponding intermediate language programs, the plurality of programs being written in different programming languages but according to a common language specification;
   exposing resources of an operating system or an object model service via application program interface (API) functions of a program interface layer to the plurality of intermediate language programs, the program interface layer to receive calls to the API functions from the plurality of intermediate language programs, wherein one of the API functions communicates in a first form and another of the API functions communicates in a second form that is incompatible with the first form;
   providing a common language run time layer that hands calls to the API functions of the program interface layer by the plurality of intermediate language programs to the operation system or the object model server for execution;
   creating a plurality of namespaces to organize the API functions of the program interface layer, the namespaces including a first namespace that includes API functions of the program interface layer that enable identification of particular physical locations, a second namespace that includes API functions of the program interface layer that are expected to be used by the first namespace; and
   converting a communication associated with an API function of the program interface layer from the first form to the second form.

2. A computer readable device as recited in claim 1, wherein the API functions are organized into groups according to type, the groups including:
   a first group of types related to core file system concepts;
   a second group of types related to entities that a human being can contact;
   a third group of types related to documents;
   a fourth group of types common to multiple kinds of media;
   a fifth group of types specific to audio media;
   a sixth group of types specific to video media;
   a seventh group of types specific to image media;
   an eighth group of types specific to electronic mail messages; and
   a ninth group of types related to identifying particular locations.

3. A computer readable device as recited in claim 2, wherein the groups further include a tenth group of types related to creating and managing rules for generating notifications.

4. A computer readable device as recited in claim 2, wherein the groups further include a tenth group of types describing types defined in all the other groups of types.

5. A computer readable device as recited in claim 2, wherein the groups further include a tenth group of types related to base types that form a foundation to support all the other groups of types.

6. A computer readable device as recited in claim 2, wherein the groups further include a tenth group of types common to multiple kinds of messages, including the electronic mail messages; and an eleventh group of types specific to facsimile messages.

7. A computer readable device as recited in claim 2, wherein the groups further include a tenth group of types related to annotations; and an eleventh group of types related to notes.

8. A computer readable device as recited in claim 2, wherein the groups further include a tenth group of types related to installed programs; and an eleventh group of types related to installed games.

9. A computer readable device as recited in claim 2, wherein the groups further include a tenth group of types related to actions taken by a user; and an eleventh group of types related to maintaining and accessing help information.

10. A computer readable device as recited in claim 2, wherein the groups further include a tenth group of types related to a natural language search engine.

11. A computer readable device as recited in claim 2, wherein the groups further include a tenth group of types related to tasks in a user interface to let a user know what actions the user can perform when navigating the user interface.

12. A computer readable device as recited in claim 2, wherein the groups further include a tenth group of types related to user tasks.

13. A computer readable device as recited in claim 2, wherein the groups further include a tenth group of types related to services that can be accessed.

14. A computer readable device as recited in claim 13, wherein the services can be accessed over a network.

15. A computer readable device as recited in claim 2, wherein the groups further include a tenth group of types related to identifying access rights.

16. A computer readable device as recited in claim 2, wherein the groups further include a tenth group of types related to calendar types.

17. A computer readable device as recited in claim 2, wherein the groups further include a tenth group of types related to creating and managing event monitoring and resultant actions.

18. A computer readable device as recited in claim 2, wherein the groups further include a tenth group of types used for interop for each of the first through ninth groups of types.

19. A computer readable device as recited in claim 2, wherein the group further include an additional group of types for each of the first through ninth groups of bytes, wherein each of the additional groups of types are for interop.

20. A computer readable device as recited in claim 2, wherein the group further include a tenth group of types related to files stored in a file system.

21. A computer readable device as recited in claim 2, wherein the groups further include a tenth group of types related to a category hierarchy.

22. A system framework comprising:
an operating system having a plurality of resources;
a common language runtime layer running on top of the operating system that enables at least one intermediate language application to access at least one resource of the operating system;
an application programming interface layer running on top of the common language runtime layer, the application program interface layer including functions that enable the at least one intermediate language application to access the at least one resource of the operating system via the common language runtime layer, the functions include a first function that communicates in a first form and a second function that communicates in a second form that is incompatible with the first form, the functions being organized into sets according to a file system of the application programming interface layer, the sets of functions including:
a first set of functions that represent core concepts of a file system of the system;
a second set of functions that enable maintaining information regarding entities that can be contacted; and
a third set of functions that allow document types to be accessed, wherein the application programming interface layer is to receive at least one call to one or more functions in at least one of the sets from the intermediate language application, and to convert a communication associated with one of the functions from the first form the second form.

23. A system framework as recited in claim 22, wherein the functions further comprises a fourth set of functions related to base types for a plurality of kinds of media a fifth set of functions related specifically to audio media; and a sixth set of functions related specifically to video media.

24. A system framework as recited in claim 23, wherein the functions further comprises a seventh set of functions related specifically to image media.

25. A system framework as recited in claim 22, wherein the functions further comprises a fourth set of functions related specifically to electronic mail messages.

26. A system framework as recited in claim 22, wherein the functions comprises a fourth set of functions that enable maintaining physical location information.

27. A method of organizing a set of application program interface (API) functions of an API layer in a program development computer system into a hierarchical namespace, the method comprising:
creating a plurality of groups in a file system that resides on a server of the program development computer system for the set of API functions according to type, each group containing logically related API functions of the application program interface; wherein one of the API functions communicates in first form and another of the API functions communicates in a second form that is incompatible with the first form;
assigning a name to each group using the program development computer system, wherein one of the groups includes at least one API function related to core concepts of the file system, wherein another of the groups includes at least one API function related to entities that a human being can contact, wherein another of the groups includes at least one API function related to document types that can be stored in the file system, and wherein another of the groups includes at least one API function related to multiple kinds of media;
selecting a top level identifier and prefixing the name of each group with the top level identifier using the program development computer system so that the types in each group are referenced by a hierarchical name that includes the selected top level identifier prefixed to the name of the group containing the type; converting a communication associated with an API function of the API layer from the first form to the second form.

28. A method as recited in claim 27, wherein another of the groups includes at least one API function for audio media, wherein another of the groups includes at least one function for video media, and wherein another of the groups in the plurality includes at least one API function particularly for image media.

29. A method as recited in claim 27, wherein another of the groups in the plurality includes at least one API function related to electronic mail.

30. A method as recited in claim 27, wherein another of the groups includes at least one API function related to maintaining physical location information.

31. A method as recited in claim 27, wherein the assigning comprises: assigning a name of Core to the group that includes at least one API function related to core concepts of the file system so that the hierarchical name for the group that includes at least one API function related to core concepts of the file system is System.Storage.Core; assigning a name of Contacts to the group that includes at least one API function related to entities that a human being can contact so that the hierarchical name for the group that includes at least one API function related to entities that a human being can contact is System.Storage.Contacts; assigning a name of Documents to the group that includes at least one API function related to document types that can be stored in the file system so that the hierarchical name for the group that includes at least one API function related to document types that can be stored in the file system is System.Storage.Documents; and assigning a name of Media to the group that includes at least one API function related to multiple kinds of media so that the hierarchical name for the group that includes at least one API function related to multiple kinds of media is System.Storage.Media.

32. A method as recited in claim 27, wherein the assigning comprises: assigning a name of Core to the group that includes at least one API function related to core concepts of the file system so that the hierarchical name for the group that includes at least one API function related to core concepts of the file system is System.Storage.Core; assigning a name of Contact to the group that includes at least one API function related to entities that a human being can contact so that the hierarchical name for the group that includes at least one API function related to entities that a human being can contact is System.Storage.Contact; assigning a name of Document to the group that includes at least one API function related to document types that can be stored in the file system so that the hierarchical name for the group that includes at least one API function related to document types that can be stored in the file system is System.Storage.Document; and assigning a name of Media to the group that includes at least one API function related to multiple kinds of media so that the hierarchical name for the group that includes at least one API function related to multiple kinds of media is System.Storage.Media.

33. A method for organizing functions in a program development computer system, the method comprising:
creating a first namespace in a file system that resides on a server of the program development computer system, the first namespace includes application program interface (API) functions of an API layer that enable identification of particular physical locations using the program development computer system, the API interface layer running on top of a common language runtime layer to receive API function calls from an intermediate language program; the file system is included in a programming interface layer of the program development computer framework;
creating a second namespace on the file system that includes API functions of the API layer that enable identification of entities that can be contacted by a human being using the program development computer system, one of the API functions in the API layer communicates in a first form and another of the API functions in the API layer communicates in a second form that is incompatible with the first form; and converting a communication associated with an API function of the API layer from the first form to the second form.

34. A method as recited in claim 33, further comprising: creating a third namespace using the program development computer system that includes API functions of the API layer that enable documents to be described.

35. A method as recited in claim 33, further comprising: creating a third namespace using the program development computer system that includes API functions of the API layer specific to electronic mail messages.

36. A method as recited in claim 33, further comprising: creating a third namespace using the program development computer system that includes API functions of the API layer common to multiple kinds of media; creating a fourth namespace using the program development computer system that includes API functions of the API layer specific to audio media; creating a fifth namespace using the program development computer system that includes API functions of the API layer specific to video media; and creating a sixth namespace using the program development computer system that includes API functions of the API layer specific to image media.

37. A method as recited in claim 33, further comprising: creating a third namespace using the program development computer system that includes API functions of the API layer that are expected to be used by all other namespaces.

38. A computer readable device having stored thereon a plurality of instructions that, when executed by a processor, cause the processor to:
create a first namespace that includes application program interface (API) functions of the API layer that enable identification of particular physical locations, the API interface layer running on top of a common language runtime layer to receive API function calls from an intermediate language program; and
create a second namespace that includes API functions of the API layer that are expected to be used by the first namespace and a plurality of additional namespaces, wherein the first namespace, the second namespace, and the plurality of additional namespaces are defined to organize a file system, the file system being included in a programming interface for developing programs, one of the API functions of the API layer communicating in a first form and another function communicating in a second form which is incompatible with the first form; and
convert a communication associated with one of the API functions of the API layer and in the first form to the second form.

39. A computer readable device as recited in claim 38, wherein the instructions further cause the processor to: create a third namespace that includes API functions of the API layer that enable documents to be described; create a fourth namespace that includes API functions of the API layer that enable identification of entities that can be contacted by a human being; and create a fifth namespace with that includes API functions of the API layer common to multiple kinds of media.

40. A computer readable device as recited in claim 39, wherein the instructions further cause the processor to: create a sixth namespace with that includes API functions of the API layer specific to audio media; create a seventh namespace with that includes API functions of the API layer specific to video media; and create an eighth namespace with that includes API functions of the API layer specific to image media.

41. A computer readable device as recited in claim 38, wherein the instructions further cause the processor to: create a third namespace with that includes API functions of the API layer common to multiple kinds of media; create a fourth namespace with that includes API functions of the API layer specific to audio media; create a fifth namespace with that includes API functions of the API layer specific to video media; and create a sixth namespace with that includes API functions of the API layer specific to image media.

42. A method comprising:
calling one or more first application program interface (API) functions of an API layer that is running on top of a common language runtime layer that resides on a server of a program development computer system, the one or more first API functions enable documents to be described;
calling one or more second API functions of the API layer that are core functions expected to be used by the one or more first functions as well as a plurality of additional functions and converting a communication associated with an API function of the API layer from a first form to a second form, wherein one of multiple API functions in the API layer communicates in the first form and another of the multiple API functions in the API layer communicates in the second form that is incompatible with the first form, and
wherein the one or more first functions, the one or more second functions, and the plurality of additional functions are organize in a file system in the program development computer system, the file system being included in the API.

43. A method as recited in claim 42, further comprising: calling one or more third API functions of the API layer common to multiple kinds of media using the program development computer system.

44. A method as recited in claim 43, further comprising: calling one or more fourth API functions of the API layer specific to audio media using the program development computer system; calling one or more fifth API functions of the API layer specific to video media using the program development computer system; and calling one or more sixth API functions of the API layer specific to image media using the program development computer system.

45. A method as recited in claim 42, further comprising: calling one or more third API functions of the API layer using the program development computer system that enable identification of entities that can be contacted by a human being; and calling one or more fourth API functions of the API layer using the program development computer system that enable identification of particular physical locations.

46. A method as recited in claim 42, further comprising: calling one or more third API functions of the API layer specific to electronic mail messages using the program development computer system.

47. A method, comprising:
receiving one or more calls to one or more first application program interface (API) functions of the API layer that is running on top of a common language runtime layer, the one or more first API functions enable identification of entities that can be contacted by a human being;
receiving one or more calls to one or more second API functions of the API layer that are core functions expected to be used by the one or more first API functions of the API layer as well as a plurality of additional API functions of the API layer using the program development computer system and converting a communication associated with an API function of the API layer from a first form to a second form, wherein one of multiple API functions in the API layer communicates in the first form and another of the multiple API functions in the API layer communicates in the second form that is incompatible with the first form and
wherein the one or more first API functions of the API layer, the one or more second API functions of the API layer, and the plurality of additional API functions of the API layer are defined to organize a file system in a server of the program development computer system, the file system being included in a programming interface.

48. A method as recited in claim 47, further comprising: receiving one or more calls using the program development computer system to one or more third API functions of the API layer that enable documents to be described; receiving one or more calls using the program development computer system to one or more fourth API functions of the API layer common to multiple kinds of media; and receiving one or more calls using the program development computer system to one or more fifth API functions of the API layer that enable identification of particular physical locations.

49. A method as recited in claim 48, further comprising: receiving one or more calls using the program development computer system to one or more sixth API functions of the API layer specific to audio media; receiving one or more calls using the program development computer system to one or more seventh API functions of the API layer specific to video media; receiving one or more calls using the program development computer system to one or more eighth API functions of the API layer specific to image media and receiving one or more calls using the program development computer system to one or more ninth API functions of the API layer specific to electronic mail messages.

50. A computer readable device having stored thereon a plurality of instructions that, when executed by a processor, cause the processor to:
receive one or more calls to one or more first application program interface (API) functions of the API layer that enable identification of entities that can be contacted by a human being, the API layer running on top of a common language runtime layer; and
receive one or more calls to one or more second API functions of the API layer common to multiple kinds of media, wherein the one or more first API functions of the API layer and the one or more second API functions of the API layer are defined to organize a file system, the file system being included in a programming interface for programming programs, one of the API functions of the API layer communicating in a first form and another function communicating in a second form which is incompatible with the first form; and
convert a communication associated with one of the API functions of the API layer and in the first form to the second form.

51. A computer readable device as recited in claim 50, wherein the instructions further cause the processor to: receive one or more calls to one or more third API functions of the API layer that are core API functions of the API layer expected to be used by the one or more first API functions of the API layer, the one or more second API functions of the API layer, and a plurality of additional API functions of the API layer.

52. A computer readable device as recited in claim 50, wherein the instructions further cause the processor to: receive one or more calls to one or more third API functions of the API layer that enable identification of particular physical locations; receive one or more calls to one or more fourth API functions of the API layer that enable documents to be described; and receive one or more calls to one or more fifth API functions of the API layer specific to electronic mail messages.

53. A computer readable device as recited in claim 50, wherein the instructions further cause the processor to: receive one or more calls to one or more third API functions of the API layer specific to audio media; receive one or more calls to one or more fourth API functions of the API layer specific to video media; and receive one or more calls to one or more fifth API functions of the API layer specific to image media.

54. A computer readable device as recited in claim 2, wherein the groups further include a tenth group of types related to moving data between file systems

* * * * *